(12) United States Patent
Bauder

(10) Patent No.: US 10,840,951 B2
(45) Date of Patent: Nov. 17, 2020

(54) SYSTEM AND METHOD FOR A RADIO FREQUENCY FILTER

(71) Applicant: Infineon Technologies AG, Neubiberg (DE)

(72) Inventor: Ruediger Bauder, FeldkirchenWesterham (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/878,938

(22) Filed: Jan. 24, 2018

(65) Prior Publication Data

US 2018/0159562 A1   Jun. 7, 2018

Related U.S. Application Data

(62) Division of application No. 14/874,256, filed on Oct. 2, 2015, now Pat. No. 9,941,908.

(Continued)

(51) Int. Cl.
*H04B 7/06* (2006.01)
*H04B 1/00* (2006.01)
(Continued)

(52) U.S. Cl.
CPC ........... *H04B 1/0057* (2013.01); *H04B 1/005* (2013.01); *H04B 1/525* (2013.01); *H04B 7/0602* (2013.01); *H04B 1/38* (2013.01)

(58) Field of Classification Search
CPC .... H04B 1/005; H04B 7/0602; H04B 7/0691; H04B 7/0814; H04B 7/082; H04B 7/0874; H04B 1/0057; H04B 1/525
(Continued)

(56) References Cited

U.S. PATENT DOCUMENTS

| 8,537,723 B2 | 9/2013 | Khlat |
| 2005/0130612 A1 | 6/2005 | Lin et al. |

(Continued)

FOREIGN PATENT DOCUMENTS

| CN | 102576923 A | 7/2012 |
| CN | 102832960 A | 12/2012 |

(Continued)

OTHER PUBLICATIONS

Jones, C., "Broad-Band Balanced Duplexers," IRE Transactions on Microwave Theory and Techniques, Jan. 1957, p. 4-12.

(Continued)

*Primary Examiner* — Harun Chowdhury
(74) *Attorney, Agent, or Firm* — Slater Matsil, LLP

(57) ABSTRACT

In accordance with an embodiment, a circuit includes a plurality of filter circuits having a first port, a second port and a third port, where a second port of a first of the plurality of filter circuits is coupled to a first port of a second of the plurality of filter circuits, and each of the plurality of filter circuits includes a first passive filter, a second passive filter, a first coupler and a combining network. The first coupler includes an input port coupled to the first port, an isolated port coupled to the second port, a first phase shifted port coupled to the first passive filter and a second phase shifted port coupled to the second passive filter, and the combining network includes a first input coupled to the first passive filter, a second input coupled to the second passive filter, and an output coupled to the third port.

14 Claims, 48 Drawing Sheets

Related U.S. Application Data

(60) Provisional application No. 62/066,201, filed on Oct. 20, 2014.

(51) Int. Cl.
 *H04B 1/525* (2015.01)
 *H04B 1/38* (2015.01)

(58) Field of Classification Search
 USPC .......... 370/276, 297, 334, 338; 455/78, 101, 455/188.1
 See application file for complete search history.

(56) References Cited

U.S. PATENT DOCUMENTS

| | | |
|---|---|---|
| 2008/0174385 A1 | 7/2008 | Johansson et al. |
| 2011/0136446 A1* | 6/2011 | Komninakis ........ H04B 7/0874 455/78 |
| 2012/0256702 A1 | 10/2012 | Khlat et al. |
| 2012/0281597 A1 | 11/2012 | Khlat et al. |
| 2013/0149975 A1* | 6/2013 | Yu ........................ H04B 7/0602 455/78 |
| 2013/0201880 A1 | 8/2013 | Bauder et al. |
| 2013/0201882 A1 | 8/2013 | Bauder et al. |
| 2013/0321097 A1 | 12/2013 | Khlat |
| 2014/0038532 A1 | 2/2014 | George et al. |
| 2014/0049337 A1 | 2/2014 | Schmidhammer |
| 2014/0105079 A1* | 4/2014 | Bengtsson ............ H04B 1/005 370/297 |
| 2014/0269856 A1 | 9/2014 | Gianvittorio et al. |

FOREIGN PATENT DOCUMENTS

| | | |
|---|---|---|
| CN | 103414507 A | 11/2013 |
| CN | 103516405 A | 1/2014 |
| JP | 2007515900 A | 6/2007 |
| JP | 2009524272 A | 6/2009 |
| KR | 20100028892 A | 3/2010 |
| KR | 20140010964 A | 1/2014 |
| WO | 2007063066 A1 | 6/2007 |

OTHER PUBLICATIONS

Khlat, N. et al., "Broadband Isolation Low-Loss ISM/MB-HB Tunable Diplexer," U.S. Appl. No. 61/895,386, filed Oct. 24, 2013, pp. 50.

Khlat, N. et al., "Reconfigurable ISM/MB-HB Tunable Diplexer," U.S. Appl. No. 61/906,622, filed Nov. 20, 2013, pp. 21.

Mansour, R.R., et al., "Design of Hybrid-Coupled Multiplexers and Diplexers Using Asymmetrical Superconducting Filters," IEEE MTT-S International in Microwave Symposium Digest, Jun. 14-18, 1993, pp. 1281-1284.

Mobbs, C.I., "Matched Four Port Hybrid Filters," 1987 IEEE MTT-S International in Microwave Symposium Digest, vol. 1, May 9, 1975-Jun. 11, 1987, pp. 149-152.

\* cited by examiner

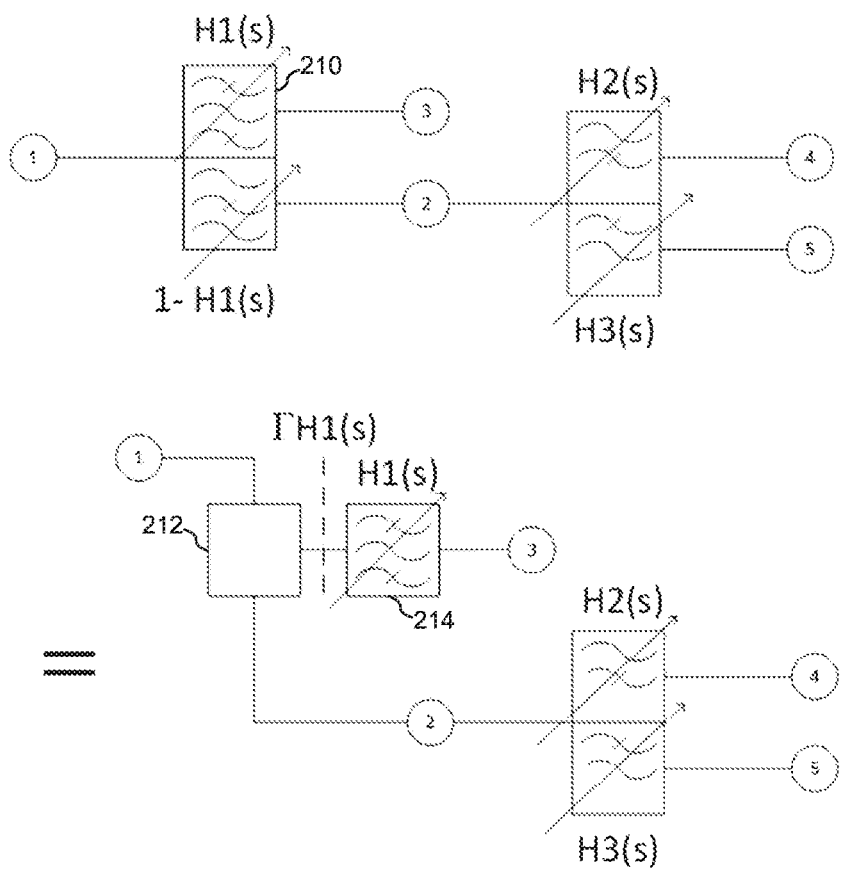
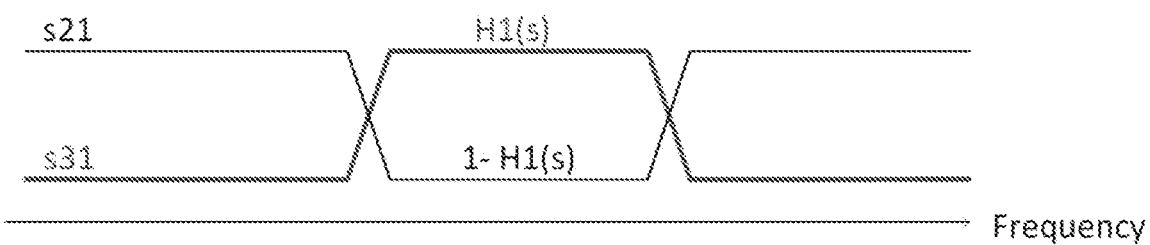
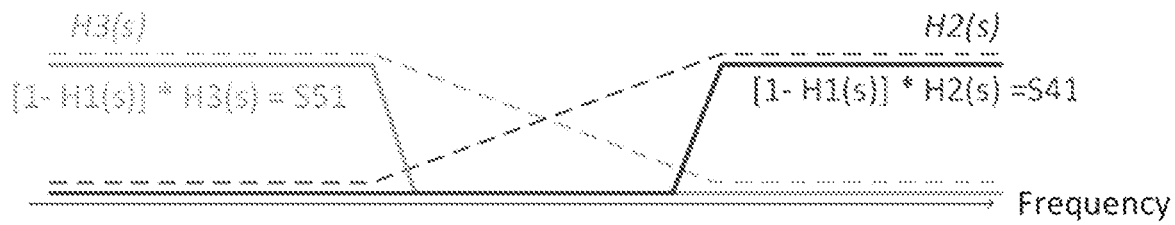
*FIG. 2d*

|  | Bandpass/Bandstop mode | | Bypass mode P(1) to P(2) transmission only | |
| --- | --- | --- | --- | --- |
|  | SW1 | SW2 | SW1 | SW2 |
| A0sw1 | Open | Closed | Closed | Open |
| A0sw2 | - | Closed | - | Open |
| A0sw3 | Open | - | Closed | - |
| B0sw1 | Open | Closed | Closed | Open |
| B0sw2 | - | Closed | - | Open |
| B0sw3 | Closed | - | Open | - |

*FIG. 5g*

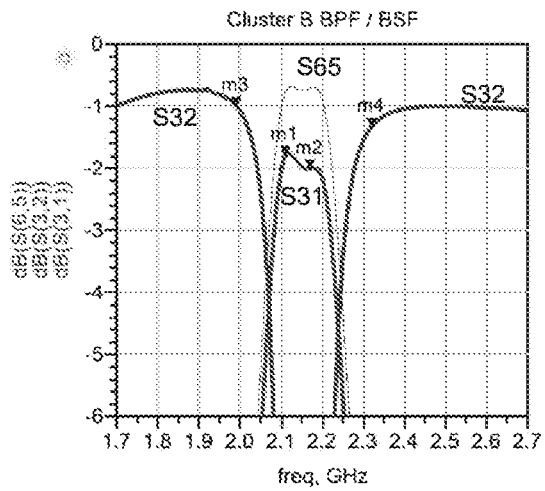
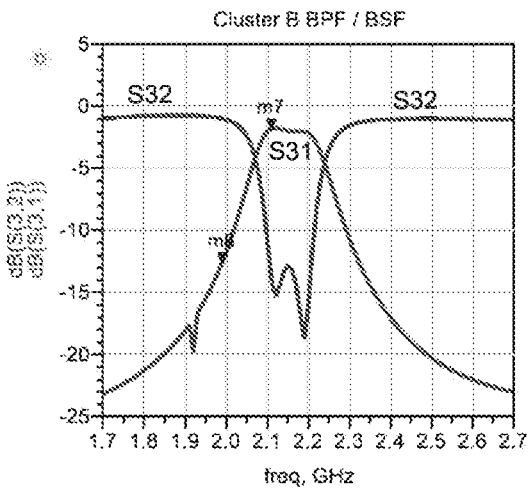
*FIG. 13a*  *FIG. 13b*
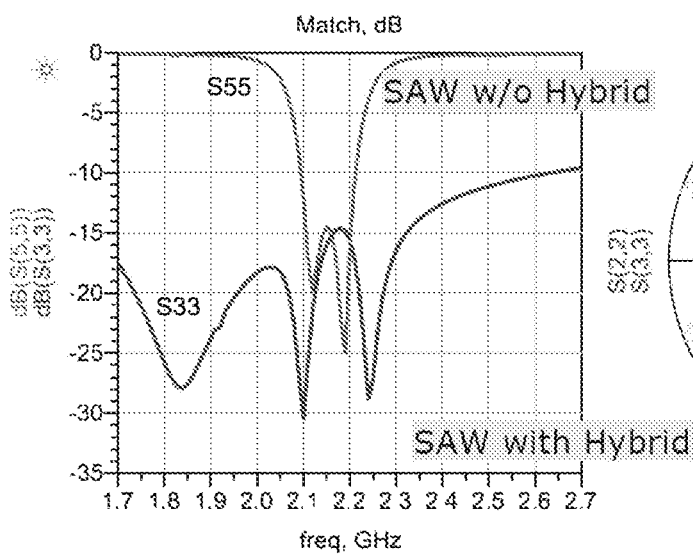
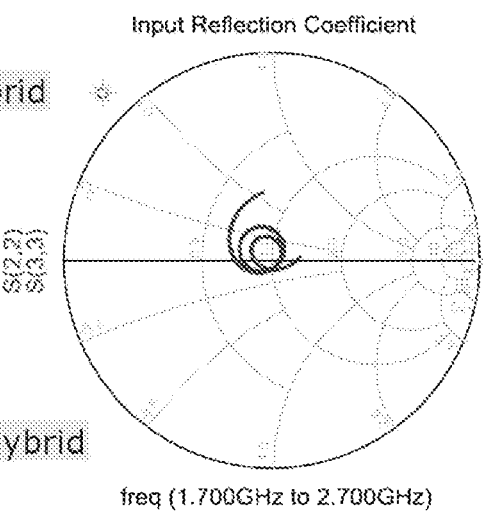
*FIG. 13c*  *FIG. 13d*

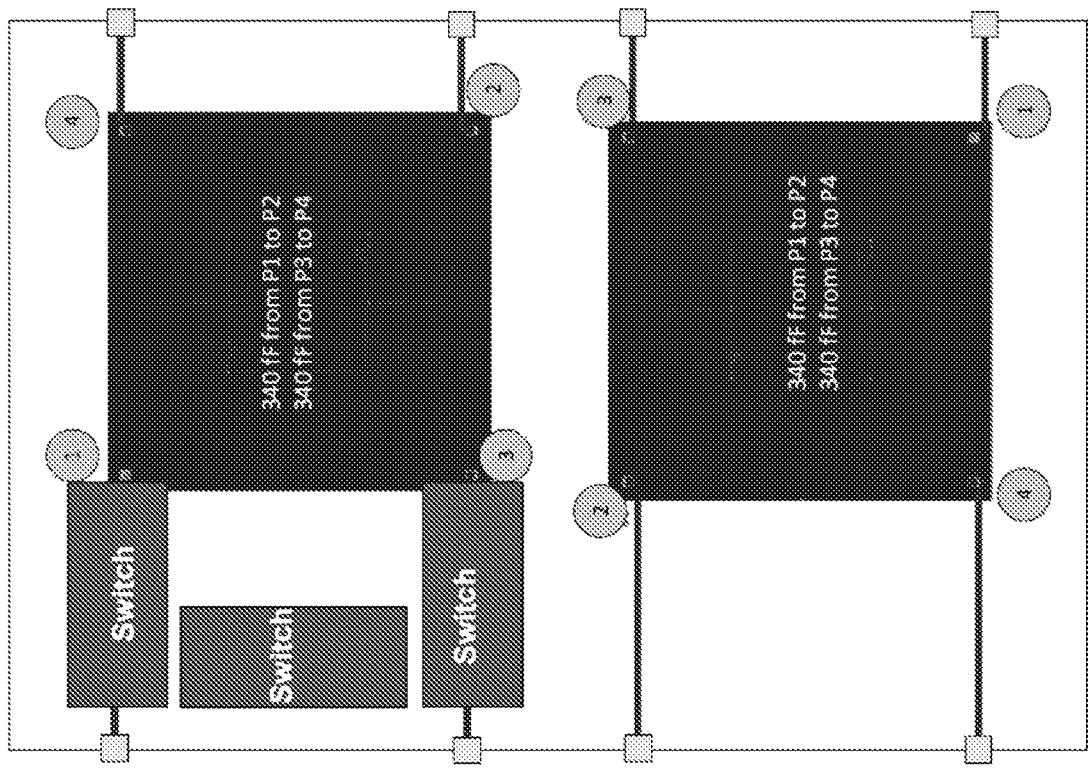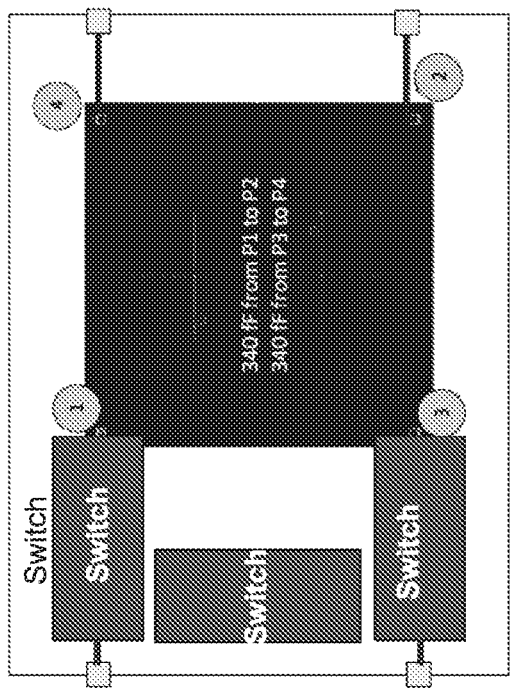
FIG. 16b

SYSTEM AND METHOD FOR A RADIO FREQUENCY FILTER

This application is a divisional of U.S. patent application Ser. No. 14/874,256 entitled "System and Method for a Radio Frequency Filter," filed on Oct. 2, 2015 which application claims the benefit of U.S. Provisional Application No. 62/066,201 entitled "System and Method for a Radio Frequency Filter," filed on Oct. 20, 2014, both of which applications are hereby incorporated herein by reference in their entirety.

TECHNICAL FIELD

The present disclosure relates generally to an electronic device, and more particularly to a system and method for a radio frequency filter.

BACKGROUND

In many RF Systems, such as portable wireless devices, more than one receive frequency or transmit frequency may be simultaneously active in a single radio device. When the respective frequency bands are far away from each other and/or when the frequency bands are processed with different gains, different frequency channels are separated in the frequency domain and processed in separate signal paths. Many systems today require flexible frequency planning and simultaneous processing of more than two channels, which makes a fixed frequency de-multiplexer filter design (with n frequency bands) challenging to design. For example, $4^{th}$ generation mobile communication standard LTE uses carrier aggregation techniques that utilize multiple channels in which up to three receive (RX) channels and one transmit (TX) channel are processed at the same time. In the next generation LTE standard and likely other standards too, multiple RX paths of different frequencies and multiple TX paths of different frequencies will be operated simultaneously. Accordingly, assuming the TX is filtered out already, the User Equipment (UE) separates up to three RX channels that are split in the frequency domain.

SUMMARY

In accordance with an embodiment, a circuit includes a plurality of filter circuits having a first port, a second port and a third port, where a second port of a first of the plurality of filter circuits is coupled to a first port of a second of the plurality of filter circuits, and each of the plurality of filter circuits includes a first passive filter, a second passive filter, a first coupler and a combining network. The first coupler includes an input port coupled to the first port, an isolated port coupled to the second port, a first phase shifted port coupled to the first passive filter and a second phase shifted port coupled to the second passive filter, and the combining network includes a first input coupled to the first passive filter, a second input coupled to the second passive filter, and an output coupled to the third port.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a and 2b illustrate a single embodiment tuned isolated filter structure and FIGS. 2c and 2d illustrate a single embodiment tuned isolated filter structure followed by a conventional tuned diplexer;

FIGS. 5a-5g illustrated various implementations of embodiment tuned isolated filter structures having a bypass mode and a corresponding switching chart;

FIGS. 13a-13d illustrate s-parameter plots of the RF system of FIG. 12;

FIGS. 16a-16b illustrate example layout diagrams of embodiment isolated filter structures;

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a flexible RF filter for use in multiband RF systems. Further embodiments may be applied, for example, to other RF systems.

Figure 1A:
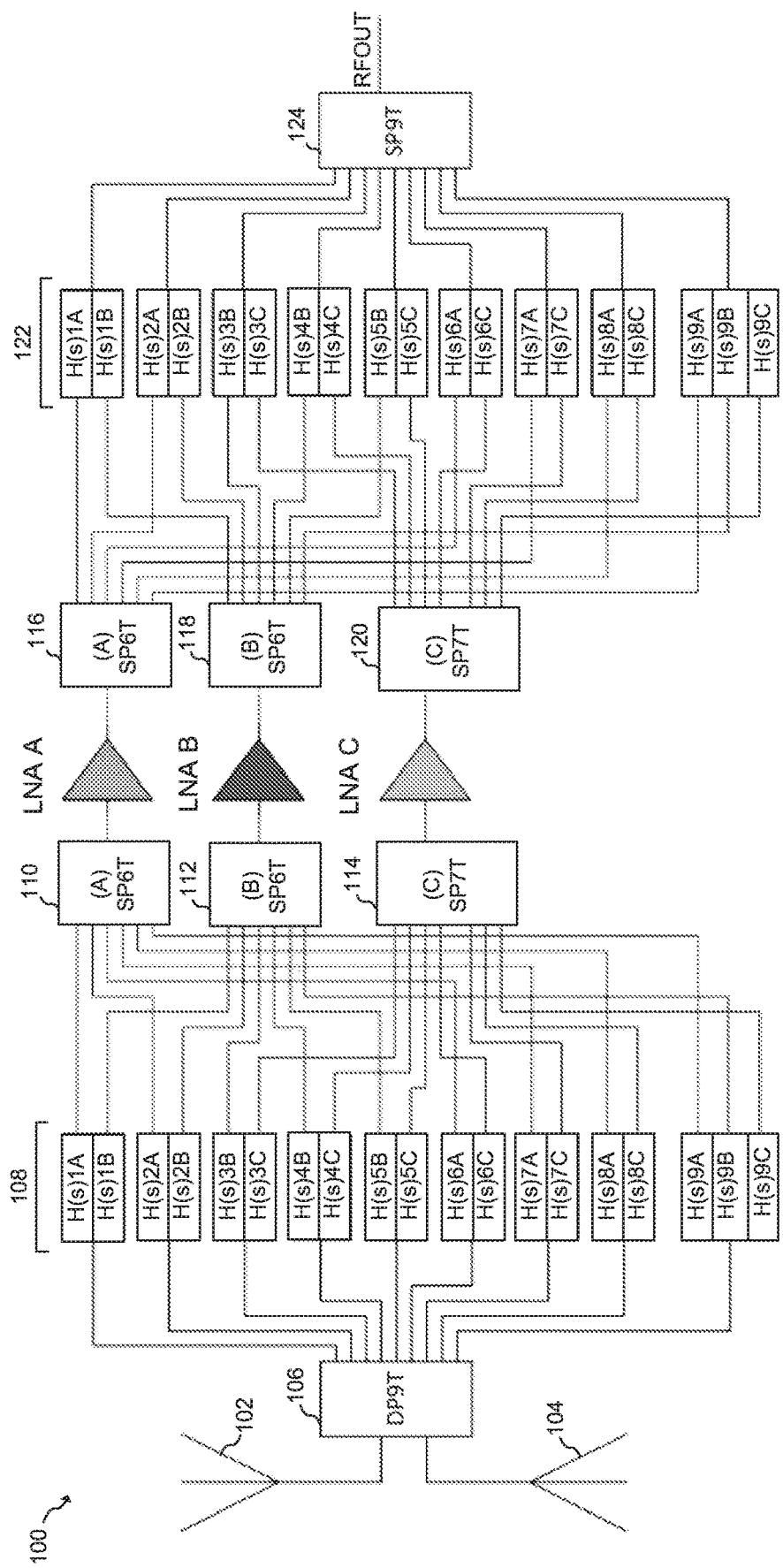
FIG. 1a illustrates a conventional RF RX utilizing switched clusters of diplexer and triplexer filters at the Antenna to LNA interface and switched clusters of diplexer and triplexer filters after the LNA's.

Tuning the pass-band of each filter and fulfilling the phase/amplitude relationship of all filters so as not to provide low impedances to the filters inside their pass-band is extremely difficult to accomplish. Accordingly, conventional solutions, such as RF receive path 100 illustrated in FIG. 1a, use filter banks, where each filter bank maps one use case. In each use case, the filters are optimized in phase and magnitude such that all filters do not load each other. For a different use case, a new set of filters is combined in phase and amplitude such that they do not load each other. Therefore, an array of use case combinations utilizing bank of tri- or diplexers as shown in FIG. 1a, is switched in via RF switches to map the requirements. This causes redundancy of hardware if one band is used in various use cases. As a result, the radio is large and expensive.

As shown in FIG. 1a, a pair of antennas 102 and 104 is coupled to an antenna switch 106, which is followed by a first filter bank 108 that includes diplexers and one or more triplexers. The outputs of first filter bank 108 are routed to three LNA: a low-band LNA A, a mid-band LNA B and a high-band LNA C via RF switches 110, 112 and 114 at the inputs and RF switches 116, 118 and 120 outputs of these LNAs. RF switches 116, 118 and 120 are then followed by a second filter bank 122 that include diplexers and triplexers similar to the first filter bank 108, the outputs of which are selected by a further RF switch 124. As is apparent by FIG. 1a, the first bank of diplexers is similar to the second bank of diplexers, thereby causing redundancy.

Figure 1B:
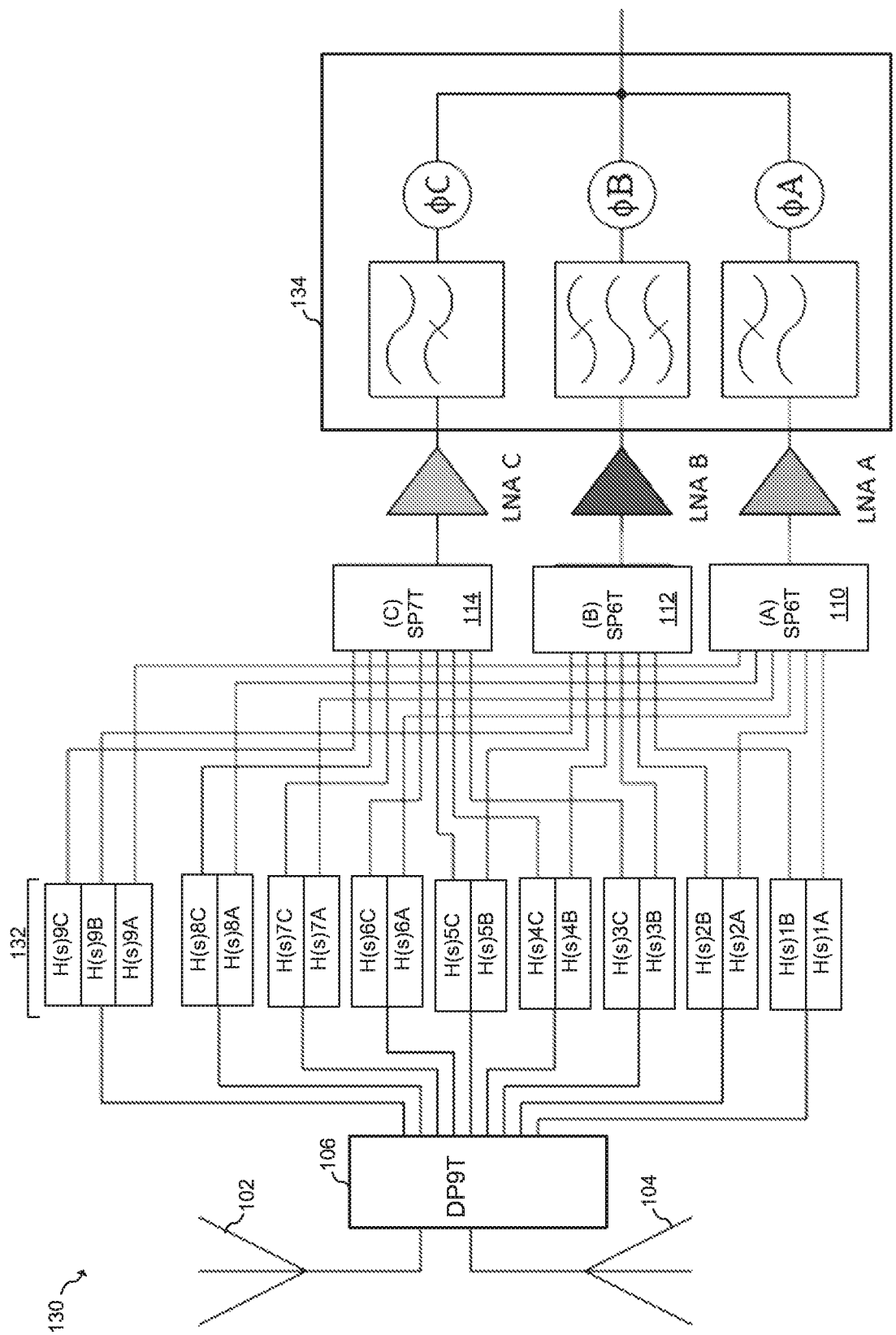
FIG. 1b illustrates a RF system utilizing switched clusters of diplexer and triplexer filters at the Antenna to LNA interface and a triplexer after the LNAs.
Figure 2A:
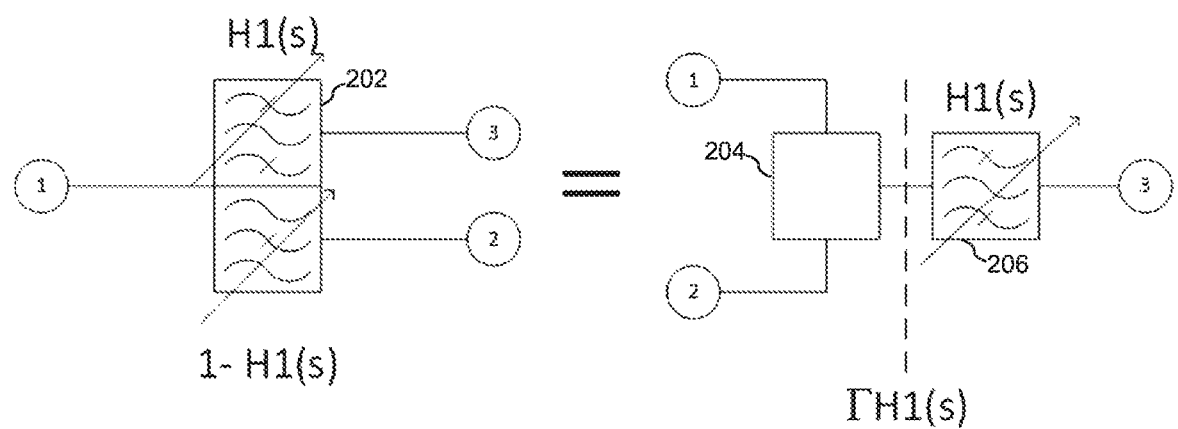
Figure 2B:
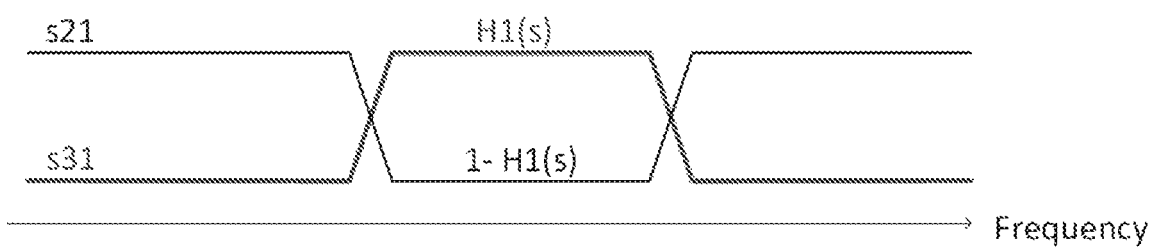

FIG. 1b illustrates a system 130 in which a first bank of diplexers/triplexers 132 is coupled to antennas 102 and 104 via antenna switch 106 and routed to low-band LNA A, mid-band LNA B and a high-band LNA C via RF switches 110, 112 and 114, which are followed by a triplexer 134 instead of a redundant filter bank. While the system of FIG. 1b avoids the use of a redundant filter bank, the design of the triplexer poses some design issues including loading/mismatch at the input, gain drop in carrier aggregation (CA) mode, and RX noise leakage though active LNAs in the CA mode. Ideally, the triplexer filter components are phase rotated to each other via phase ΦA, ΦB, ΦC such that they do not load each other. Moreover, such post-LNA multiplexing may need a very high Q triplexer, the design of which may be especially challenging if the triplexer is to be tunable to support a flexible frequency plan. In an embodiment, a tunable, high-Q bandpass filter (BPF) and bandstop filter (BSF) is implemented using an isolated filter core, a simplified example of which is illustrated in FIG. 2a. As shown a bandpass/bandstop filter 202 having a first transfer function of H1(s) at a first output and a second transfer function of 1-H1(s) at a second output may be implemented using a coupling structure 204, such as a −3 dB hybrid with a quadrature output, coupled to a BPF filter 206 having a transfer function of H1(s). As shown in FIG. 2b, the transfer function H1(s) from port 1 to port 3 is has bandpass characteristic and the transfer function 1-H1(s) from port 1 to port 2 has a bandstop characteristic due to the reflection ΓH1(s). To simplify the equations to 1-H1(s), the coupling structure 204 is assumed without loss and the reflection coefficient F is assumed to be 1 for total reflection.

In an embodiment, a tunable, high-Q triplexer is implemented using a hybrid bandpass filter (BPF) and bandstop filter (BSF) having an isolated filter core and a conventional diplexer with high-pass characteristics H2(s) and low pass characteristics H3(s), a simplified example of which is illustrated in FIG. 2c. As shown a bandpass/bandstop filter 210 having a first transfer function of H1(s) at a first output and a second transfer function of 1-H1(s) at a second output may be implemented using a coupling structure, such as a −3 dB hybrid with a quadrature output 212, coupled to a BPF 214 having a transfer function of H1(s). As shown in FIG. 2d, the transfer function H1(s) from port 1 to port 3 is has bandpass characteristic and the transfer function 1-H1(s) from port 1 to port 2 has a bandstop characteristic due to the reflection ΓH1(s). To simplify the equations to 1-H1(s), the coupling structure 212 is assumed without loss and the reflection coefficient Γ is assumed to be 1 for total reflection.

In an embodiment, port 2 of the tuned isolated filter core is connected to a conventional diplexer with high pass characteristics from port 2 to port 4 and low pass characteristics from port 2 to port 5. As described in FIG. 2d the total cascaded transfer from port 1 to port 5 follows a low pass filter with its transfer function [1-H1(s)]*H3(s) and the equivalent high pass filter characteristics from port 1 to port 4 with its transfer function [1-H1(s)]*H2(s). The transfer from port 1 to port 3 follows a bandpass function H1(s). The required diplexer filter function H2(s) and H3(s) can be very much relaxed and still a very steep LB(S51) to MB(S31) and a very steep MB(S31) to HB(S41) transition can be achieved due to the contribution of the steep isolated band stop transfer function 1-H1(s).

This technique reduces the number of filters loading each other by 1 frequency band per isolation bandpass, such that a n-plexer function may be implemented using an isolated core and a (n−1) plexer solution. Accordingly, the transition from port 1 to port 3 is defined mainly by the filter transfer function H1(s) whereas the transition from port 1 to port 2 is mainly defined by the reflection ΓH1(s). Embodiments utilizing such an isolated filter structure has a number of advantages, For example, only one filter type is required, which simplifies the tuning of the arrangement, since the bandpass transfer function H1(s) and band-stop transfer function 1-H1(s) track each other automatically. In addition, the band-stop characteristic is less dependent on the correct phase than for a conventional filter due to the isolated nature of the embodiment three-port structure.

In an embodiment, transfer function H1(s) occurs from port 1 to port 3 and the transfer function (1-H(s)) occur for the reflected signal from port 1 to port 2. The filter that creates the pass band/reflection plane may be implemented using a tuned filter. Further filtering may be added to path 2 and path 3 without causing mismatch at the isolated filter core. This allows the design of flexible filter banks for simultaneous operation of several frequency bands. An example of such further filtering is shown in FIG. 3a, in which two cascaded isolated filter bandpass/bandstop filters 220 and 222 having transfer functions H1(s), 1-H1(s) and H2(s), 1-H2(s) are implemented using embodiment filter structures 224 and 226 based on bandpass filters having transfer functions H1(s) and H2(s).

Figure 3A:
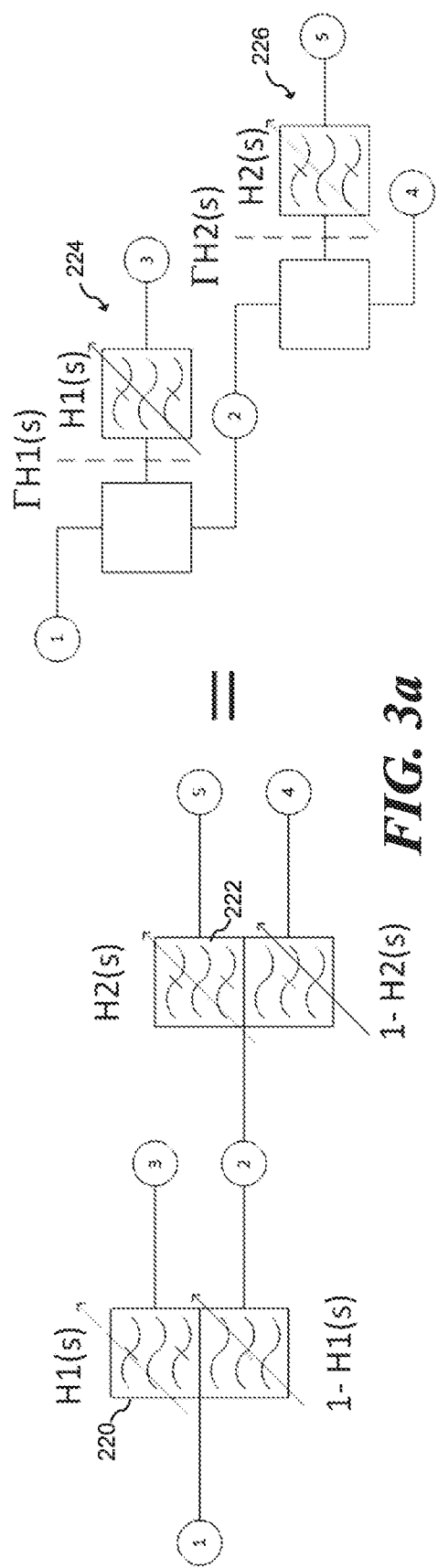
FIGS. 3a-3b illustrate two cascaded embodiment tuned isolated filter structures.
Figure 3B:
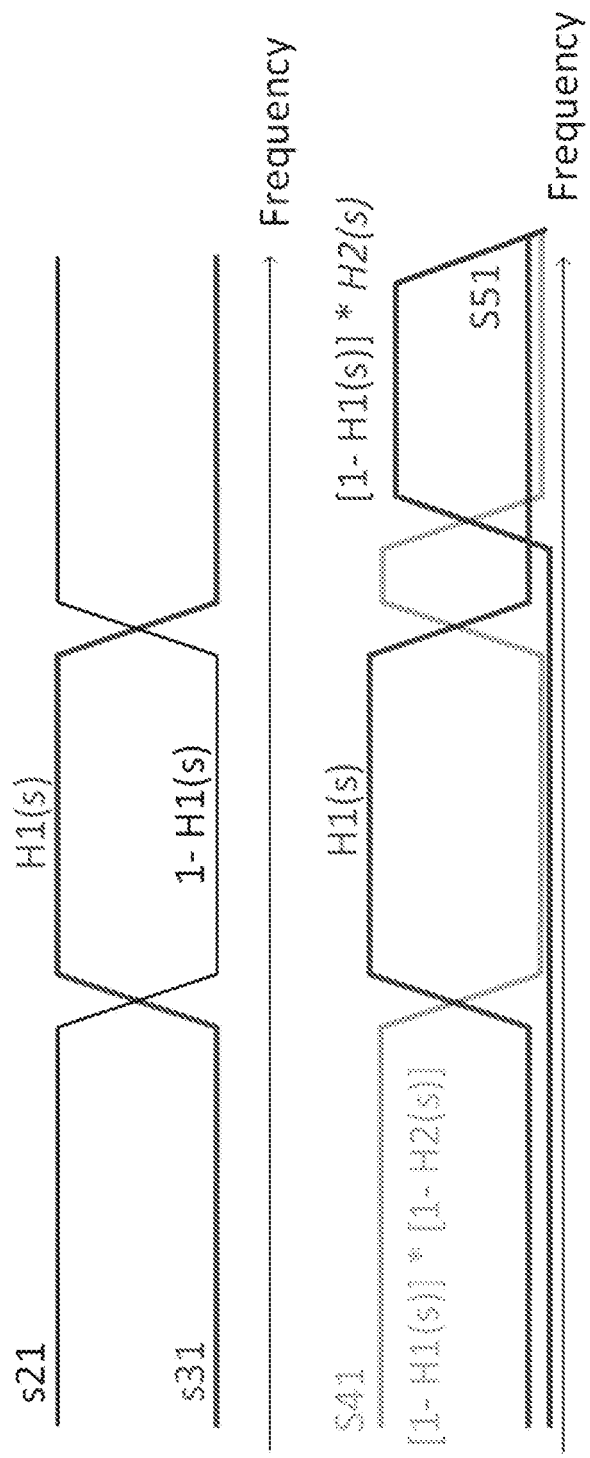

As shown in FIG. 3a, port 2 of the first isolated core filter 224 structure is coupled to the first port of a second isolated core filter structure 226 to form a triplexer. Accordingly, the transfer function from port 3 to port 1 is the bandpass transfer function H1(s), and the transfer function from port 5 to port 1 is the filter function [1-H1(s)]*H2(s). However, the transfer function from port 4 to port 1 has two stop bands due to reflections ΓH1(s) and ΓH2(s) at the input of the two bandpass filters and have a transfer function of [1-(1-H1(s))]*[1-H2(s))]. Amplitude plots of these transfer functions are illustrated in FIG. 3b.

Figure 3C:
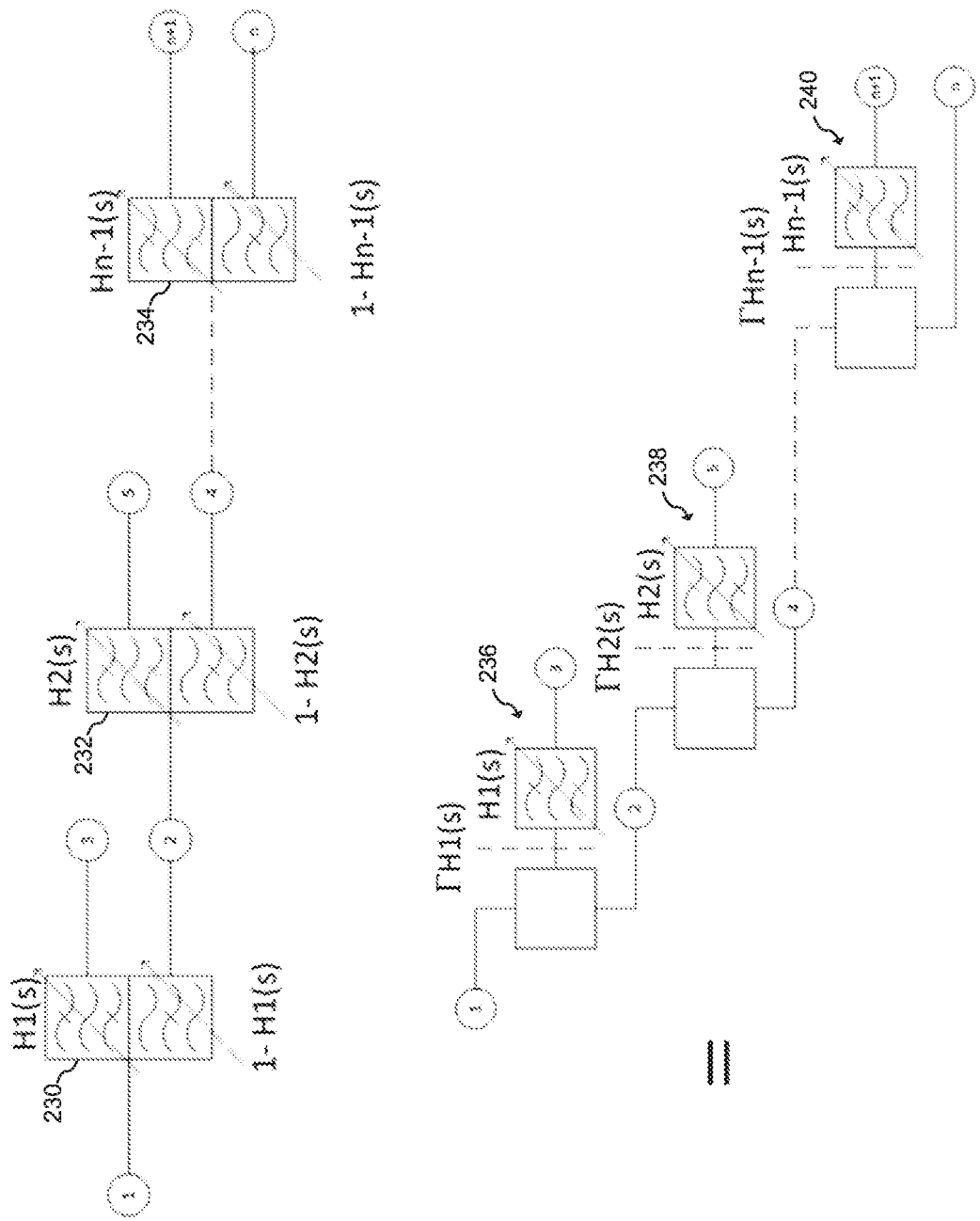
FIG. 3c illustrates n–1 cascaded embodiment tuned isolated filter structures.

As shown in FIG. 3c, additional embodiment isolated core filter structures 230, 232 and 234 may be cascaded to form a (n−2) filter structure using embodiment isolated core filter structures 236, 238 and 240.

Figure 3D:
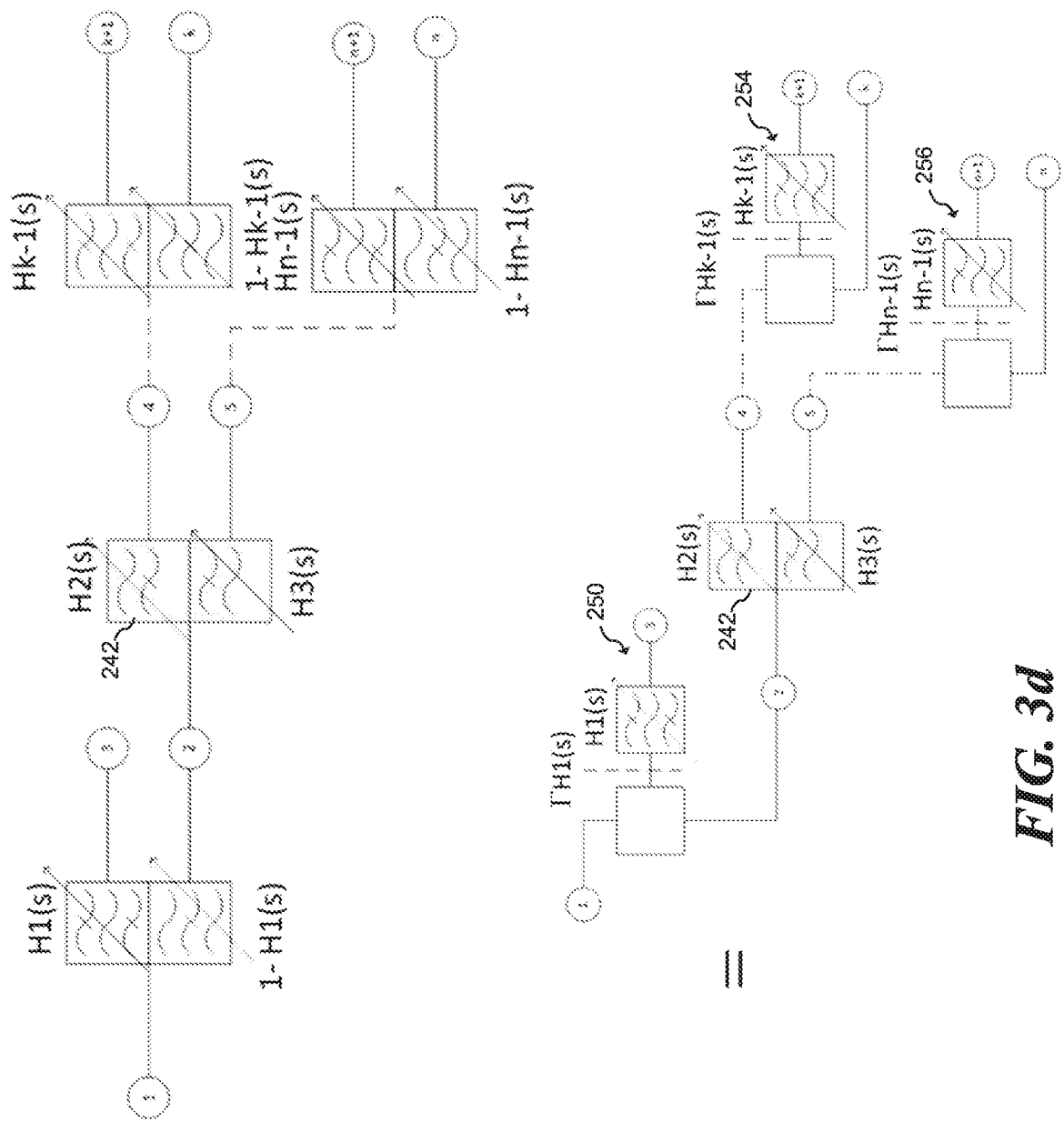
FIG. 3d illustrates a circuit using a tuned diplexer along with embodiment tuned isolated filter structures.

As is further shown in FIG. 3d, conventional filters may be added to each isolated filter core to form other filter structures (complexity and load criteria permitting). As shown, port 2 of a first isolated filter structure 250 based on a bandpass filter function H1(s) is coupled to a conventional diplexer 242 based on a transfer function of H2(s) and H3(s) that divides the frequency content at port 2 into two frequency bands. In one example, the first isolated filter structure 250 removes a middle band using the bandstop characteristic of the isolated filter structure, and the conventional diplexer 242 has a more shallow frequency response characteristic. The additional isolated filter structures 254 and 256 based on transfer functions $H_{k-1}(s)$ and $H_{n-1}(s)$ may be used to isolate further frequency clusters in the high-band and low-band divided by the conventional diplexer. In an embodiment, the mid-band frequency content is available at port 3 of the isolated filter structure 250 based on H1(s).

Figure 4A:
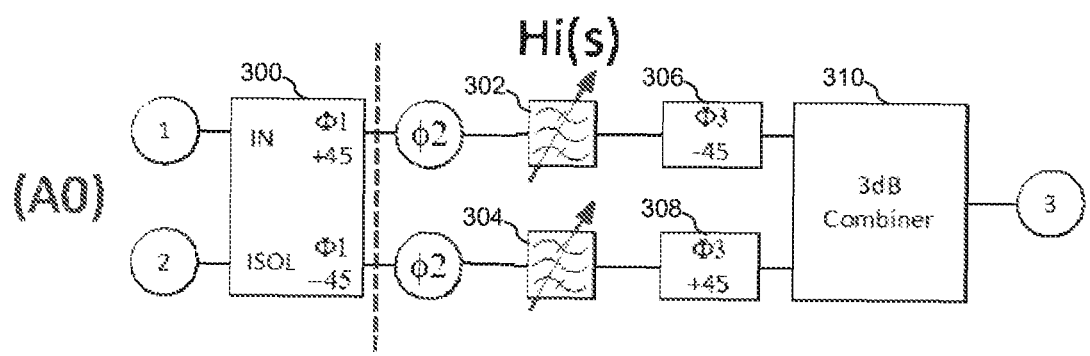
FIGS. 4a to 4j illustrate various implementations of embodiment tuned isolated filter structures.
Figure 4B:
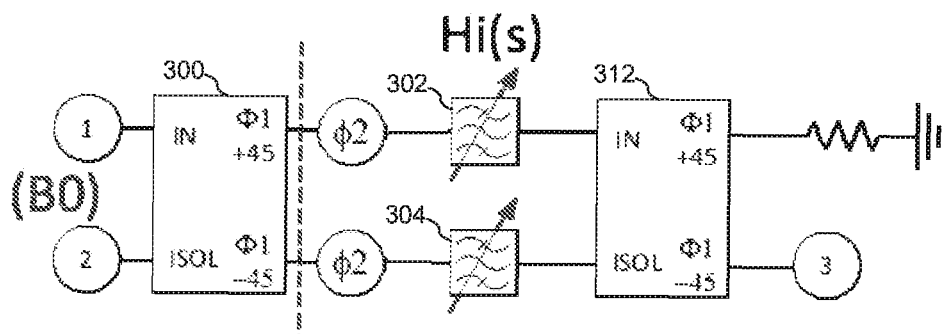

FIGS. 4a and 4b illustrate two possible ways to implement embodiment isolated filter structures. For example, in FIG. 4a, an embodiment isolated filter structure (Ao) may be implemented using a coupler, such as a −3 dB hybrid 300 with a quadrature output port and an isolation port followed by phase shifting elements φ2, two identical filters 302 and 304 or tuned filters with the characteristics Hi(s), and then followed by phase shifters 306 and 308 and a power splitter such as a 3 dB combiner 310. In an embodiment, the phase shifters 306 and 308 and 3 dB combiner 310 may be implemented using a lead lag circuit, a polyphase filter network or other circuit known in the art. Phase shifts φ2 represent additional phase shifts implicit in the isolated filter structure.

In a further embodiment, as shown in FIG. 4b, an embodiment isolated filter (Bo) structure may be implemented using a first coupler, such as a −3 dB hybrid 300 with quadrature output and an isolation port followed by phase shifting elements φ2, two identical filters 302 and 304 or tuned filters with the characteristics Hi(s), and then followed by a second coupler, such as a −3 dB hybrid 312 with quadrature output and a terminated isolation port.

In further embodiments, embodiment isolated filter structures (Ao) and (Bo) shown in FIGS. 4a and 4b may be further modified as shown in FIGS. 4c-j. Variants (Ai) use lead-lag, poly phase or phase shifting networks followed by 3 dB combiner (RX) or 3 dB splitter (TX) to recombine the quadrature signals for providing a filtered signal path from port (1) to port (3) in RX or from port (3) to port (1) for TX; and variants (Bi) use second −3 dB hybrids for providing a filtered signal path from port (1) to port (3) in RX or from port (3) to port (1) for TX.

Figure 4C:
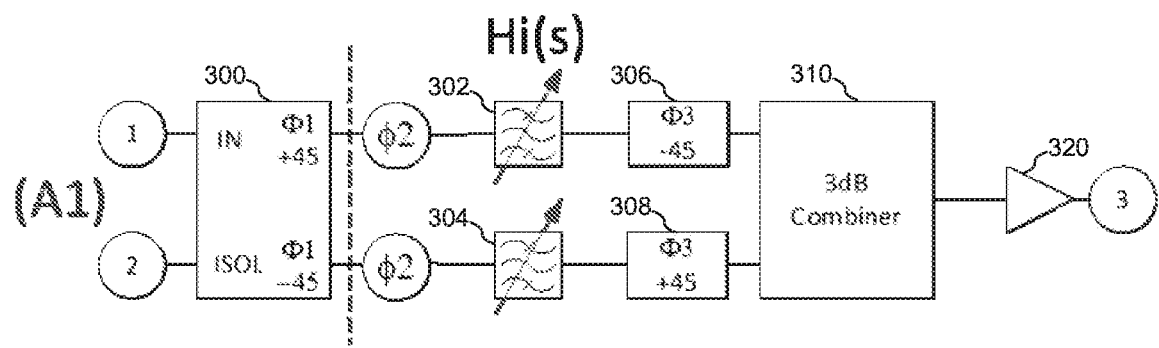
Figure 4D:
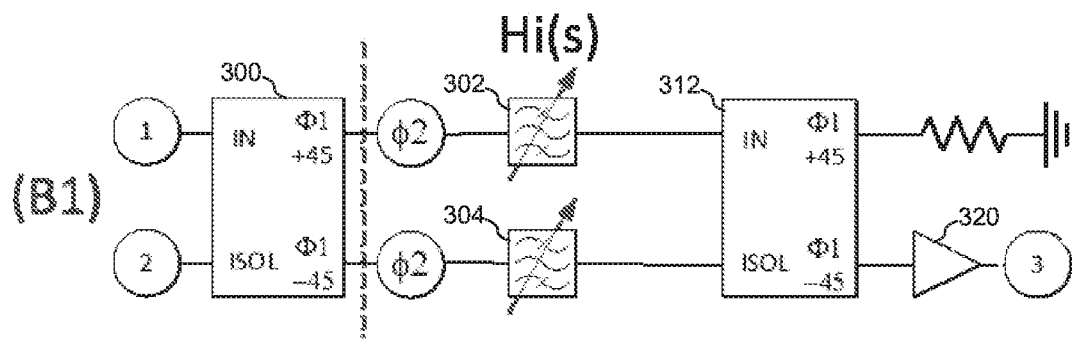

For example, the input of an amplifier, such as an LNA 320, may be coupled to port 3 with respect to isolated filter structure A1 illustrated in FIG. 4c and isolated filter structure B1 illustrated in FIG. 4d. These variants A1 and B1 provide a RX path and are suitable for use as a receiver. In some cases, however, there may be some sensitivity to source pulling at port 1.

Figure 4E:
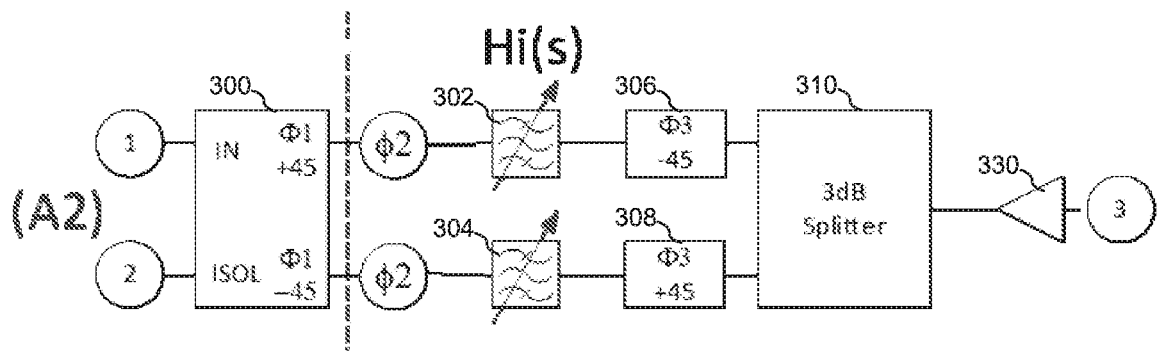
Figure 4F:
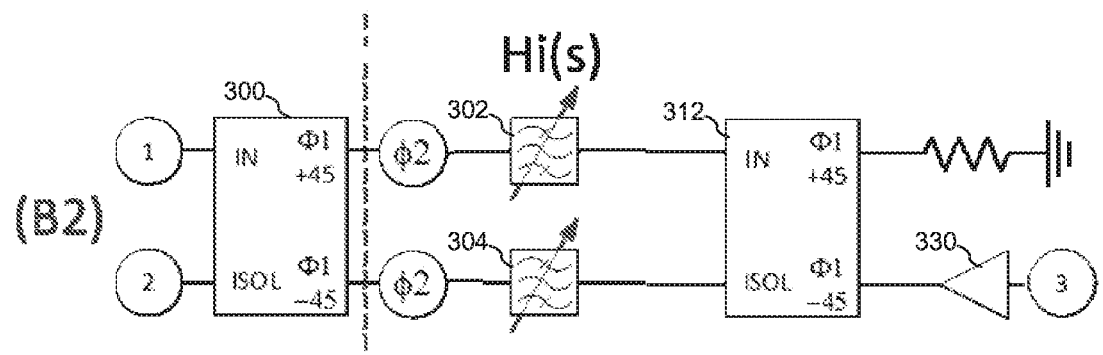

In further embodiments, the output of an amplifier 330 is coupled to port 3 with respect to isolated filter structure A2 illustrated in FIG. 4e and isolated filter structure B2 illustrated in FIG. 4f. These variants A2 and B2 provide a TX path and an amplifier of good noise figure. Such structures may be used in cases in which blocker signals from an antenna coupled to port 1 causes intermodulation products generated by the TX amplifier and falling in the RX band bounces back to port (i). Accordingly, the equivalent RX path (bandpass filter+LNA) of a band could be located at port 2.

Figure 4G:
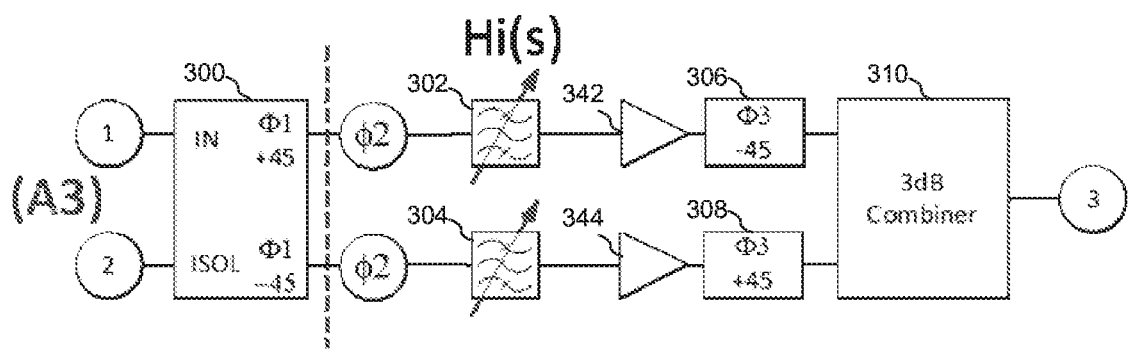
Figure 4H:
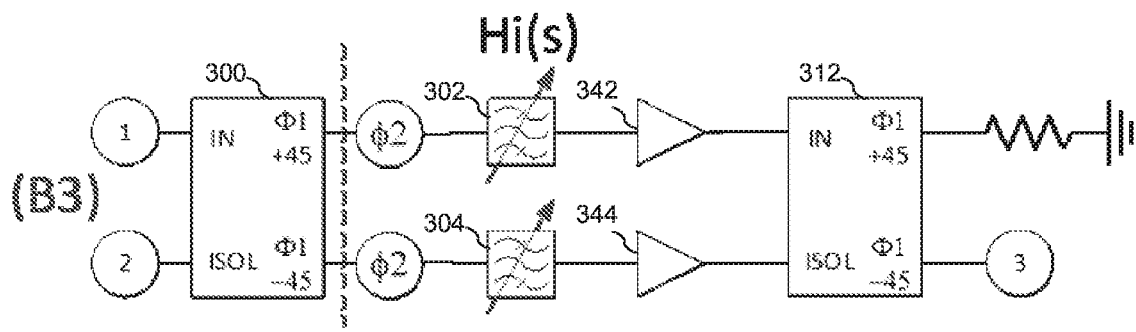

In an embodiment, inputs of amplifiers 342 and 344 may be coupled to the bandpass filters 302 and 304 with respect to isolated filter structure A3 illustrated in FIG. 4g and isolated filter structure B3 illustrated in FIG. 4h. These variants A3 and B3 prevent source pulling of the RX amplifier but may introduce some noise figure degradation due to the uncorrelated noise nature of both parallel amplifiers.

Figure 4I:
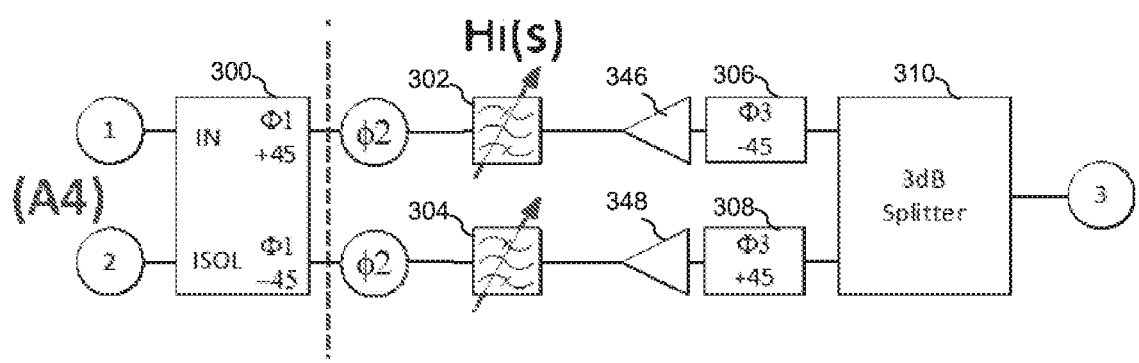
Figure 4J:
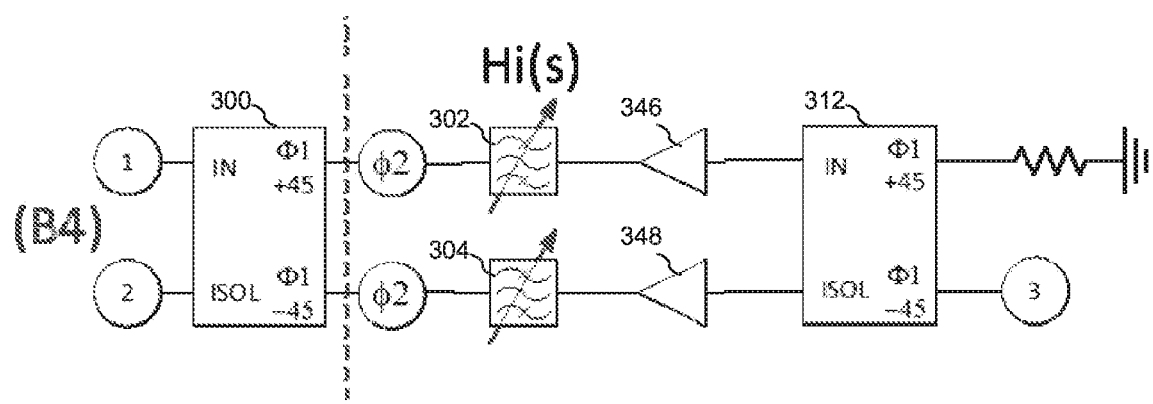

In a further embodiment, outputs of amplifiers 346 and 348 may be coupled to the bandpass filters 302 and 304 with respect to isolated filter structure A4 illustrated in FIG. 4i and isolated filter structure B4 illustrated in FIG. 4j. These variants A4 and B4 prevent load pulling of the TX amplifier but may introduce some noise figure degradation due to the uncorrelated noise nature of both parallel amplifiers. Such an embodiment may be utilized, for example, in systems in which the VSWR effect of an antenna coupled to port 1 is mitigated by the 2 TX amplifiers such that summation output power at port 1 and TX amplifier supply current does not vary as much over VSWR as other solutions, for example, variants A2 and B2. In an embodiment, as the VSWR at port 1 changes, the relative powers delivered by the two power amplifiers change. However, the power delivered to port 1 stays relatively or substantially constant. In some embodiments, a receiving circuitry may be coupled to port 2. For example, a duplexer or diplexer could be coupled to port 2 followed by additional filtering and one or more LNA circuits. In one embodiment the duplexer or diplexer splits the frequency content at port to into a band having frequencies higher than the passband of Hi(s) and another band having frequencies lower than the passband of Hi(s). It should be understood that the isolated filter variants described with respect to FIGS. 4a-4j are only examples of embodiment isolated filter variants. In alternative embodiments, other variants may be implemented.

In an embodiment, the variants described above and illustrated in FIGS. 4a-4j may be further modified to include a deactivation mode, such as a tri-state or bypass mode as illustrated with respect to FIGS. 5a-5g. While the deactivation mode variants are applied to variants Ao and Bo described above, deactivation modes may be applied to all variants described above, as well as to other embodiment variants not explicitly described herein.

In an embodiment, bandpass/bandstop isolated filter cores 302 and 304 may be bypassed if port 3 is unused, hence achieving better performance in port 1 to port 2 transmission. In other words, bypassing or disconnecting the isolated filter cores 302 and 304 reduces loading the port 1 to port 2 transmission path. For example, the isolated filter may be disconnected with switches S2 and port 1 may be directly connected to port 2 via switch SW1 as shown with respect to variant Aosw1 in FIG. 5a and variant Bosw1 in FIG. 5b.

Using switch SW1 between ports 1 and 2 provides a low loss path when port 3 is not being used.

Figure 5A:
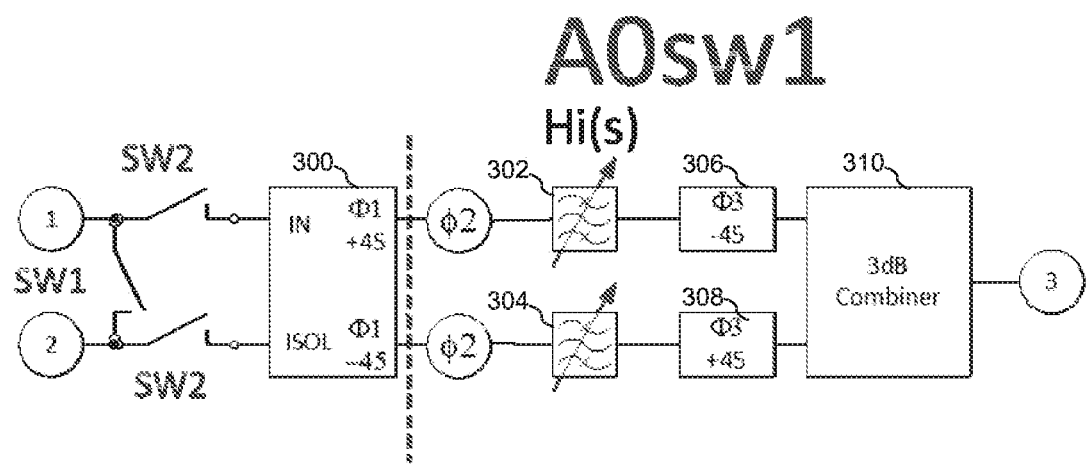
Figure 5B:
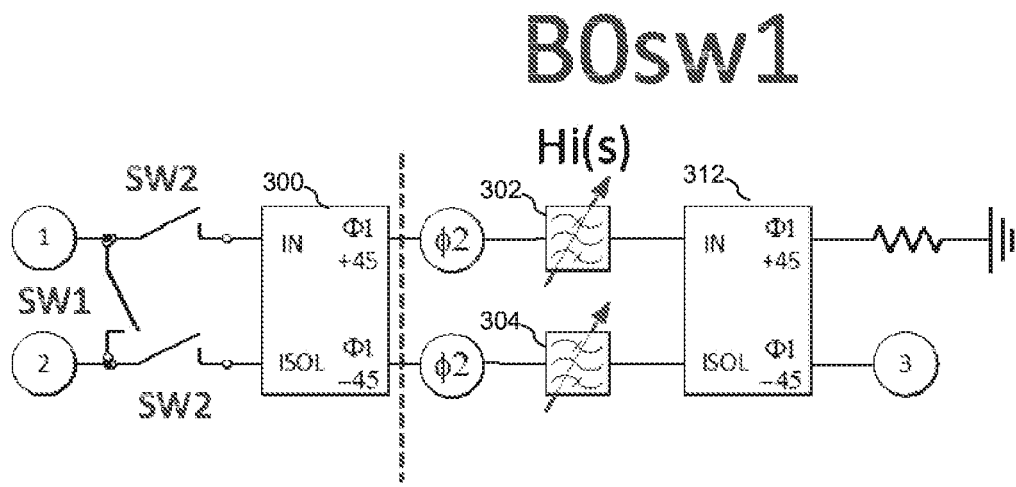
Figure 5C:
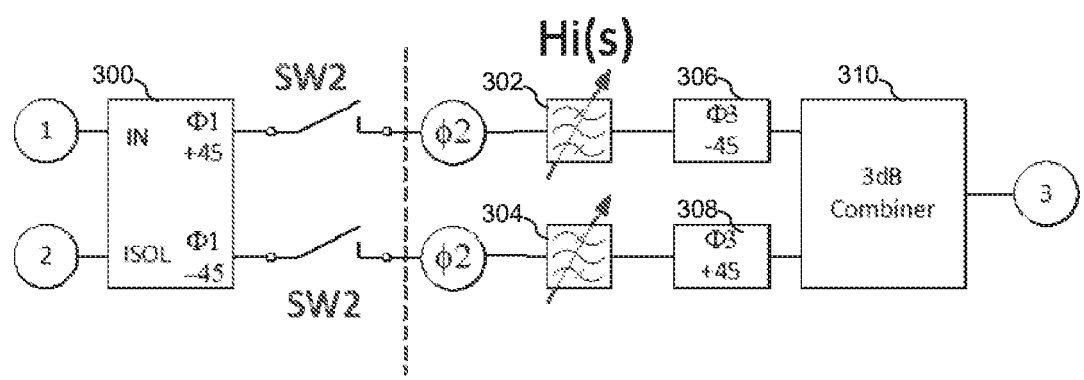
Figure 5D:
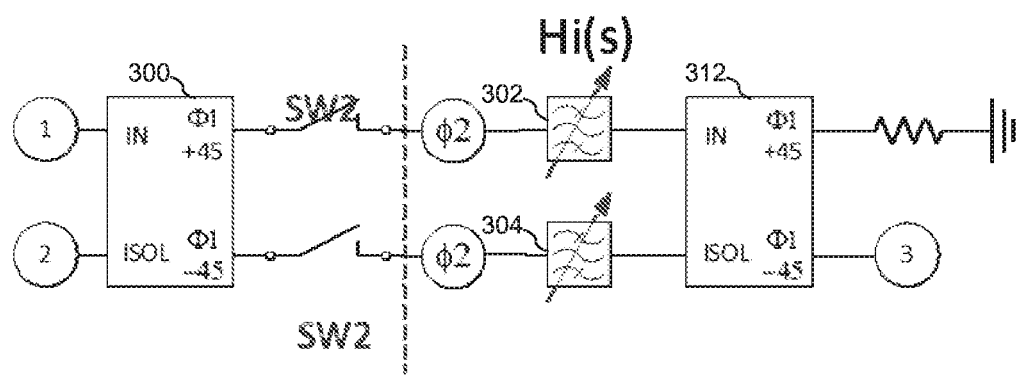

In a further embodiment, the isolated filter core may be disconnected via switches SW2 coupled between the input hybrid 300 and the isolated filter structures 302 and 304 as shown with respect to variant Aosw2 in FIG. 5*c* and variant Bosw2 in FIG. 5*d*. In an embodiment, opening switches SW2 creates a highly reflective impedance plane (i.e., an RF open) at the output of the hybrid structure 300, thereby creating a low-loss path over a wide frequency. Variants Aosw2 and Bosw2 are especially suitable for embodiments that utilize inductors, as opening switches SW2 may prevent DC current losses in such inductors.

Figure 5E:
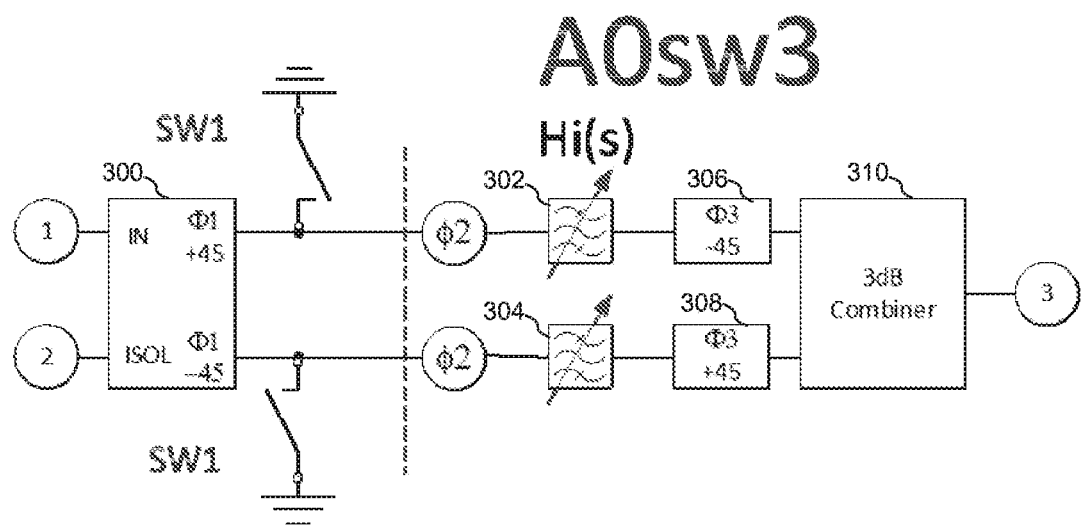
Figure 5F:
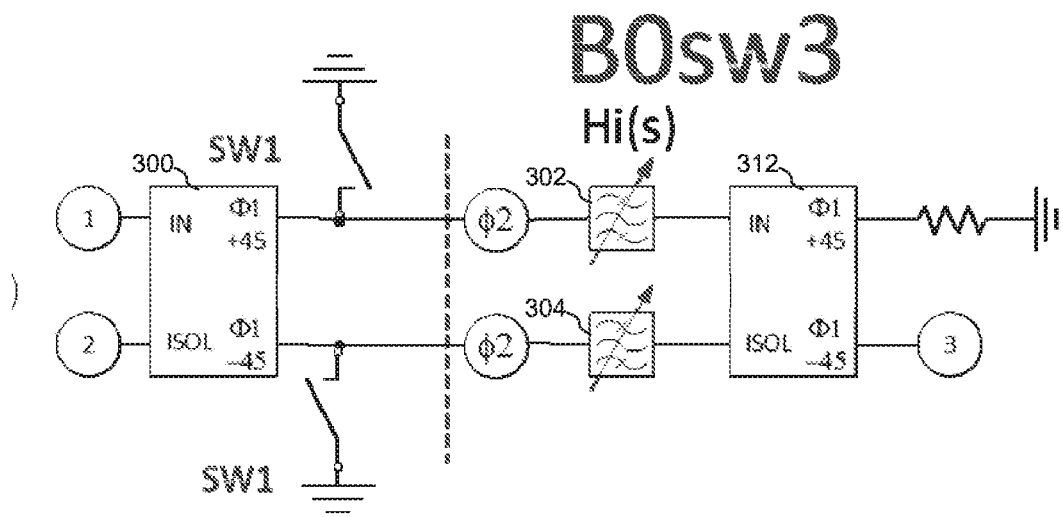

The isolated filter core may be further disconnected via switches SW1 coupled to ground between the input hybrid and the isolated filter structures as shown with respect to variant Aosw3 in FIG. 5*e* and variant Bosw3 in FIG. 5*f*. In an embodiment, closing switches SW1 creates a highly reflective impedance plane (i.e. an RF short) at the output of the hybrid structure 300, thereby creating a low-loss path over a wide frequency.

FIG. 5*g* illustrates a table describing the setting of the various switches with respect to mode setting for the embodiments illustrated in FIGS. 5*a*-5*f* and described above.

Figure 6A:
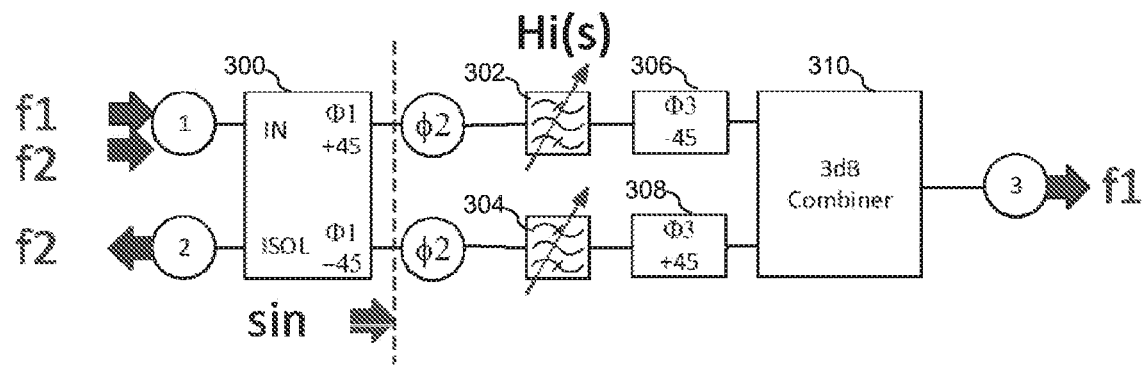
FIGS. 6a and 6b illustrate simulation schematics for embodiment isolated filter structures.
Figure 6B:
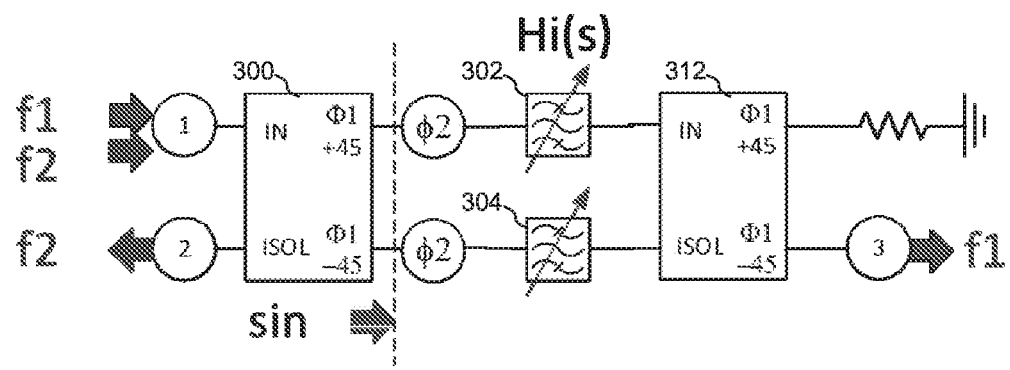

FIGS. 6*a* and 6*b* illustrate simulation diagrams for variants Ao and Bo, respectively. As shown, a first signal at frequency f1 has a frequency that falls within the passband of bandpass filter Hi(s) and a second signal at frequency f2 has a frequency that falls in the stopband of bandpass filter Hi(s). Accordingly, frequency f1 is transmitted from port 1 through bandpass filter Hi(s) to port 3. On the other hand, frequency f2 is reflected by filter Hi(s) and transmitted to port 2. In other words, Hi(s) is transparent for frequency f1 (pass-band) and reflective (stop-band) for frequency f2.

During operation, signal f1 applied to port 1 is split into two quadrature signals by the left quadrature hybrid 300 that passes through the bandpass filters 302 and 304 and are recombined through the phase recombination block 310 or 312 (second quadrature hybrid on the right or lead-lag/polyphase filter or phase shifter splitter combination on the right) to port 3. All non-f1 frequencies that are outside of the passband of filter Hi(s) applied to port 1 are also spilt into quadrature signals but are reflected back at the filter Hi(s) and are reconstructed in phase at the left side quadrature hybrid at port 2. Accordingly, frequencies may be split into a bandpass transition from port 1 to port 3 and into an inverse pass-band=stop band transition from port 1 to port 2.

In various embodiments, Hi(s) may be implemented using a fixed frequency filter or a tunable filter. Hi(s) may be a low-pass filter, so that the port 1 to port 3 transition follows a low-pass characteristic and the port 1 to port 2 transition follows an inverse low-pass=high pass characteristic. In another embodiment, Hi(s) may be a high-pass filter, so that the port 1 to port 3 transition follows a high-pass characteristic and the port 1 to port 2 transition follows an inverse high pass=low pass characteristic. In another embodiment, Hi(s) may be a band-pass filter, so that the port 1 to port 3 transition follows a band-pass characteristic and the port 1 to port 2 transition follows an inverse band pass=band stop characteristic. In further embodiment, Hi(s) may be a band-stop filter, so that the port 1 to port 3 transition follows a band-stop characteristic and the port 1 to port 2 transition follows an inverse band stop=band pass characteristic. In all scenarios above, the filter function Hi(s) and its inverse filter function track each other by manipulating Hi(s).

In some embodiments, port 1 and port 2 are well matched compared to traditional filters. Moreover, port 3 has a very good match compared to a traditional filter, for example, when a second hybrid instead of lead-lag, poly-phase filters or phase delays elements and power splitter are used. In an embodiment, the bypass mode as described above may be added too to maintain very good performance, when port 3 transmission is not desired or required.

FIGS. 7*a*-7*d* and 8*a*-8*d* illustrate transmission and reflection plots of an embodiment isolated filter structure with to illustrate their dependency on common mode phase rotation φ2. FIGS. 9*a*-9*d* illustrate the case of a low impedance reflection mode when the hybrid is terminated by very low impedance at reflected frequencies f2, and FIGS. 8*a*-8*d* illustrate the case of a high impedance reflection mode when the hybrid is terminated by a very high impedance at reflected frequencies f2.

Figure 7A:
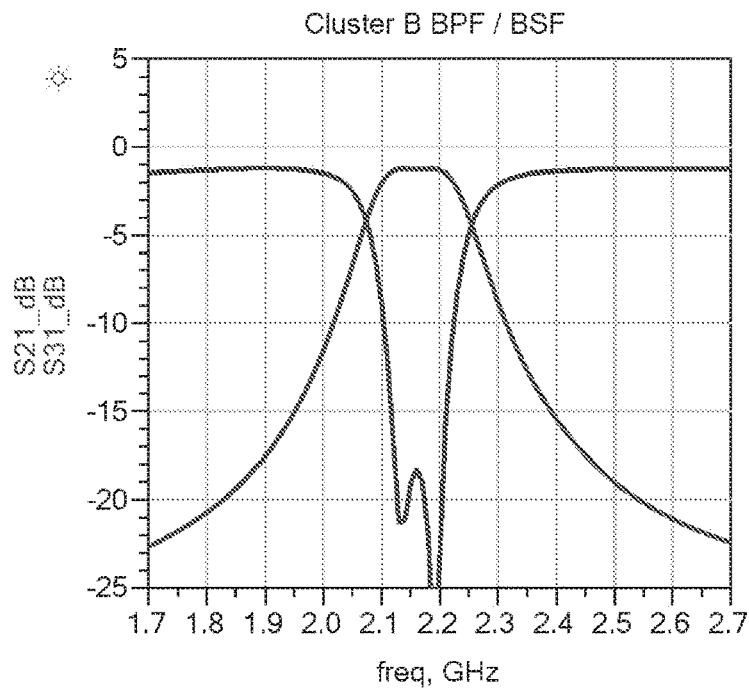
FIGS. 7a-7d illustrate s-parameters for an embodiment isolated filter structure in a low impedance reflection mode.
Figure 7B:
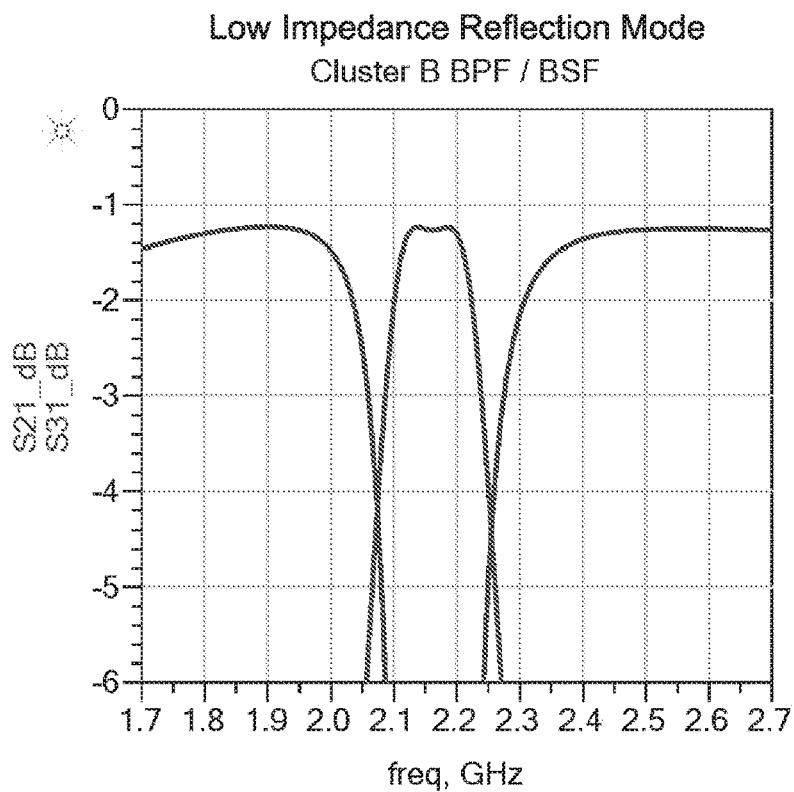
Figure 7C:
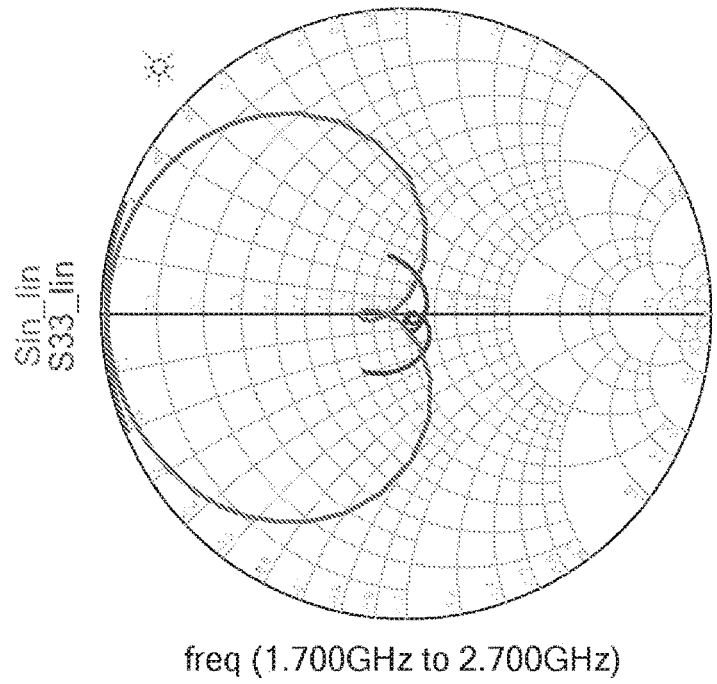
Figure 7D:
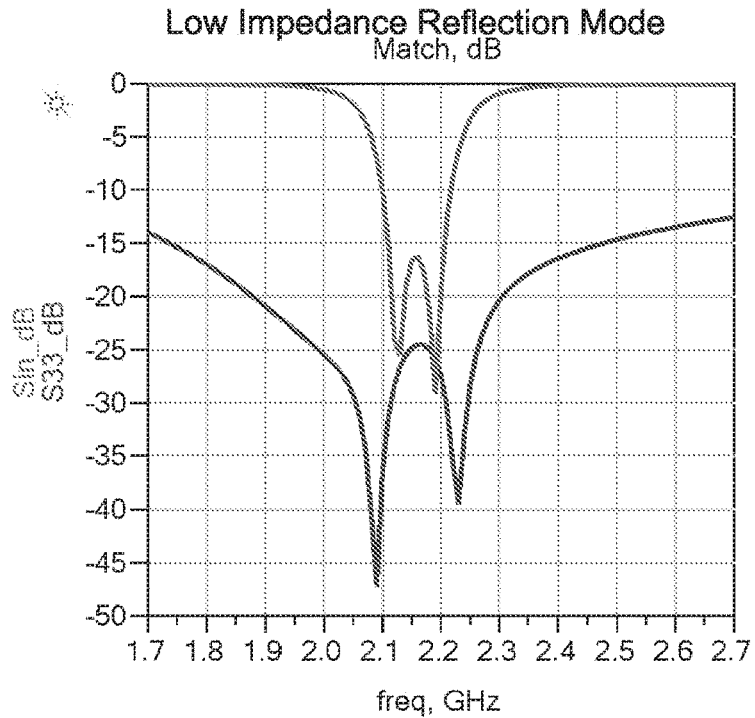

FIG. 7*a* illustrates S21 and S31 in a low impedance reflection mode. As shown, S21 has a loss of about 1.5 dB for low and high frequencies. FIG. 7*b* is magnified scale version of FIG. 7*a*. FIG. 7*c* illustrates a Smith chart showing the input reflection coefficient of the filter itself (Sin_Iin) and the input reflection coefficient of port 3 (S33_Iin). As can be seen by the Smith Chart, the input reflection coefficient for port 3 stays closer to the center of the Smith chart than the input reflection coefficient of the filter itself. FIG. 7*d* illustrates the return loss for seen at the filter itself (Sin_dB) and port 3 (S33_dB). As shown, the return loss for port 3 is better than about 12 dB over all frequencies signifying a good broadband input match.

Figure 8A:
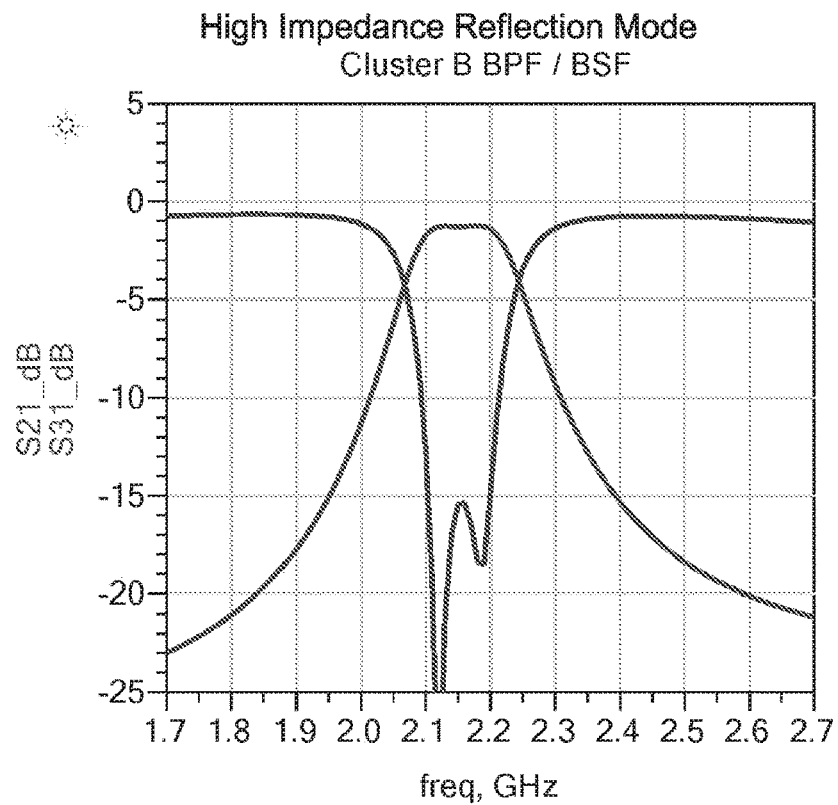
FIGS. 8a-8d illustrate s-parameters for an embodiment isolated filter structure in a high impedance reflection mode.
Figure 8B:
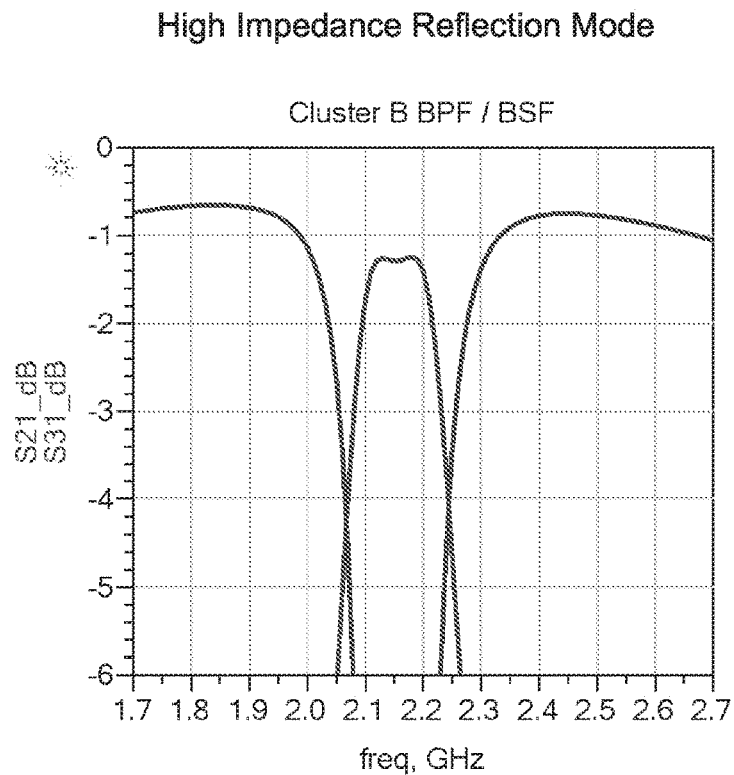
Figure 8C:
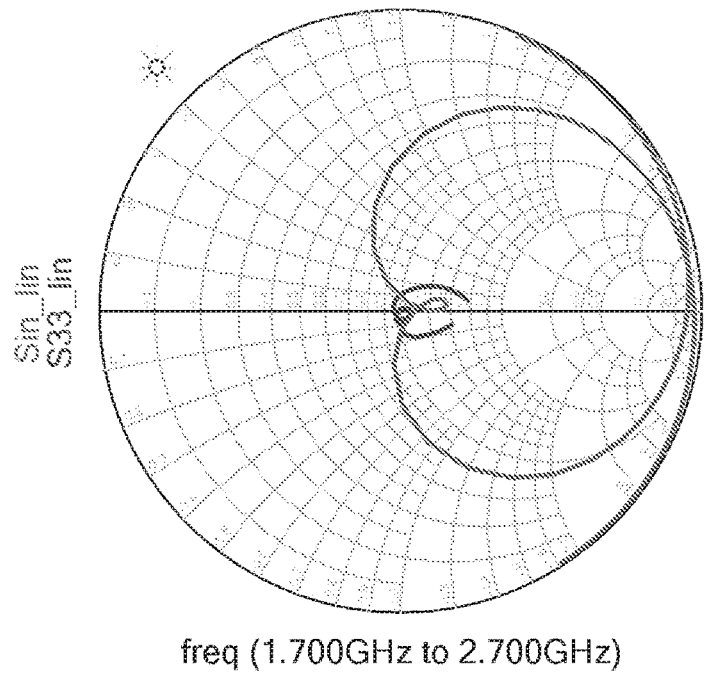
Figure 8D:
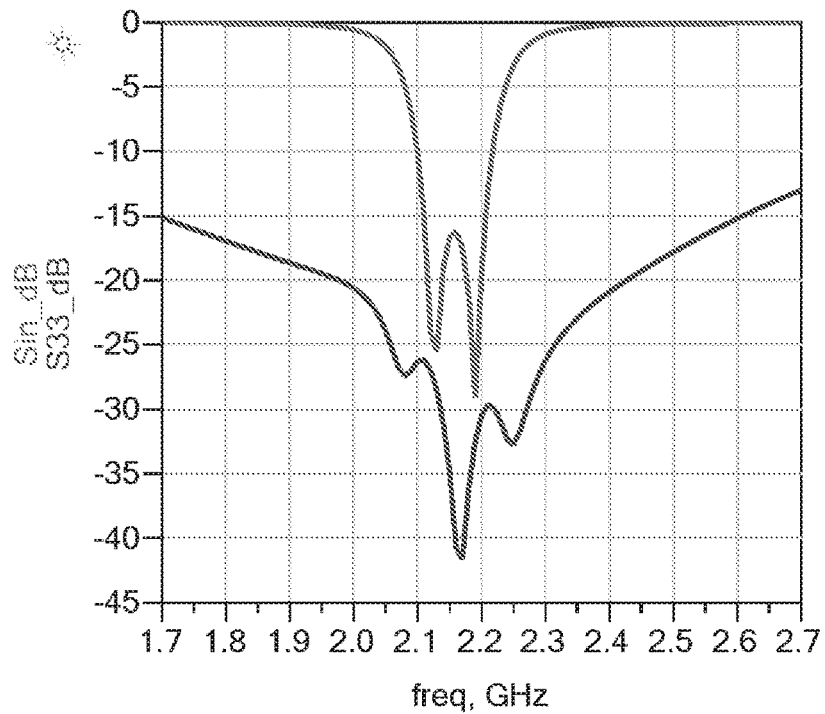

FIG. 8*a* illustrates S21 and S31 in a high impedance reflection mode. As shown, S21 has a loss of about 1.0 dB for most low and high frequencies. FIG. 8*b* is magnified scale version of FIG. 8*a*. FIG. 8*c* illustrates a Smith chart showing the input reflection coefficient of the filter itself (Sin_Iin) and the input reflection coefficient of port 3 (S33_Iin). As can be seen by the Smith Chart, the input reflection coefficient for port 3 stays closer to the center of the Smith chart than the input reflection coefficient of the filter itself. FIG. 8*d* illustrates the return loss for seen at the filter itself (Sin_dB) and port 3 (S33_dB). As shown, the return loss for port 3 is better than about 15 dB over all most frequencies signifying a good broadband input match. The two variants illustrate that the left side hybrid has more loss if it terminated by low impedances. This has to do with the relative low Q causing resistive losses of the series inductors and its mutual coupling in the hybrid if it is loaded with a low impedance resulting in large currents through the inductor compared to the relatively low currents/low losses through the inductor with high impedance loading, such coupling is maintained though the capacitors of the hybrid, which normally have higher Q than the inductors. Therefore, in some embodiments, insertion loss may be refined and/or optimized by setting the phase φ2 to operate the hybrid in a low loss region, of the dominant coupling mechanism. Theoretically it could be the low impedance loading, if the inductor Q was much better than the Capacitor Q.

Figure 9A:
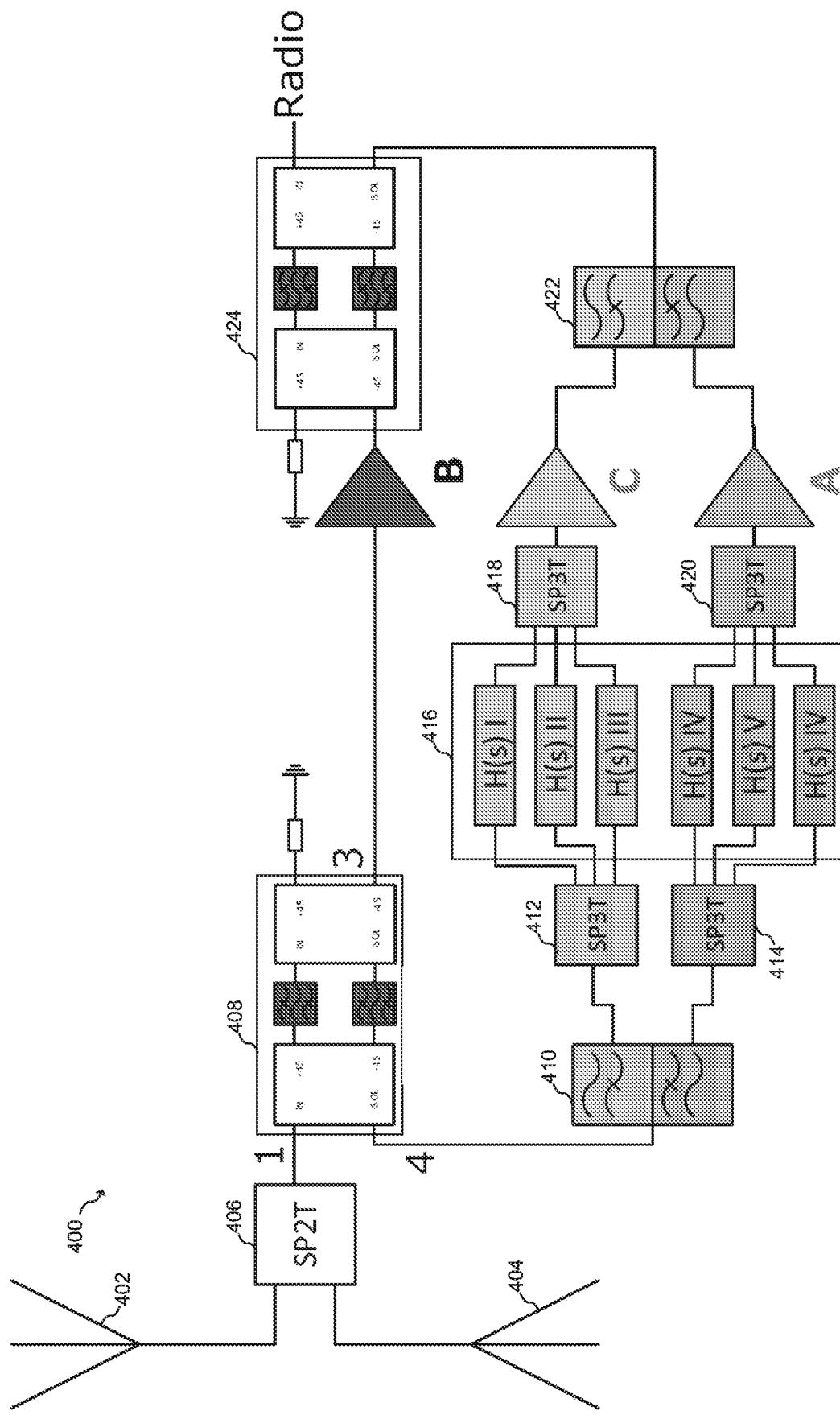
FIGS. 9a-9c illustrate a block diagram of an embodiment RF system and corresponding s-parameter plots of the post LNA B isolated filter structure.
Figure 9B:
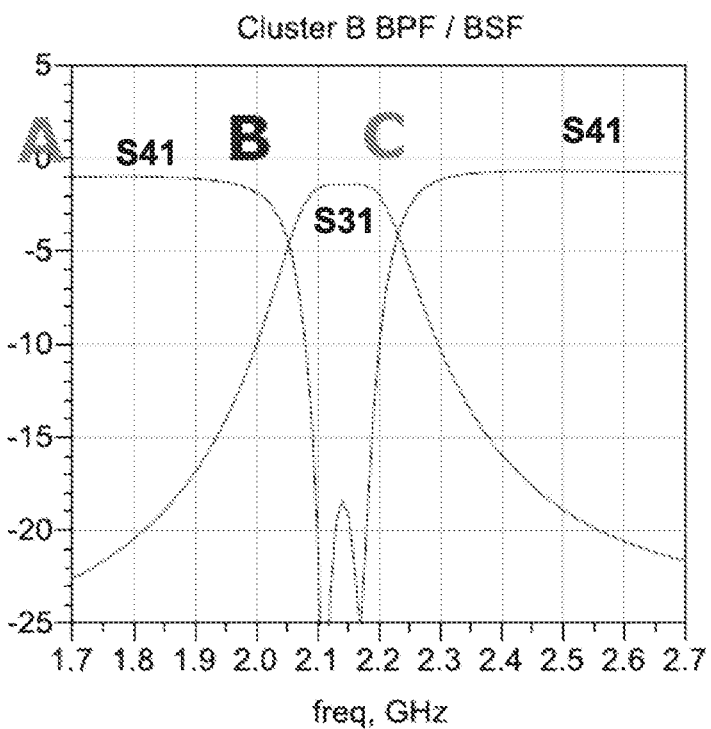
Figure 9C:
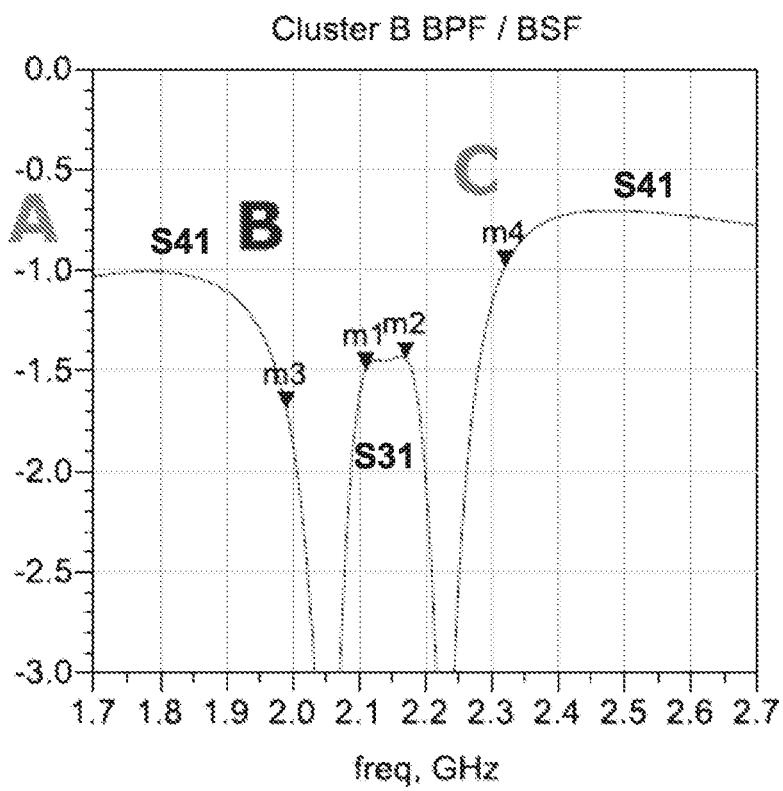

FIGS. 9*a*-9*c* illustrate an embodiment RF system and corresponding performance plots. FIG. 9*a* illustrates an RF system 400 in which an embodiment isolated filter structure 408 is coupled to antennas 402 and 404 via a switch 406 at port 1. The mid-band frequencies are passed through the passband of the isolated filter structure 408 though port 3 and are amplified by LNA B. High and low frequencies taken from port 4 of the isolated filter structure 408 are split by a conventional diplexer 410 into a high-band and a low-band, selected and filtered by various RF switches 412 414, 418 and 420 and filter bank 416, amplified by LNAs A and C, and then recombined using a second conventional diplexer 422. Alternatively, the two conventional diplexers may be implemented using embodiment isolated filter structures. The recombined outputs of LNAs A and C are combined with the mid-band output of LNA B using embodiment isolated filter structure 424.

FIG. 9*b* illustrates transmission plots for S41 and S31 that show how the midband output of LNA B is selectively filtered with respect to the outputs of LNAs A and B. FIG. 9*c* is a magnified scaled version of FIG. 9*b* showing that the midband S13 response has less than 1 dB of attenuation with respect to the high and low band S14 response. It should be understood that the transmission plots of FIGS. 9*b* and 9*c* are just one specific example of the performance of an embodiment system. The transmission responses of other embodiment circuits may differ in shape and in magnitude.

Figure 10A:
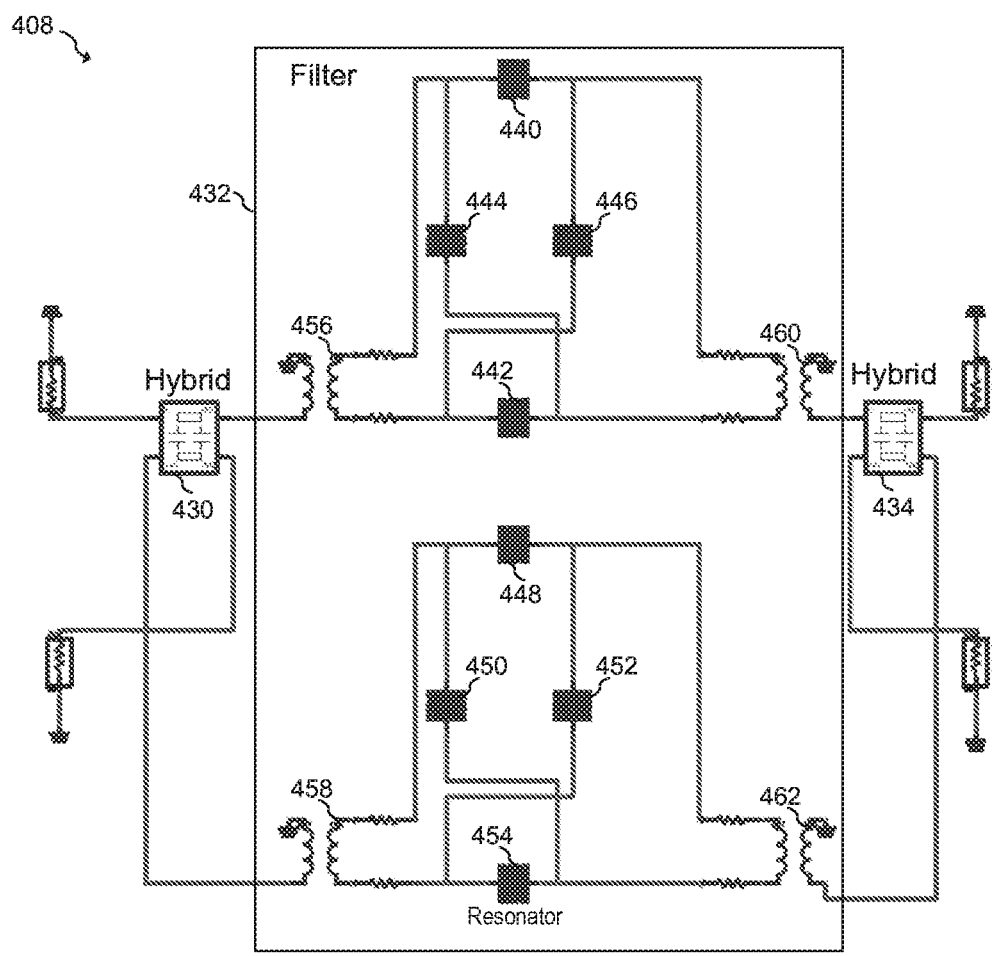
FIGS. 10a-10c illustrate schematics of an embodiment isolated filter structure.

FIG. 10*a* illustrates a schematic of an embodiment implementation of the first isolated filter structure 408 shown in FIG. 9*a*. Isolated filter structure 408 includes a first hybrid transformer 430 coupled to the input of filter 432 and a second hybrid transformer 434 coupled to the output of filter 432. In an embodiment, filter 432 is implemented using resonators 440, 442, 444, 446, 448, 450, 450 and 452 and coupled to hybrid transformer 430 via magnetic transformers 456 and 458 and to hybrid transformer 434 via magnetic transformers 460 and 462.

Figure 10B:
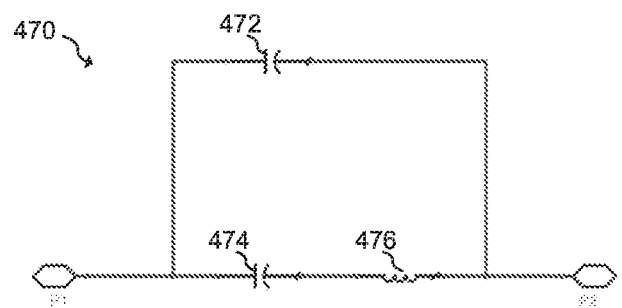

FIG. 10*b* illustrates a schematic of an example LC resonator 470 that may be used as a resonator element for resonators 440, 442, 444, 446, 448, 450, 452 and 454 shown in FIG. 10*a*. Resonator 470 includes capacitors 472 and 474 and inductor 476. Alternatively, resonator 470 may be implemented using such structures as SAW filters, BAW filters, FBAR filters, loosely coupled resonators, LC filters, tunable LC filters, microstrip filter or other filter structures.

Figure 10C:
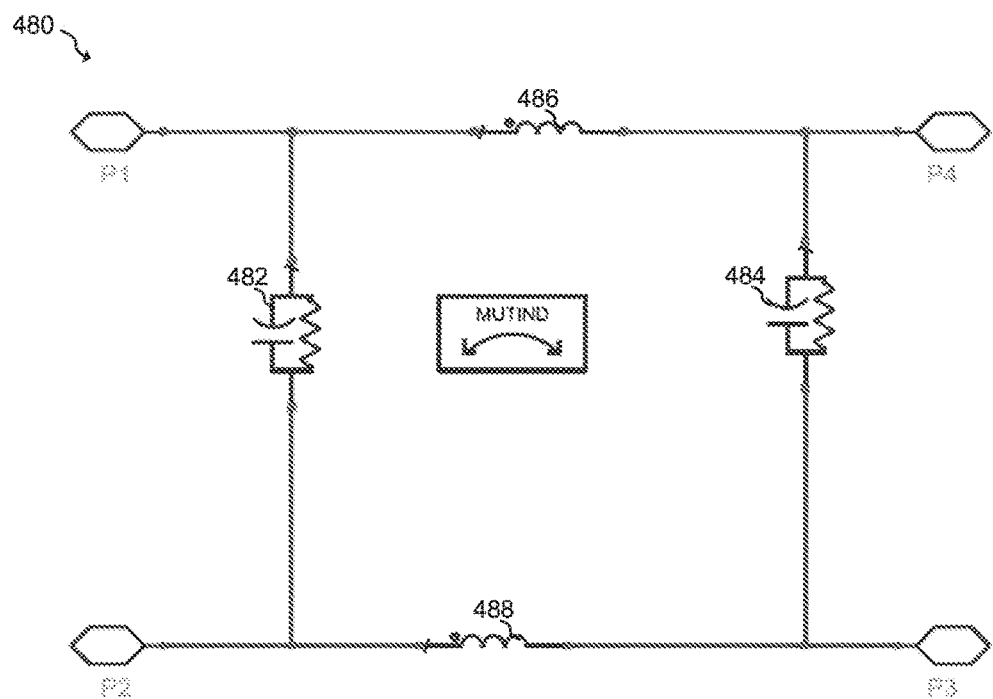

FIG. 10*c* illustrates a schematic of a transformer-based circuit that may be used to implement one or both of the isolated filter structures 408 and 424 illustrated in Figure boa. Hybrid 480 includes capacitors 482 and 484 and inductors 486 and 488. In some embodiments, inductors 486 and 488 may be mutually coupled, for example, using a common magnetic core and/or may be coupled as a result of close proximity between inductors 486 and 488. In some embodiments, inductors 486 and 488 may be implemented on an integrated circuit using a spiral inductor transformer. In alternative embodiments, isolated filter structures 408 and 424 may also be implemented using various −3 dB hybrid structures known in the art such as a Fisher coupler, Collins coupler, or other circuits providing signals in quadrature of equal signal level and providing an isolation port. These are for example quadrature branch couplers or rat race couplers.

Figure 11:
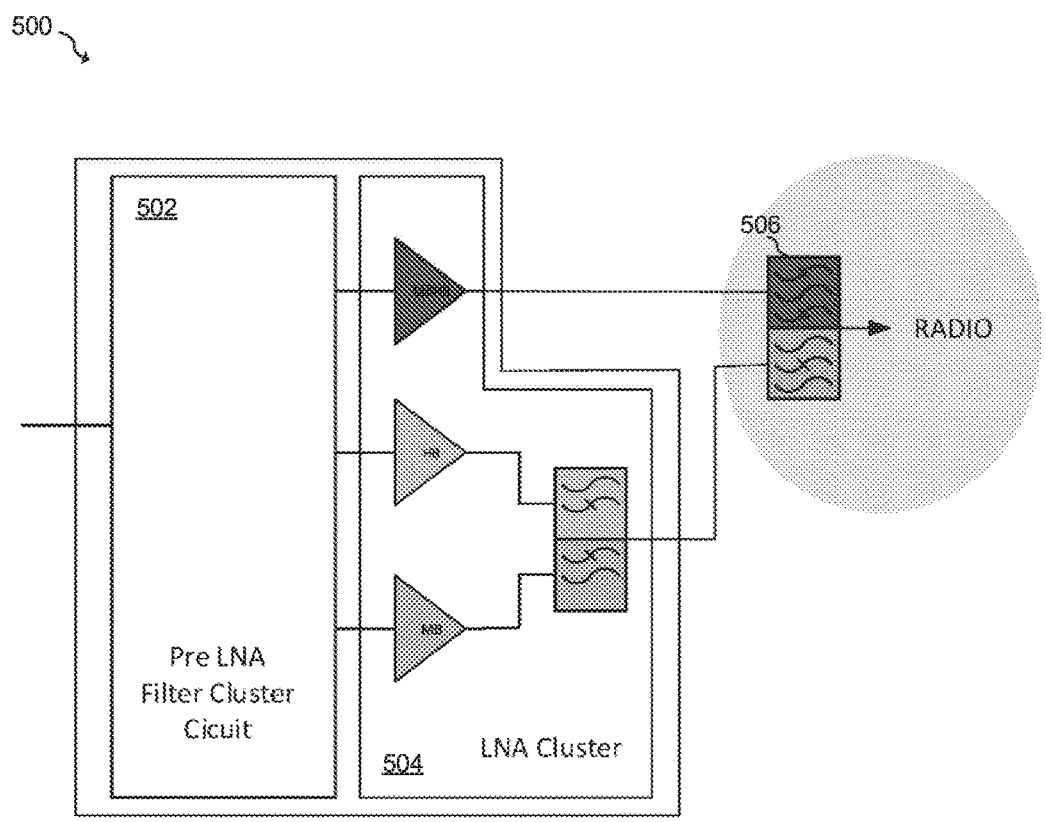
FIG. 11 illustrates a block diagram of an RF system.
Figure 12:
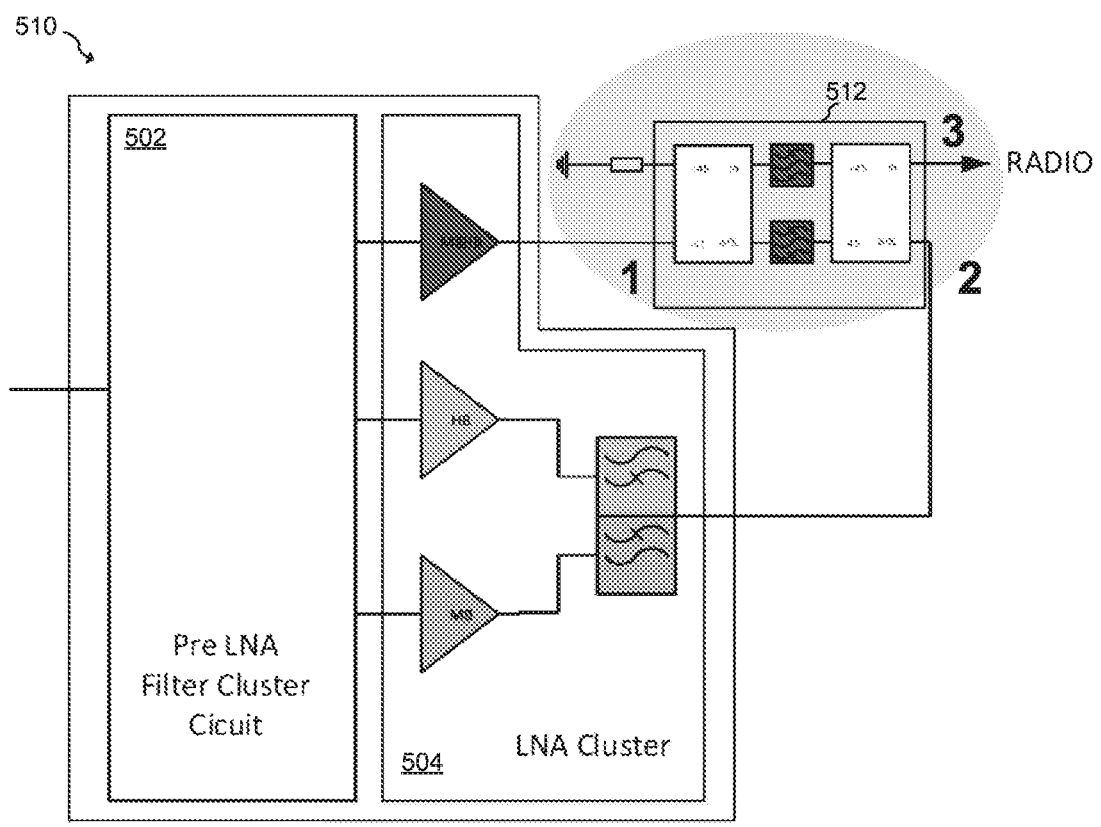
FIG. 12 illustrates a block diagram of a further RF system.

FIG. 11 illustrates a RF system 500 that includes a conventional pre-LNA filter cluster circuit 502, a conventional LNA cluster 504 and diplexer 506 that is configured to be coupled to a radio. FIG. 12 illustrates an embodiment RF system 510 that includes a conventional pre-LNA filter cluster circuit 502, a conventional LNA cluster 504 and a diplexer implemented using an embodiment isolated filter structure 512 in which the output of the mid-band LNA is coupled to port 1 of the embodiment isolated filter structure 512 and the output of the diplexer of the conventional LNA cluster is coupled to port 2 of the embodiment isolated filter structure 512. Port 3 of the embodiment isolated filter structure 512 is configured to be coupled to a radio. In the embodiment of FIG. 12, the isolated filter structure is configured to have a narrow bandpass function that passes the mid-band frequencies amplified by the mid-band LNA. The reflective ports of the isolated filter structure pass all remaining bands (i.e., the low-band and the high-band) from port 2 to port 3 but notch out the mid-band from the output of the conventional LNA cluster 504. This results in relaxed requirements for the diplexer of the conventional LNA cluster 504.

FIGS. 13*a*-13*b* show plots illustrating the performance of the isolated filter structure 512 structure of FIG. 12 in which the filter resonators are implemented with lattice type SAW resonators. FIG. 13*a* illustrates insertion loss S31 that represents the bandpass signal path of the embodiment filter structure, insertion loss S32 that represents the inverse of the bandpass signal path, and insertion loss S65 that represents the transfer function of the filter element within the isolated filter structure. As shown S31 only has a loss of about 1.3 dB in addition to the filter response itself. FIG. 13*b* illustrates insertion losses S32 and S31 at an expanded scale. FIG. 13*c* illustrates a plot of the return loss S22 for the filter with the hybrid and the return loss S55 for the filter without the hybrid. As can be seen by FIG. 13*c*, the SAW filter with the hybrid has better return loss characteristics than the SAW filter without the hybrid. FIG. 13*d* illustrates a Smith chart showing the reflection coefficients S22 and S33 for the port 2 and port 3, respectively.

Figure 14A:
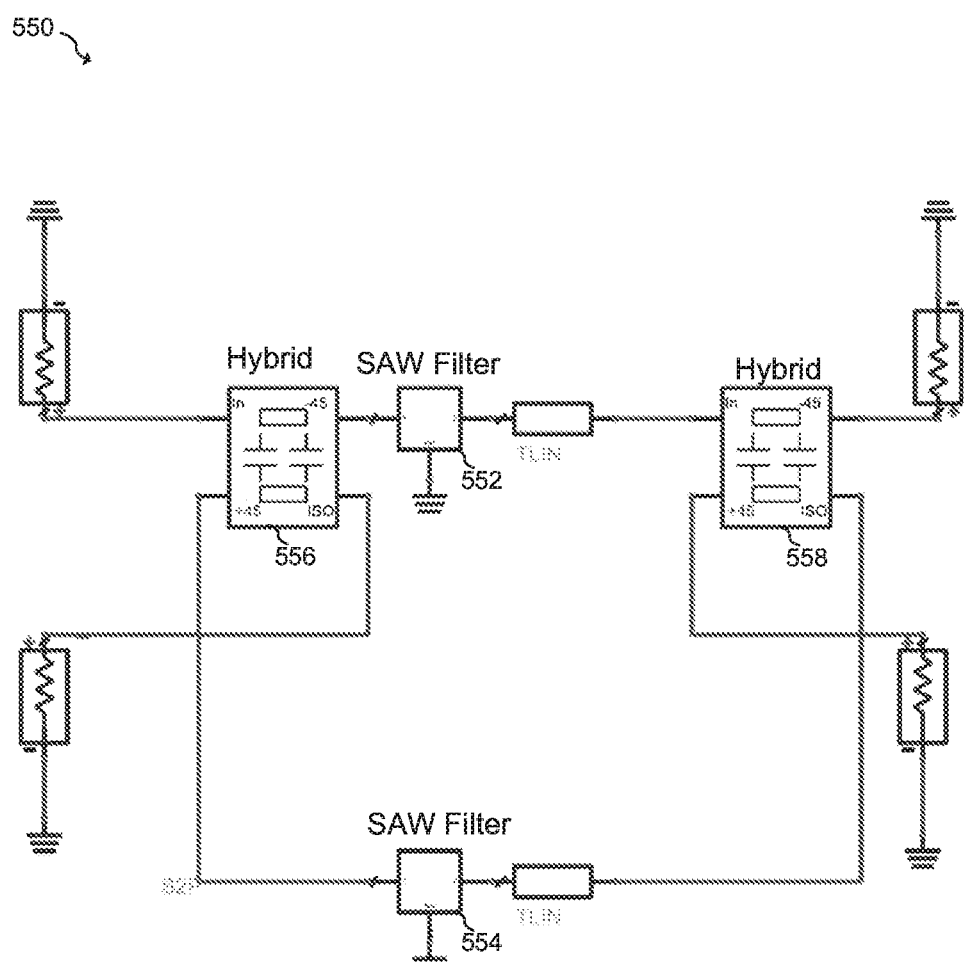
FIGS. 14a-14e illustrate schematics of an embodiment isolated filter structure and corresponding s-parameter plots.
Figure 14B:
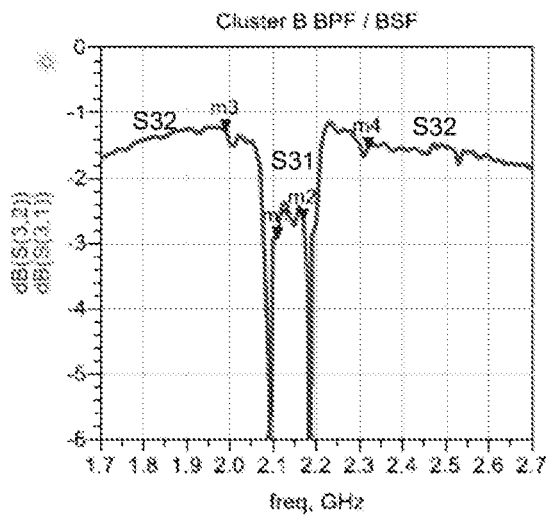
Figure 14C:
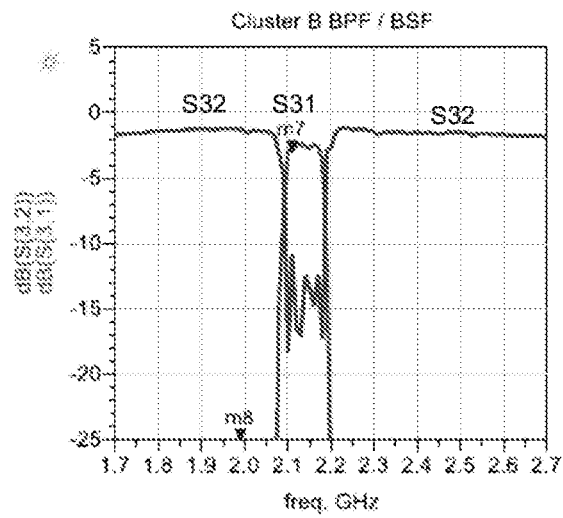
Figure 14D:
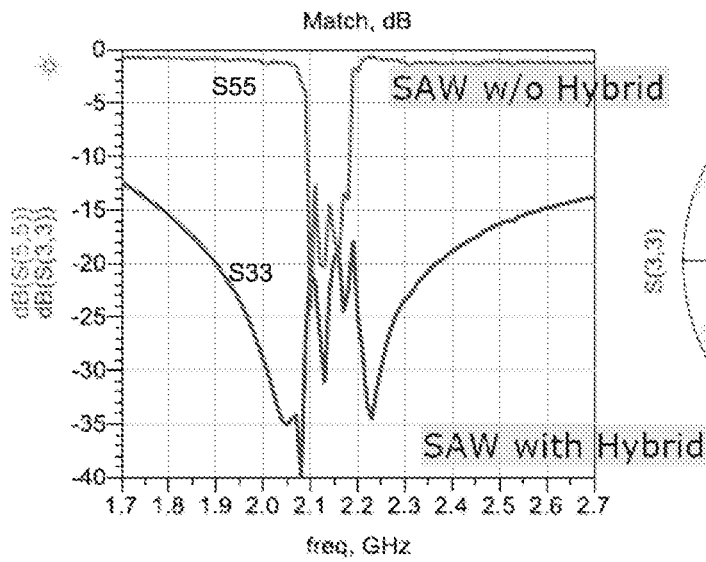
Figure 14E:
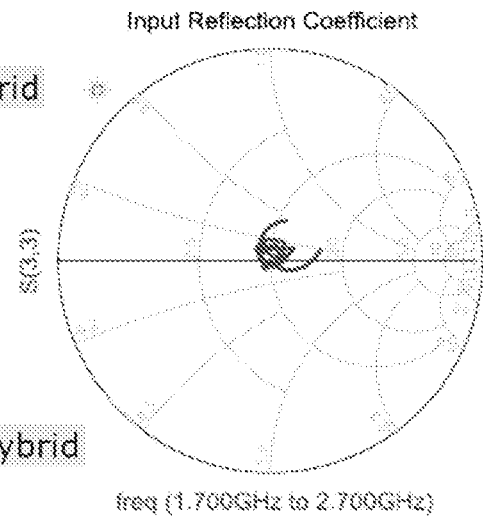

FIG. 14*a* illustrates an embodiment isolated filter 550 in which the filter is implemented using off-the-shelf SAW filters 552 and 554 in series with transmission lines coupled between two hybrids 556 and 558. FIG. 14*b* illustrates insertion loss S31 that represents the bandpass signal path of embodiment isolated filter structure 550, and insertion loss S32 that represents the inverse of the bandpass signal path. FIG. 14*c* illustrates insertion losses S32 and S31 at an expanded scale. FIG. 14*d* illustrates a plot of the return loss S33 for the filter with the hybrid and the return loss S55 for the filter without the hybrid. FIG. 14*e* illustrates a Smith chart showing the reflection coefficient S33 for port 3. In alternative embodiments of the present invention, filters 552 and 554 may be implemented using any piezoacoustic, LC or cavity filter known in the art.

Figure 15A:
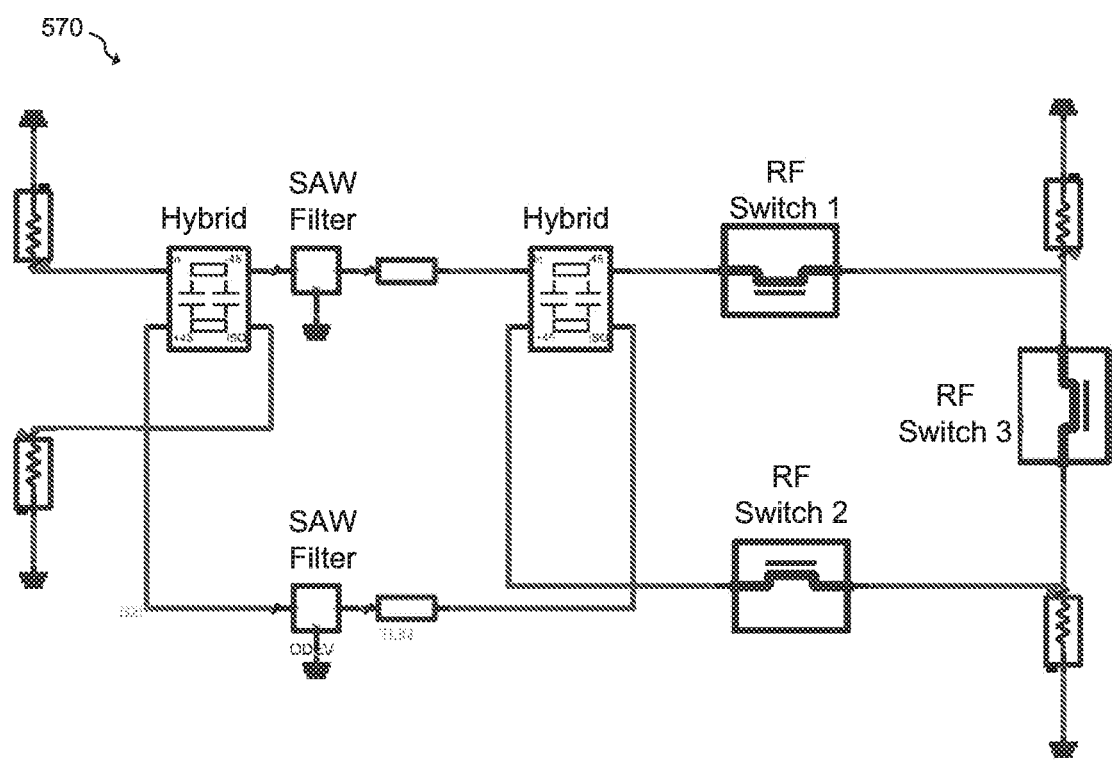
FIGS. 15a-15i illustrate schematics of a SAW filter based bypassable embodiment isolated filter structure and corresponding s-parameter plots.
Figure 15B:
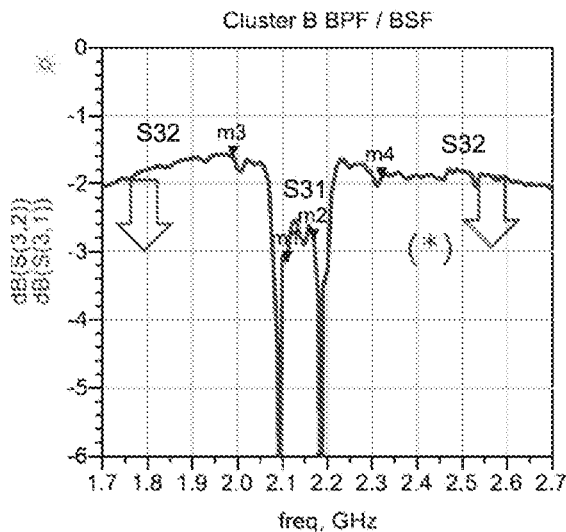
Figure 15C:
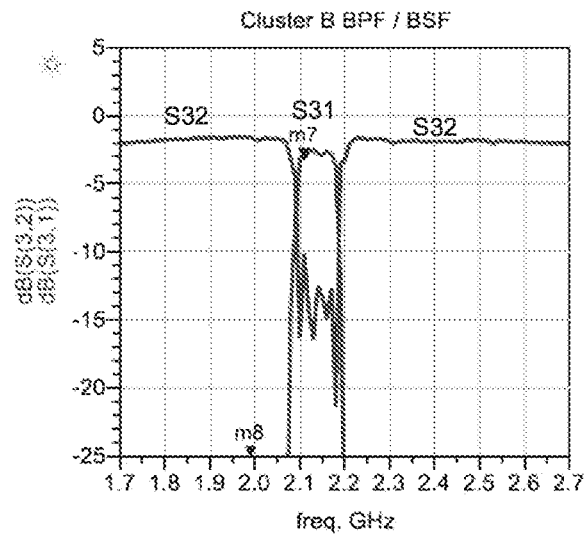
Figure 15D:
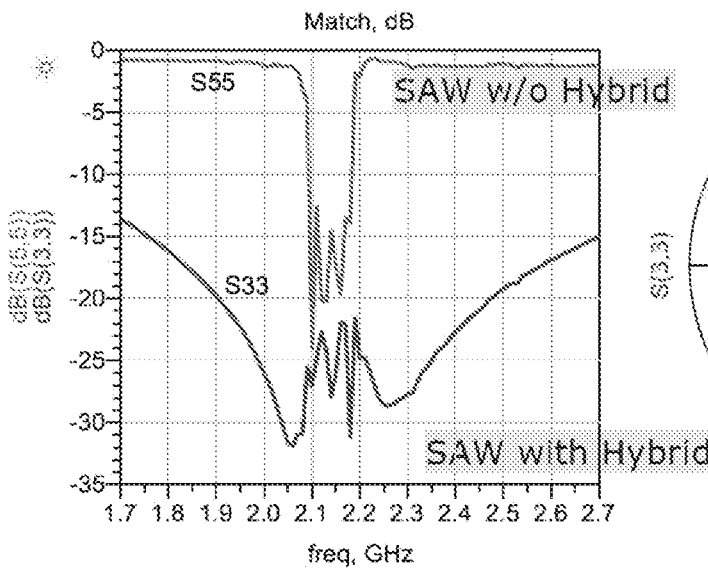
Figure 15E:
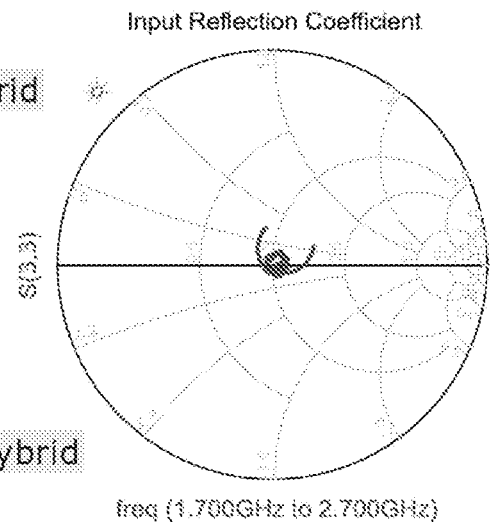
Figure 15F:
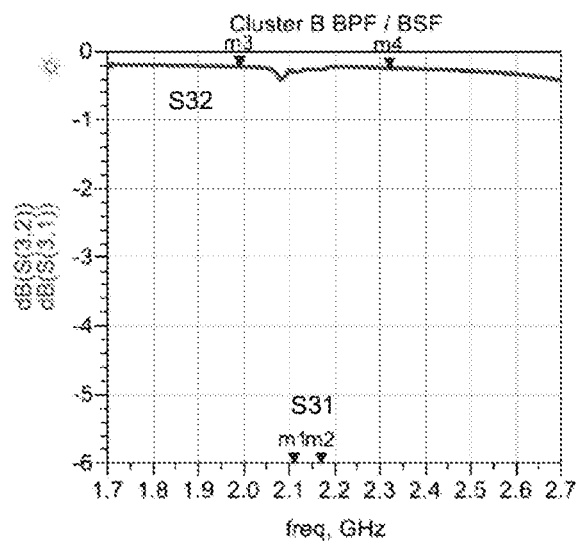
Figure 15G:
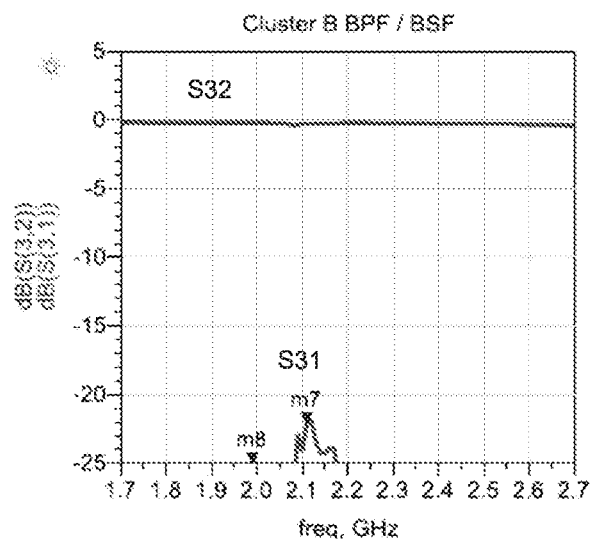
Figure 15H:
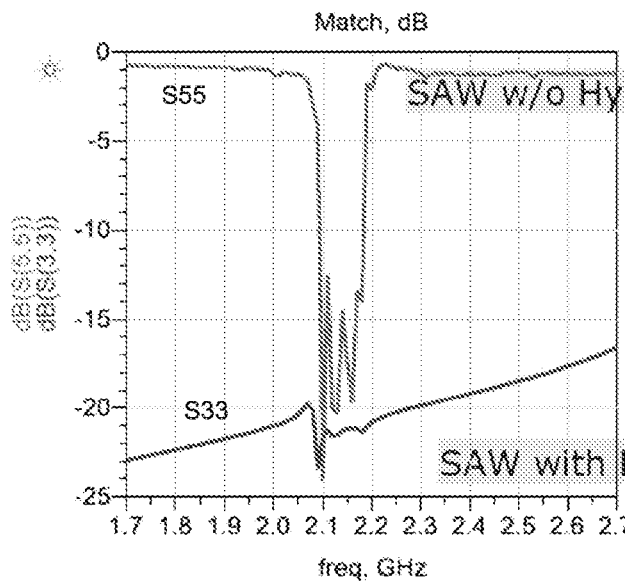
Figure 15I:
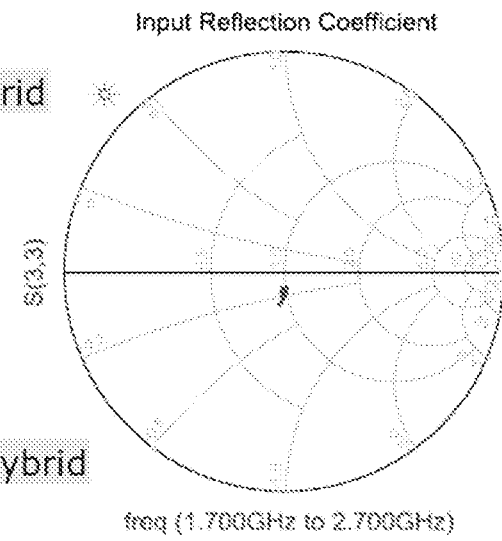

FIG. 15*a* illustrates an embodiment isolated filter structure 570 that includes RF switches for use in bypassing the filter path of the isolated filter structure 570. During bypass mode, RF switch 1 and RF switch 2 are opened and RF switch 3 is closed. When the filter is engaged, RF switch 1 and RF switch 2 are closed and RF switch 3 is opened. FIGS. 15*b*-15*e* illustrate S parameter plots for the embodiment isolated filter structure of FIG. 15*a* when the filter is engaged, i.e., when RF switch 1 and RF switch 2 are closed and RF switch 3 is opened. On the other hand, FIGS. 15*f*-15*i* illustrate S parameter plots for the embodiment isolated filter structure of FIG. 15*a* when the filter is bypassed, i.e., when RF switch 1 and RF switch 2 are open and RF switch 3 is closed. As can be seen in FIG. 15*g* insertion loss S31 is less than 3 dB when the filter path is engaged, but has a greater than 20 dB insertion loss when the filter is bypassed. Port 3 remains matched regardless of whether the filter is active or bypassed as seen in FIGS. 15*d*, 15*e*, 15*h* and 15*i*.

Figure 16A:
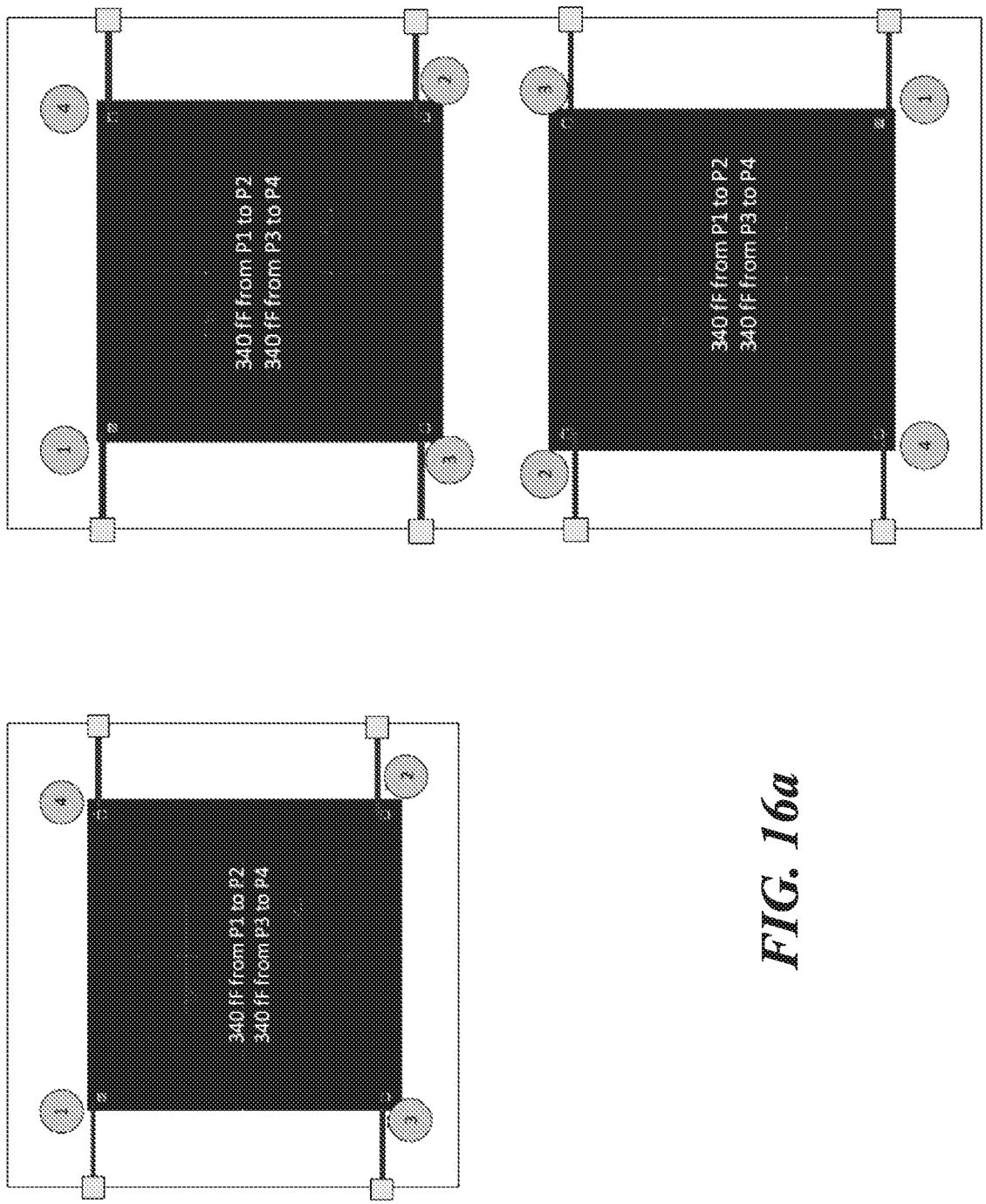

FIG. 16*a* illustrates an example layout of an embodiment isolated filter, and FIG. 16*b* illustrates an example layout of an embodiment isolated filter that includes bypass switches. In one example, each structure with port numbers (1), (2), (3), (4) correspond to the equivalent schematics in FIG. 10*c* describing a Fischer Hybrid core with its corresponding ports P1, P2, P3, P4 whereas P1 corresponds to (1), P2 corresponds to (2), P3 corresponds to (3) and P4 corresponds to (4). In some embodiments, some additional capacitance is added between port (1) and port (2) and port (3) and port (4) to create a quadrature coupler for the appropriate frequency.

Figure 17A:
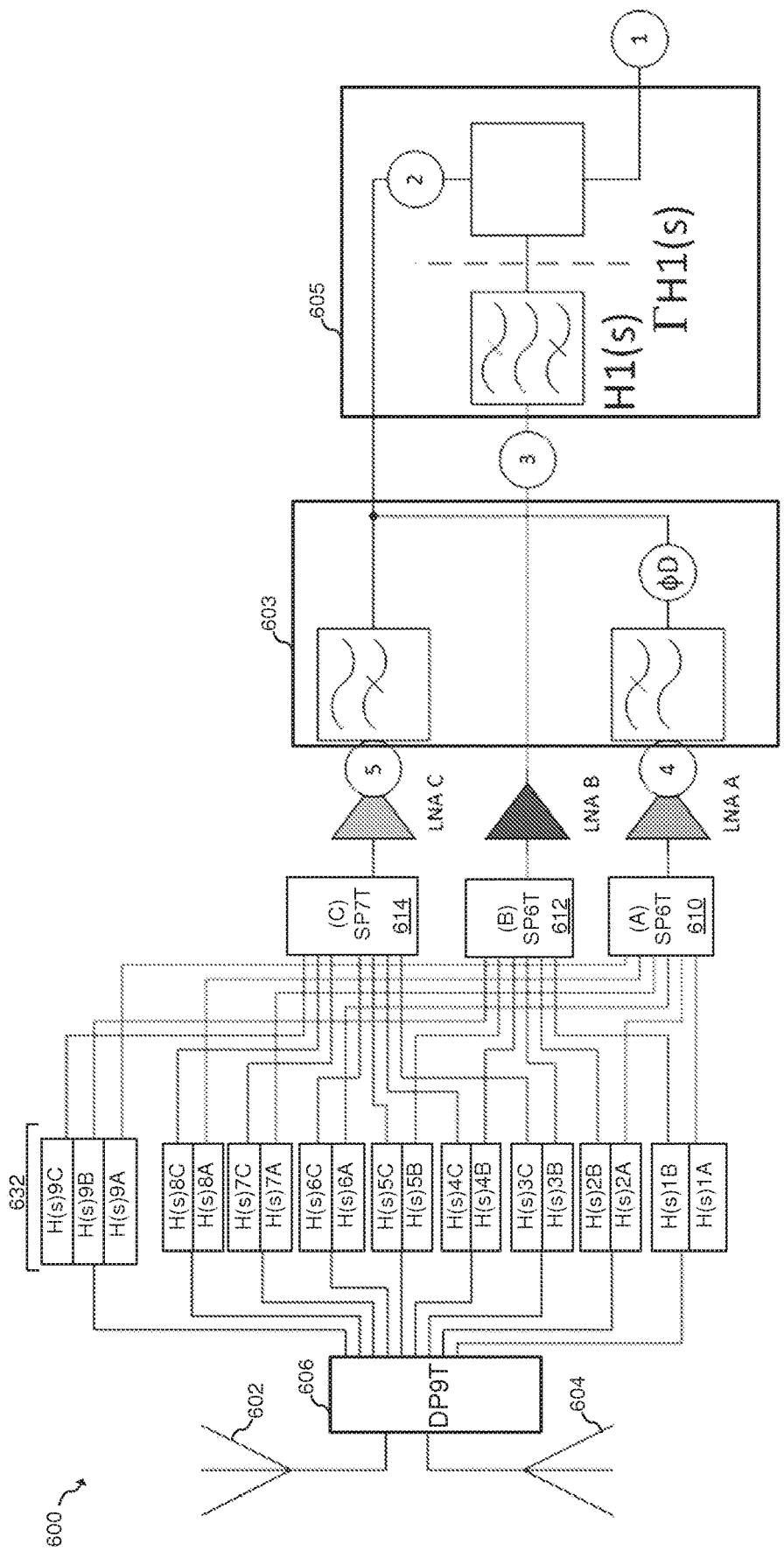
FIG. 17a illustrates a RF system utilizing switched clusters of diplexer and triplexer filters at the Antenna to LNA interface and an isolated Bandpass/Bandstop filter and a Diplexer after the LNAs.

FIG. 17a illustrates an embodiment system 600 in which a first bank of diplexers/triplexers 632 is coupled to antennas 602 and 604 via antenna switch 606 and routed to low-band LNA A, mid-band LNA B and a high-band LNA C via RF switches 610, 612 and 614, which is followed by diplexer 603 and isolated filter core 605 instead of a redundant filter bank shown in FIG. 1a. The system 600 of FIG. 17a avoids the use of a redundant filter bank at the LNA output, and the design of the diplexer can be accomplished with fewer design restrictions on parameters that affect loading/mismatch at the input, gain drop in carrier aggregation (CA) mode, and RX noise leakage though active LNAs in the CA mode due to the help of the isolated filter core. The diplexer filter components within diplexer 603 are phase rotated to each other via phase ΦD such that they do not load each other. The isolated filter core 605 appears like a match to the diplexer 603, which simplifies the design of diplexer 603.

Figure 17B:
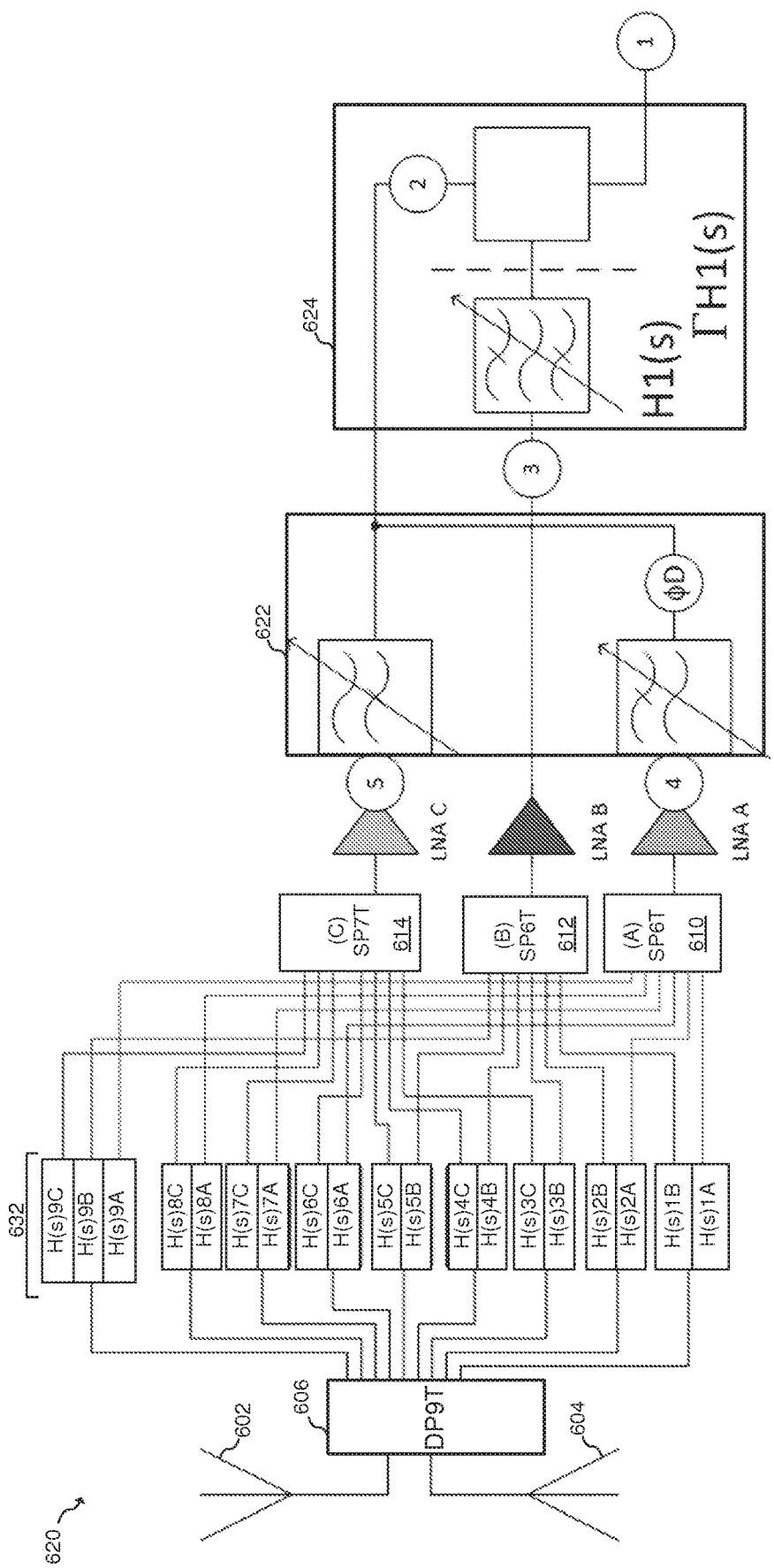
FIG. 17b illustrates a RF system utilizing switched clusters of diplexer and triplexer filters at the Antenna to LNA interface and a tuned isolated Bandpass/Bandstop filter and a tuned Diplexer after the LNA's.

FIG. 17b illustrates an embodiment system 620 that is similar to the system of FIG. 17a but shows the post LNA diplexer 622 and isolated filter core 624 as being tunable. This tunability enables the system to align the diplexer and isolated filter core to track the equivalent frequency combination use case, resulting in a lower complex filter topology and therefore having less loss.

Figure 18:
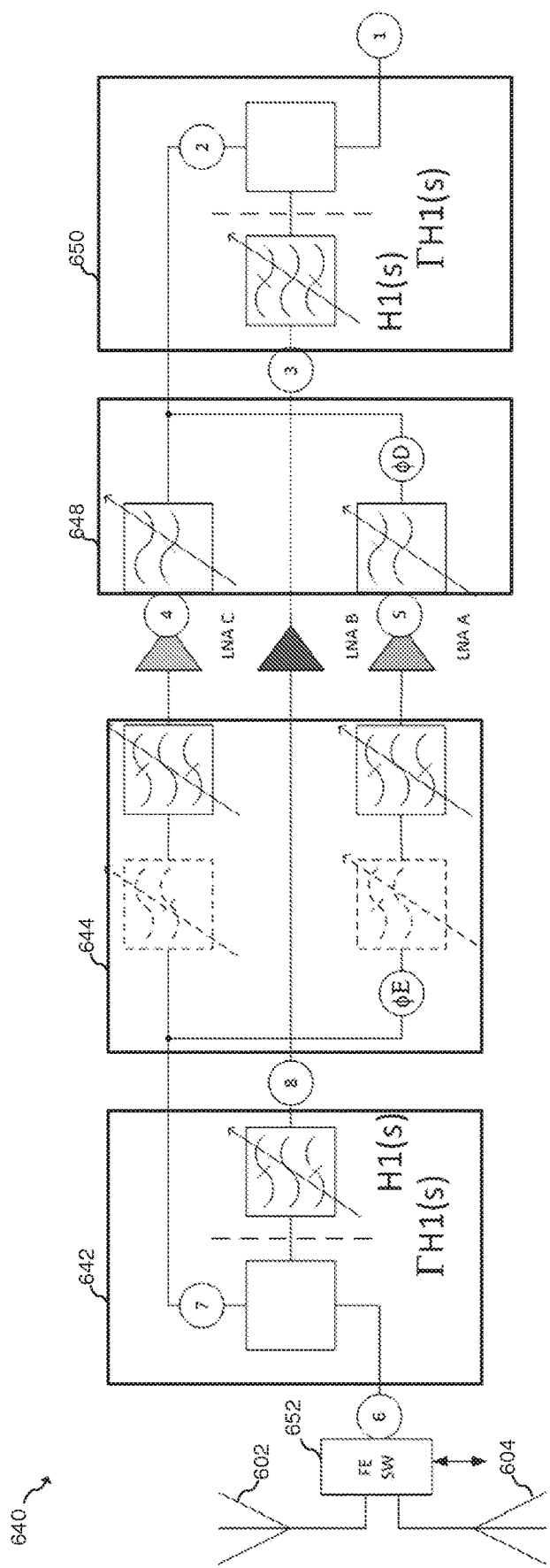
FIG. 18 illustrates an embodiment RF system.

FIG. 18 illustrates an embodiment system 640 in which a tuned isolated filter core 642 and diplexer 644 are coupled to antennas 602 and 604 via antenna switch 652 and routed to low-band LNA A, mid-band LNA B and a high-band LNA C, which is followed by a diplexer 648 and isolated filter structure 650 instead of a redundant filter bank. The input diplexer filter 644 components are phase rotated to each other via phase ΦE such that they do not load each other. The isolated filter core 642 appears like a match to the diplexer 644, which makes the diplexer design simple. The post LNA diplexer filter 648 components are phase rotated to each other via phase ΦD such that they do not load each other. The isolated filter core 650 appears like a match to the diplexer filter 648, which makes the diplexer design simple. This RF system is significantly reduced in size and cost compared to the conventional approaches described in FIG. 1a and FIG. 1b. In various embodiments, diplexers 644 and 648 could be LB/HB, LB/BP, BP, HB or BP/BP implementations.

Figure 19A:
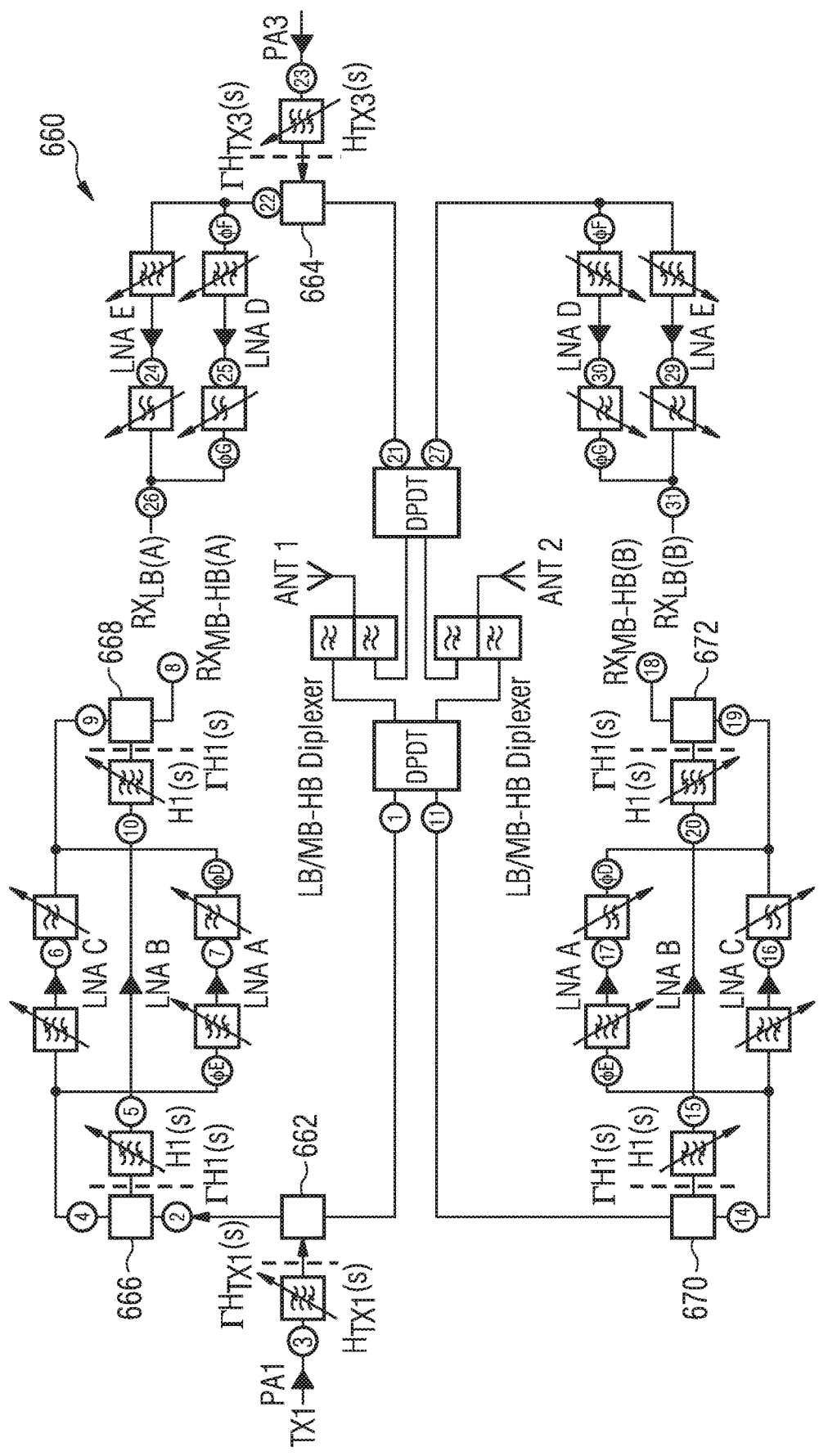
FIGS. 19a and 19b illustrate RF systems that may be directed toward transmission and reception for carrier aggregation.

FIG. 19a illustrates an embodiment system 660 that may be utilized to implement carrier aggregation in systems such as LTE. As shown, the system includes two power amplifiers PA1 and PA3 coupled to antenna ANT1 and antenna ANT2 via embodiment hybrid bandpass/bandstop filters 662 and 664 having isolated filter cores, the structure of which is discussed above, as well as conventional RF switches and diplexers. Multiple receive paths are shown coupled to the each power amplifier that utilize additional embodiment hybrid bandpass/bandstop filters 666, 668, 670 and 672 having isolated filter cores as well as low noise amplifiers and tunable filters. The embodiment of FIG. 19a may be used to support for, example, carrier aggregation in a LTE system having three receive RF paths and one transmit or low band, mid band and high band transmit carrier aggregation.

Figure 19B:
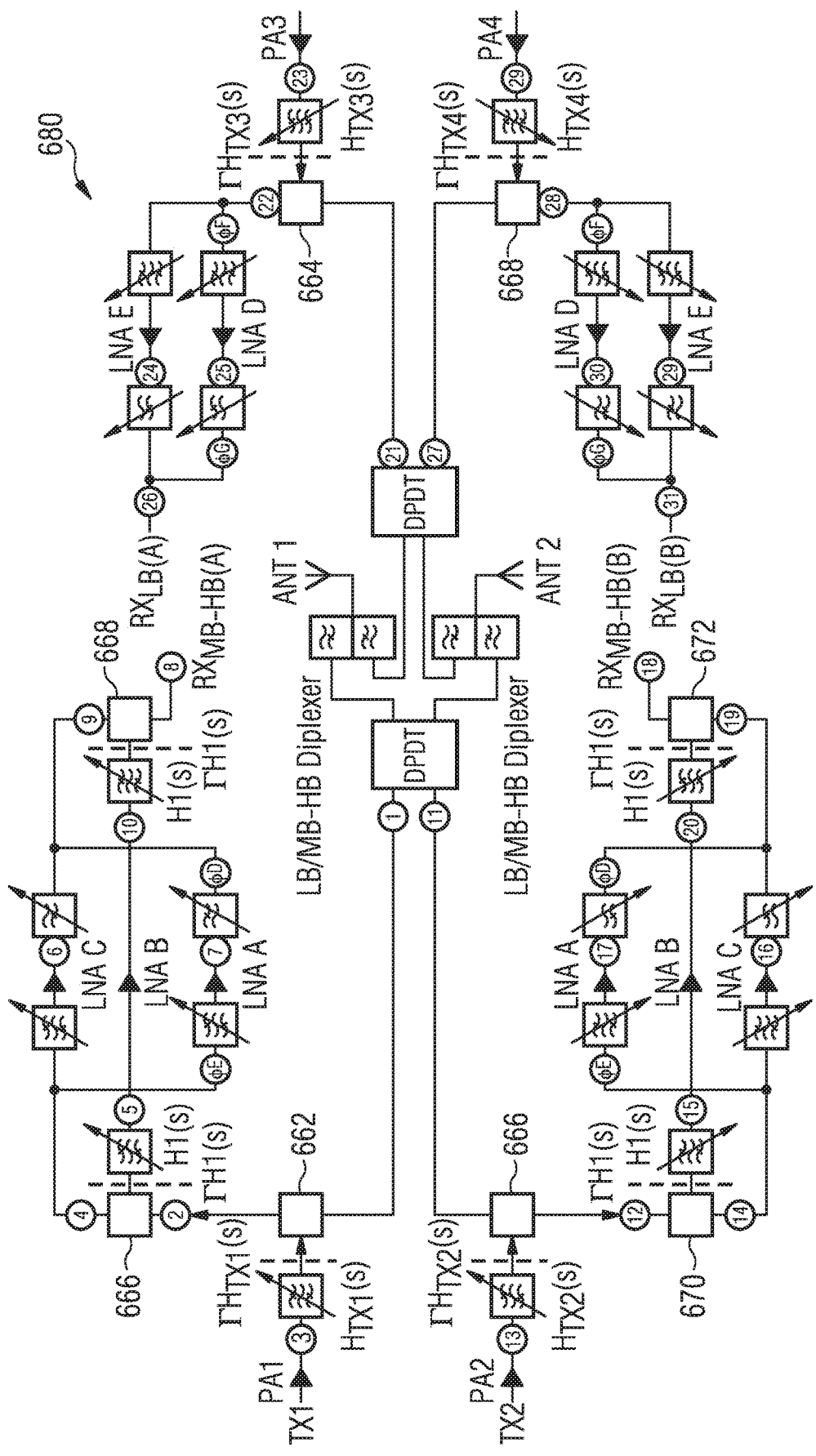

FIG. 19b illustrates a further embodiment system 680 that may also be used to implement carrier aggregation in systems such as LTE. The system of FIG. 19b is similar to the system of FIG. 19a with the addition of two further power amplifiers PA2 and PA4 and their associated embodiment hybrid bandpass/bandstop filters 666 and 668. The embodiment of FIG. 19b may be used to support, for example, carrier aggregation in a LTE system having radio frequencies for up to five receive paths and up to four transmit paths.

Figure 20A:
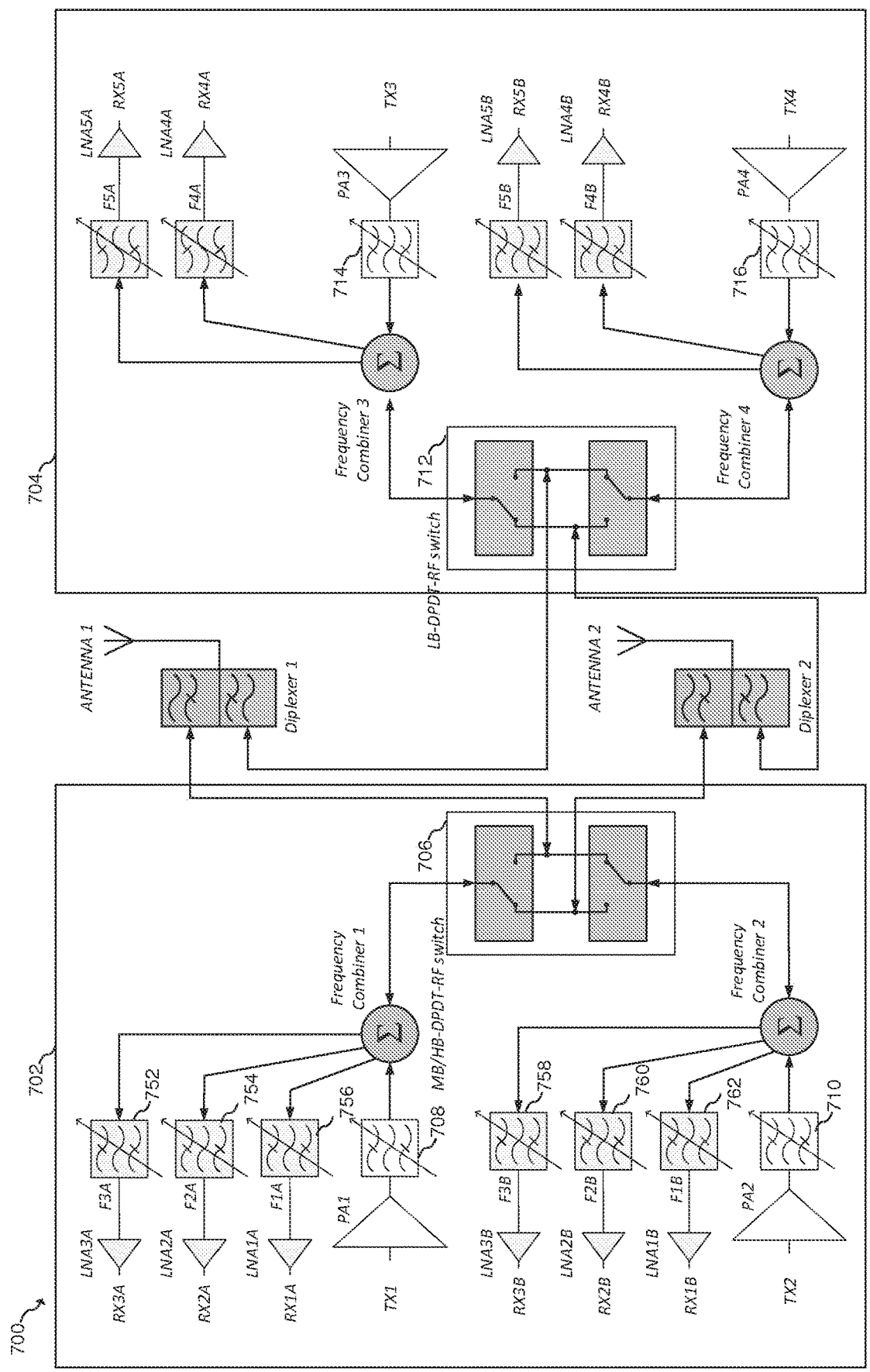
FIGS. 20a-20c illustrate embodiment RF systems configured to implement carrier aggregation.

FIG. 20a illustrates RF system 700 that provides reception and transmission to and from mid band and high band circuitry 702 and low band circuitry 704 via single feed antennas antenna 1 and antenna 2. As shown, high band and mid band circuitry 702 includes power amplifiers PA1 and PA1 that are selectively coupled to antenna 1 and antenna 2 via filters 708 and 710, frequency combiners 1 and 2 and DPDT RF switch 706. High band and midband circuitry 702 further includes a first receive path having LNAs LNA1A, LNA2A and LNA3A coupled to switch 706 via filters F1A, F2A and F3A and frequency combiner 1. Similarly high band and midband circuitry 702 further includes a second receive path having LNAs LNA1B, LNA2B and LNA3B coupled to switch 706 via filters F1B, F2B and F3B and frequency combiner 1.

Low band circuitry 704 includes power amplifiers PA3 and PA4 that are selectively coupled to antenna 1 and antenna 2 via filters 714 and 716, frequency combiners 3 and 4 and DPDT RF switch 712. Low band circuitry 704 further includes a third receive path having LNAs LNA4A and LNA5A coupled to switch 712 via filters F4A and F5A and frequency combiner 3. Similarly low band circuitry 704 further includes a fourth receive path having LNAs LNA4B and LNA5B coupled to switch 712 via filters F4B and F5B and frequency combiner 4.

During operation, one transmit path from high band and mid band circuitry 702 and one transmit path from low band circuitry 704 may be simultaneously activated. For example, power amplifier PA1 may be coupled to antenna 1 via switch 706 and power amplifier TX3 may be coupled to Antennae via switch 712. In an embodiment, transmit filters 708, 710, 714 and 716 and frequency combiners 1, 2, 3 and 4 may be implemented using embodiment isolated filter structures as described herein. In addition, mid band and high band filters 752, 754 and 756 coupled to frequency combiner 1, as well as mid band and high band filters 758, 760 and 762 coupled to frequency combiner 2 may be implemented using diplexer 648 and embodiment isolated filter structure 650 shown in FIG. 18. For example, embodiment isolated filter structures, using an embodiment tuned bandpass/bandstop filter followed by a tuned diplexer filter with shallow guard band transitions may be used.

Figure 20B:
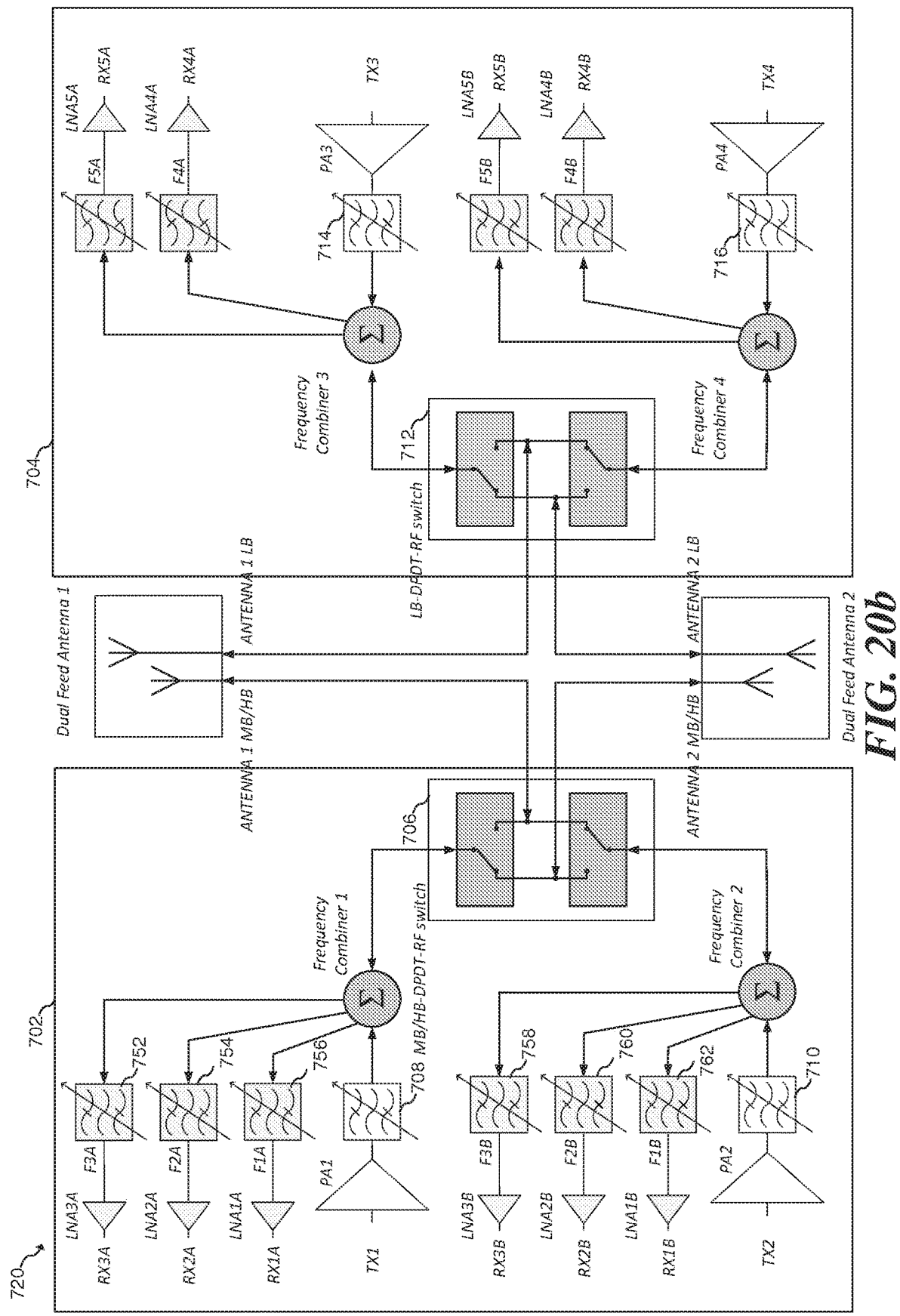

FIG. 20b, illustrates RF system 720 that provides reception and transmission to and from mid band and high band circuitry 702 and low band circuitry 704 via dual feed antenna 1 and dual feed antenna 2. As shown, dual feed antenna 1 includes antenna 1 MB/HB for the mid band and high band signal path and antenna 1 LB for the low band signal path. Similarly, dual feed antenna 2 includes antenna 2 MB/HB for the mid band and high band signal path and antenna 2 LB for the low band signal path. In an embodiment, mid band and high band circuitry 702 and low band circuitry 704 is similar to mid band and high band circuitry 702 and low band circuitry 704 shown in FIG. 20a. However, by using dual feed antennas, all four power amplifiers PA1, PA2, PA3 and PA4 may transmit simultaneously. In one example, the output of power amplifier PA1 may be coupled to antenna 1 MB/HB via switch 706, the output of power amplifier PA2 may be coupled to antenna 2 MB/HB via switch 706, the output of power amplifier PA3 may be coupled to antenna 1 LB via switch 712 and the output of power PA4 may be coupled to antenna 2 LB via switch 712. Alternatively, the output of power amplifiers PA1, PA2, PA3 and PA4 may be routed to different antennas. One advantageous aspect of system 720 is the ability to provide multiple channels of transmission without the need for highly selective filters. This is because, in various embodiments, each antenna has selectivity in frequency and isolation due to spatial separation and, in some implementations, isolation due to orthogonal polarization of the antennas.

Figure 20C:
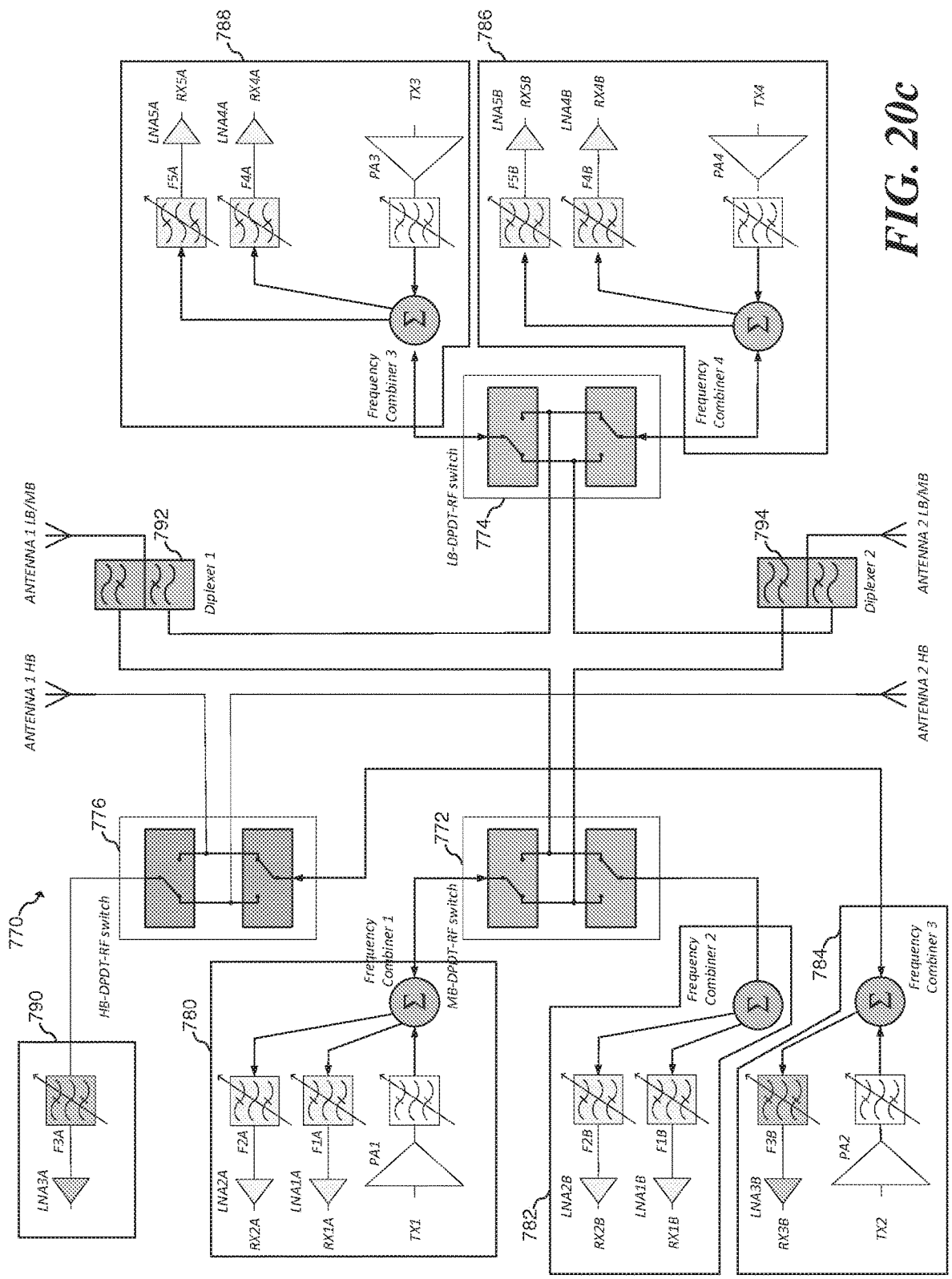

FIG. 20C illustrates RF system 770 that includes multiple transmit and receive path couple to a first dual feed antenna that includes high band antenna 1 HB and low band and midband antenna 1 LB/MB, as well as a second dual feed antenna that includes high band antenna 2 HB and low band and midband antenna 2 LB/MB.

In an embodiment, high band RF switch 776 selectively couples high band receive circuit 790 and high band transmit/receive circuit 784 to antenna 1 HB and antenna 2 HB. Switch 776 either routes high band receive circuit 790 to antenna 1 HB and high band transmit/receive circuit 784 to antenna 2 HB or routes high band receive circuit 790 to antenna 2 HB and high band transmit/receive circuit 784 to antenna 1 HB.

Midband switch RF switch 772 selectively couples mid band transmit/receive circuit 780 and mid band receive circuit 782 to antenna 1 LB/MB and antenna 2 LB/MB via diplexers 792 and 794, respectively. Switch 772 either routes mid band transmit/receive circuit 780 to antenna 1 LB/MB and mid band receive circuit to antenna 2 LB/MB, or routes mid band transmit/receive circuit 780 to antenna 2 LB/MB and mid band receive circuit to antenna 1 LB/MB.

Similarly, low band switch RF switch 774 selectively couples low band transmit/receive circuit 788 and low band transmit/receive circuit 786 to antenna 1 LB/MB and antenna 2 LB/MB via diplexers 792 and 794, respectively. Switch 774 either routes low band transmit/receive circuit 788 to antenna 1 LB/MB and low band transmit/receive circuit to antenna 2 LB/MB, or routes low band transmit/ receive circuit 788 to antenna 2 LB/MB and low band transmit/receive circuit to antenna 1 LB/MB.

System 770 may be used, for example, route various combination of signal paths the antennas. For example, with respect to the high band, power amplifier PA2 of transmit/ receive circuit 784 may be selectively routed to either antenna 1 HB or antenna 2 HB, while the high band receive circuit 790 is routed to the other HB antenna. Similarly, with respect to the mid band, power amplifier PA1 of transmit/ receive circuit 780 may be selectively routed to either antenna 1 LB/MB or antenna 2 LB/MB, while the mid band receive circuit 782 is routed to the other LB/MB antenna. On the other hand, both low band power amplifiers PA3 and PA4 may be routed to different LB/MB antennas 1 and 2 via diplexers 792 and 794 and transmit simultaneously.

The embodiments of FIGS. 20a-20c may be used, for example in cellular standards such as LTE Advanced that provided for receive carrier aggregation capability for up to 3 independent RX bands that could vary in frequency.

Figure 21A:
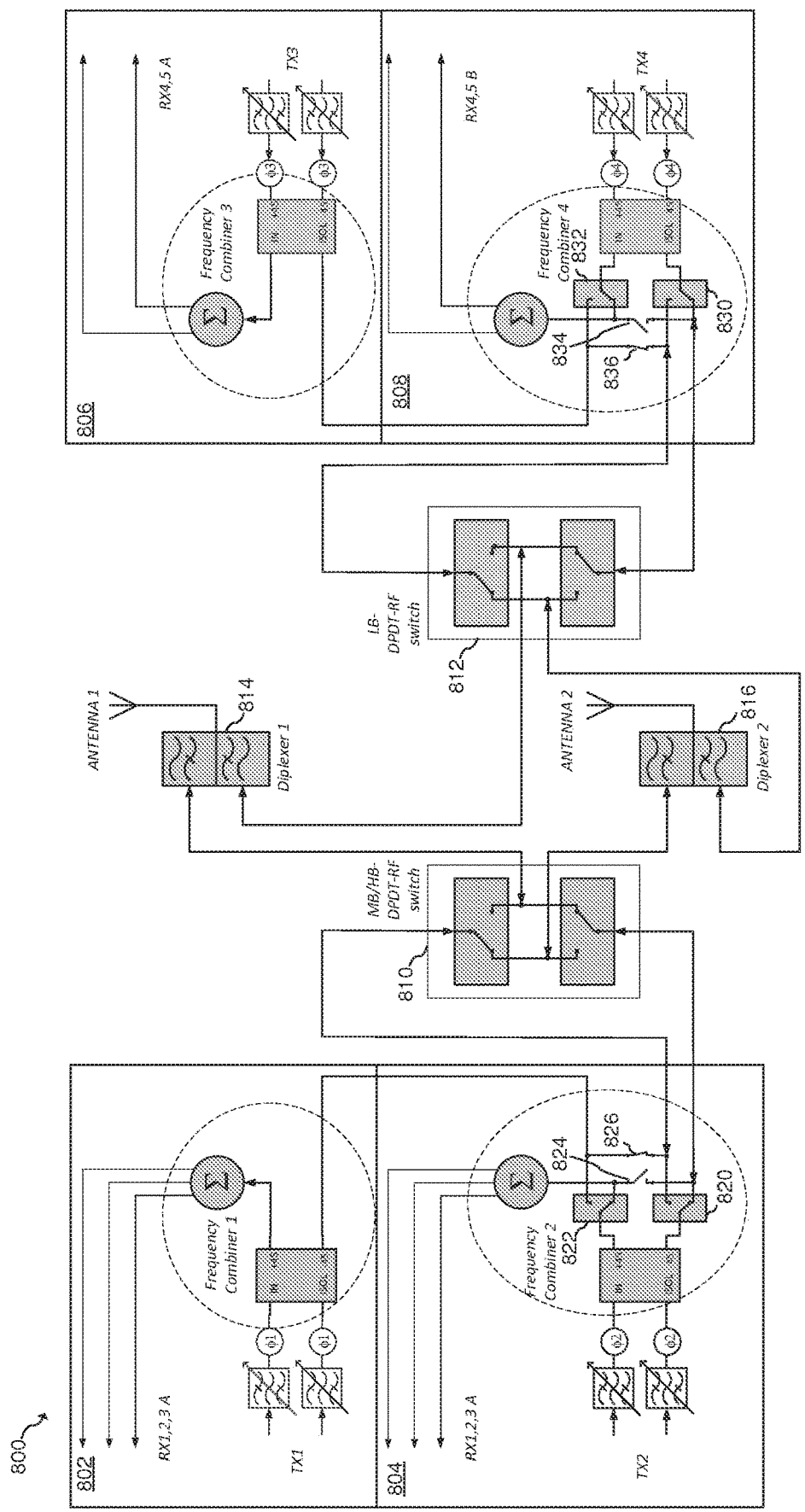
FIGS. 21a-21c illustrate a further embodiment RF system configured to implement carrier aggregation.

FIG. 21a illustrates RF system 800 that may be configured to transmit in two carrier aggregation modes. RF system 800 includes a first mid band/high band transmit/receive circuit 802, a second mid band/high band transmit/receive circuit 804, a first mid low band transmit/receive circuit 806, a second low band transmit/receive circuit 808. In an embodiment, first mid band/high band transmit/receive circuit 802 may be routed one of antenna 1 and antenna 2 and second mid band/high band transmit/receive circuit 804 may be routed to the other one of antenna 1 and antenna 2. Such a configuration is enabled by closing switch 826 to route first mid band/high band transmit/receive circuit 802 to the top port of switch 810 and opening switch 824. In such a configuration, each mid band/high band signal path is coupled to a separate antenna, thereby allowing for high linearity and low loss.

Figure 21B:
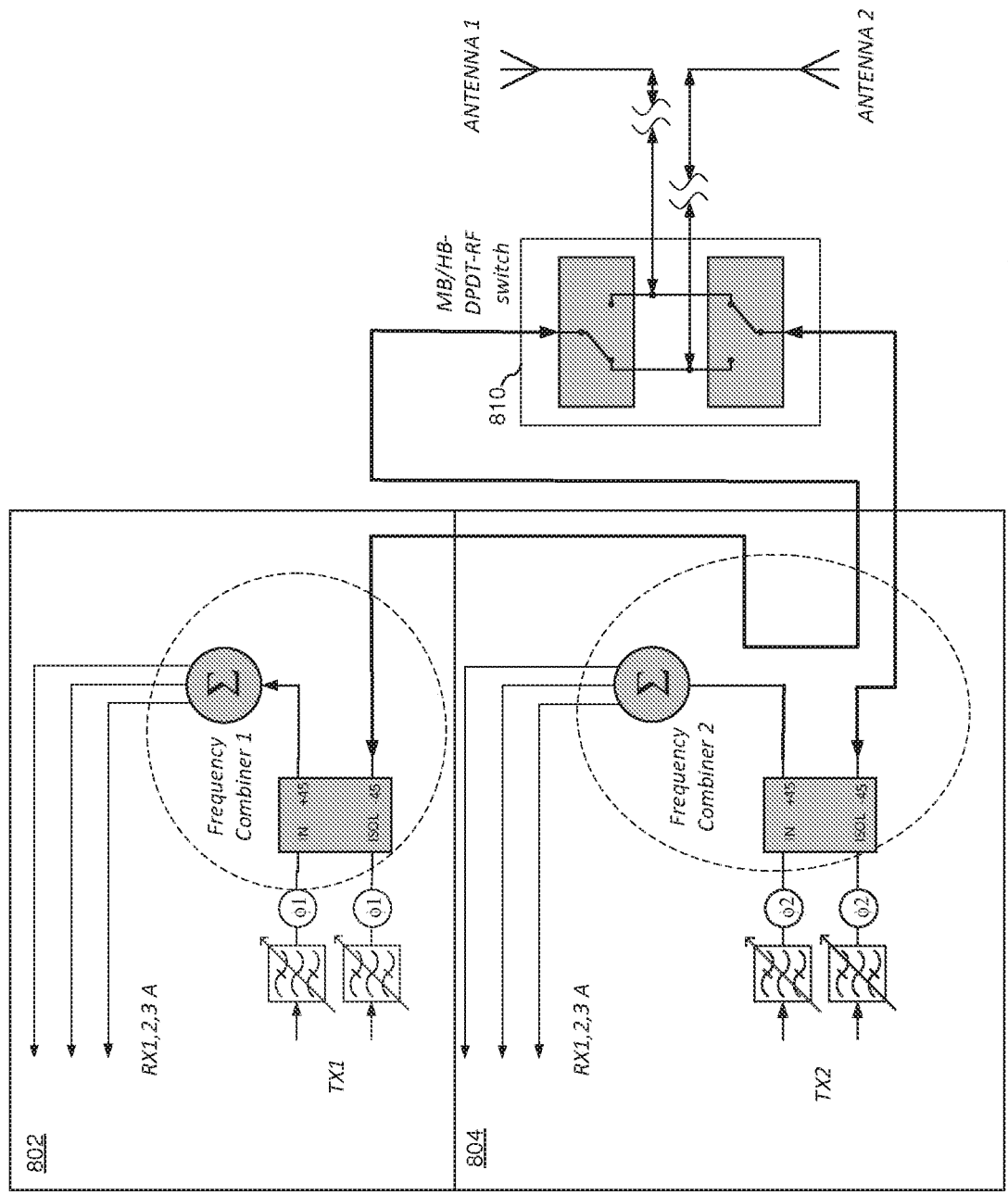

FIG. 21b illustrates a schematic that shows the routing configuration of the mid band/high band circuits 802 and 804 of RF system 800 when the mid band/high band circuits 802 and 804 of FIG. 21a are in this high linearity and low loss configuration. As shown, first mid band/high band circuit 802 is coupled to one port of switch 810 and second mid band/high band circuit 804 is coupled to another port of switch 810.

Figure 21C:
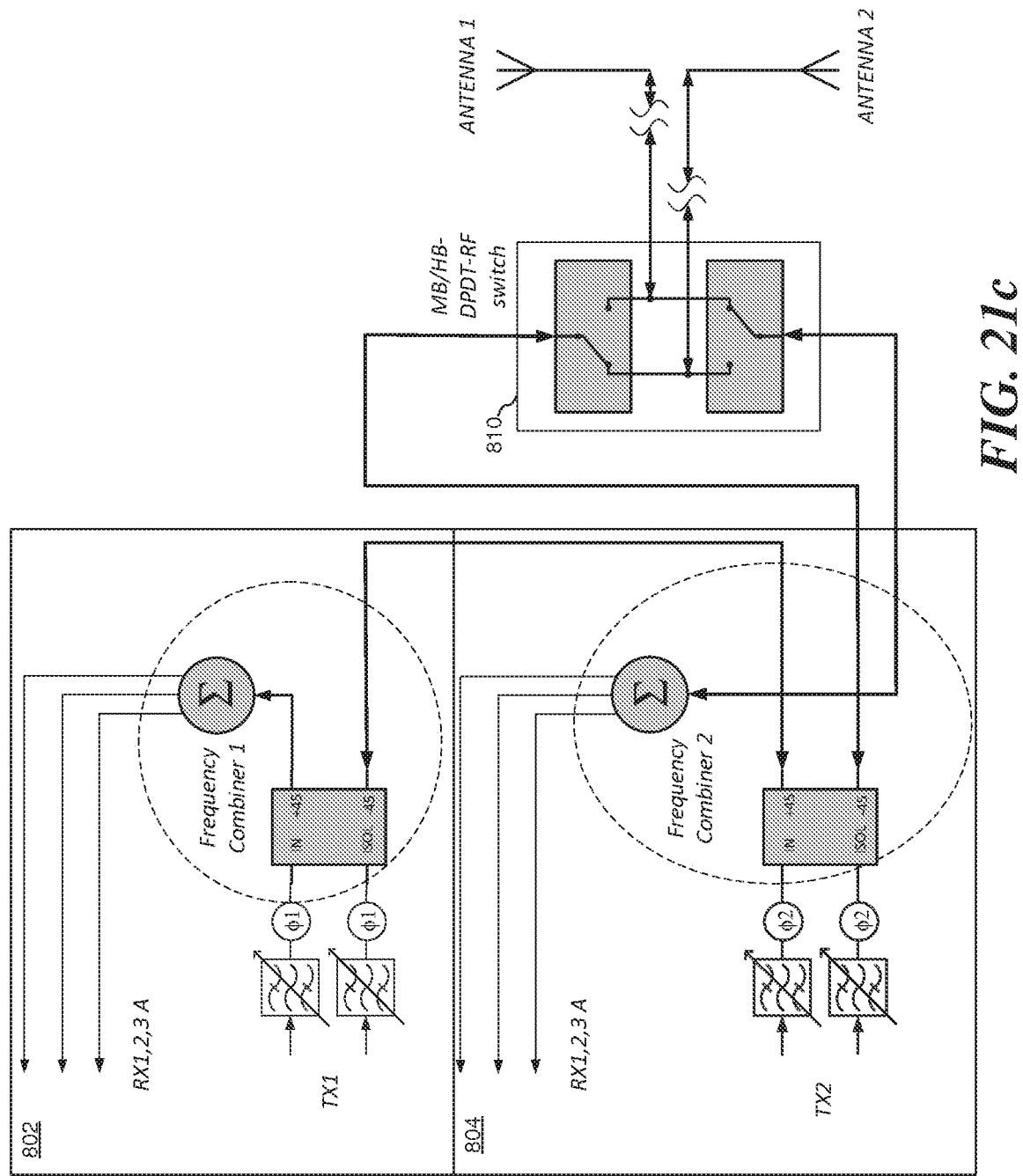

In an embodiment, switches 820, 822, 824 and 826 may be reconfigured to place RF system 800 in a blocked path mode in which a same antenna is used for both low band transmit and receive signals and/or both mid band/high band transmit and receive signals in case the other antenna is blocked or loaded. For example, switch 824 may be closed to route the receive path of mid band/high band transmit/ receive circuit 804 to one port of switch 810, switch 826 may be opened, switch 822 may be configured to couple mid band/high band transmit/receive circuit 802 to the hybrid of mid band/high band transmit/receive circuit 804, and switch 820 may be configured to couple mid band/high band transmit/receive circuit 804 to another port of switch 810. FIG. 21c illustrates a schematic that shows the routing configuration of the mid band/high band circuits 802 and 804 of RF system 800 when the mid band/high band circuits 802 and 804 of FIG. 21a are in this blocked path mode.

Similarly, the low band transmit/receive circuits 806 and 808 may be configured to be coupled to antennas 1 and antennas 2 in either a high linearity low loss mode and may be configured in a block path mode in a similar manner as mid band and high band transmit/receive circuits 802 and 804 described above. Such configurations may be set via switches 830, 832, 834, 836 and 812. Because antennas 1 and 2 are coupled to switches 810 and 812 via diplexers 814 and 816, the high linearity low loss configuration and the blocked path mode may be independently selected for the mid band/high band paths and for the low band paths. For example, the mid band and high band paths may be configured in the blocked path mode while the low band paths are configured in the high linearity/low loss mode. In another example, the mid band and high band paths may be configured in high linearity/low loss mode while the low band paths are configured in the blocked path mode. In some embodiments, both the mid band/high band paths and the low band paths may be configured in the high linearity/low loss mode or may be both configured in the blocked path mode. It should be understood that the embodiments of FIGS. 21a-21c are just specific examples of a system having signal paths selectable between high linearity/low loss modes and blocked path modes.

Figure 22A:
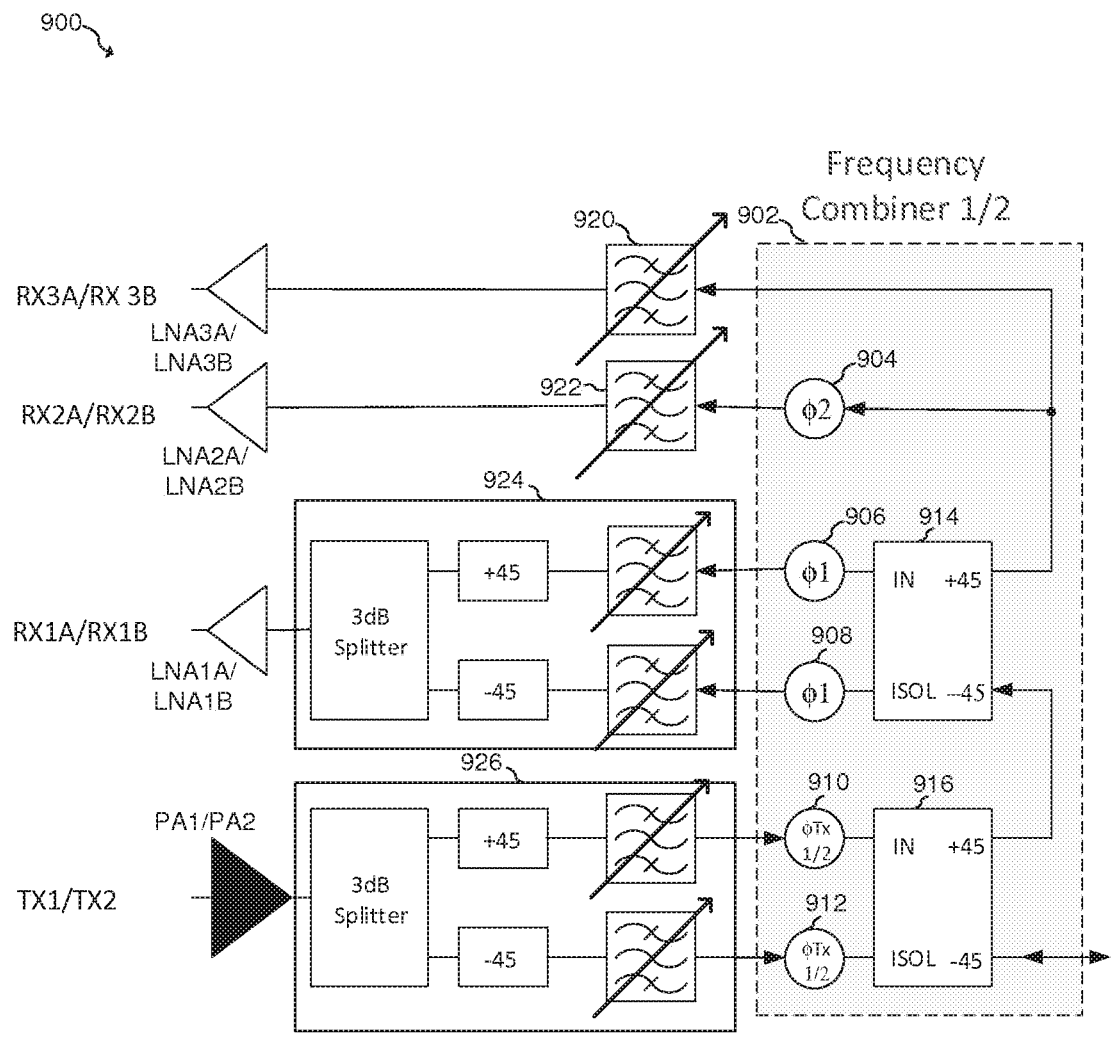
FIGS. 22a-22d illustrate embodiment frequency combiners.

FIGS. 22a-22d illustrate embodiment frequency combining circuits shown interfaced with various LNAs and PAs that may be used to implement frequency combiners in the systems illustrated in FIGS. 20a-20c and 21a-21c. FIG. 22a illustrates a system 900 in which frequency combiner 902 is interfaced to low noise amplifier LNA3A or LNA3B via adjustable filter 920, to low noise amplifier LNA2A or LNA2B via adjustable filter 922, to low noise amplifier LNA1A or LNA1B via embodiment filter structure portion 924, and to power amplifier PA1 or PA2 via embodiment isolated filter structure portion 926. Each of isolation filter portions 924 and 926 include a 3 dB splitter, a +45 degree phase shifter, a −45 degree phase shifter and adjustable filters, such that when combined with −3 dB hybrids 914 and 916 and phase shifters 906, 908, 910 and 912 in frequency combiner 902, embodiment isolated filters are formed. During receive operation, −3 dB hybrid 916 in conjunction with isolated filter portion 926 acts as a bandstop filter in a transmit band for signals propagating from the −45 degree port of hybrid 916 to the +45 degree port of hybrid 916. Next, energy in the receive band defined by the frequency response of the filters in isolation filter portion 924 and hybrid 914 is sent to the inputs of LNA1A or LNA1B, while energy outside of this receive band is sent to the inputs of LNA3A or LNA3B via filter 920 or to the inputs of LNA2A or LNA2B via phase shifter 904 and filter 922. During transmit operation, energy within a frequency band defined by the filters of isolated filter portion 926 is sent to the −45 degree port of hybrid 916 and to an antenna, some embodiments.

Figure 22B:
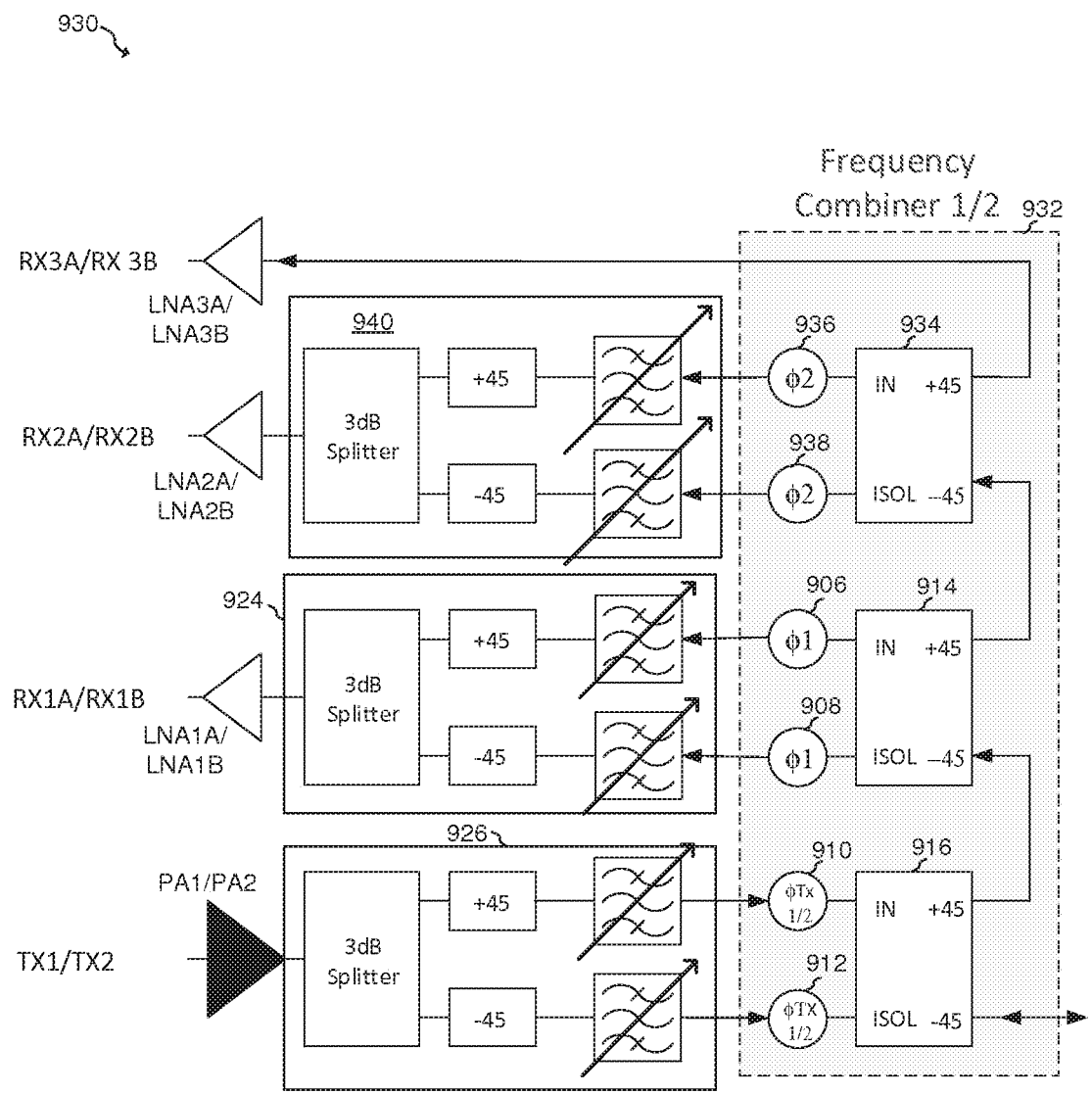

System 930 of FIG. 22b is similar to system 900 of FIG. 22a with the addition of embodiment isolated filter portion 940, phase shifters 936 and 938 and hybrid 934, which provides an extra degree of filtering and isolation to LNA2A or LNA2B. For example, during operation, the frequency content of a received signal having a frequency of operation designated to LNA1A or LNA2B is rejected by the isolated filter formed by isolated filter portion 940, phase shifters 936 and 928 and hybrid 934.

Figure 22C:
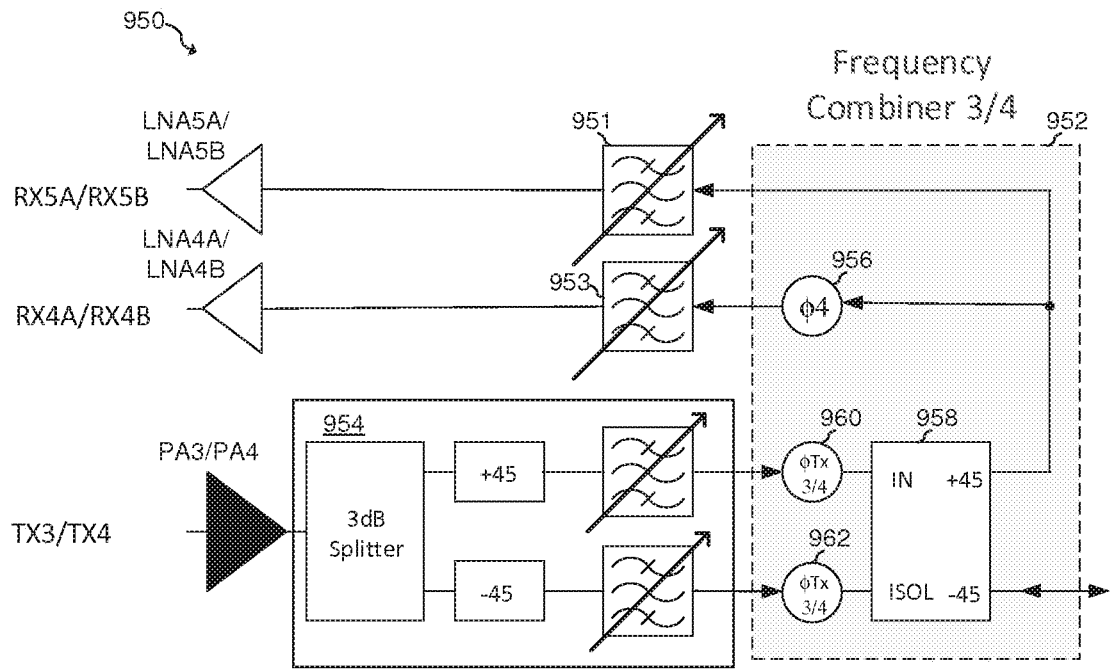
Figure 22D:
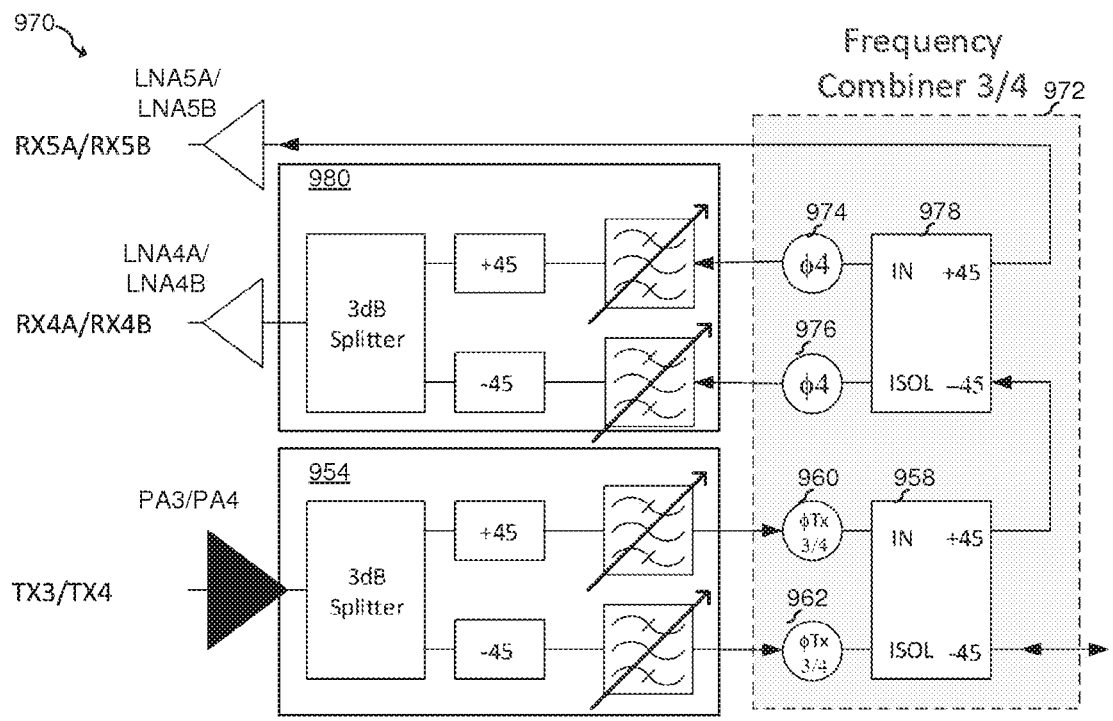

FIG. 22C illustrates a system 950 in which frequency combiner 952 is interfaced to low noise amplifier LNA5A or LNA5B via adjustable filter 950, to low noise amplifier LNA4A or LNA4B via adjustable filter 953, and to power amplifier PA3 or PA4 via embodiment isolated filter structure portion 954. Isolation filter portion 954 include a 3 dB splitter, a +45 degree phase shifter, a −45 degree phase shifter and adjustable filters, such that when combined with −3 dB hybrid 958 and phase shifters 960 and 962 in frequency combiner 952, embodiment isolated filter are formed. During receive operation, −3 dB hybrid 958 in conjunction with isolated filter portion 954 acts as a bandstop filter in a transmit band for signals propagating from the −45 degree port of hybrid 916 to the +45 degree port of hybrid 958. Next, outside of this band is sent to the inputs of LNA5A or LNA5B via filter 951 or to the inputs of LNA4A or LNA4B via phase shifter 956 and filter 953. During transmit operation, energy within a frequency band defined by the filter of isolated filter portion 954 is sent to the −45 degree port of hybrid 958 and to an antenna, some embodiments.

System 970 of FIG. 22b is similar to system 900 of FIG. 22a with the addition of embodiment isolated filter portion 940, phase shifters 936 and 938 and hybrid 934, which provides an extra degree of filtering and isolation to LNA2A or LNA2B. For example, during operation, the frequency content of a received signal having a frequency of operation designated to LNA1A or LNA2B is rejected by the isolated filter formed by isolated filter portion 940, phase shifters 936 and 928 and hybrid 934.

Embodiments of the present invention are summarized here. Other embodiments can also be understood from the entirety of the specification and the claims filed herein. One general aspect includes a circuit including: a plurality of filter circuits including a first port, a second port and a third port, where a second port of a first of the plurality of filter circuits is coupled to a first port of a second of the plurality of filter circuits, where each of the plurality of filter circuits includes: a first passive filter; a second passive filter; a first coupler having an input port coupled to the first port, an isolated port coupled to the second port, a first phase shifted port coupled to the first passive filter and a second phase shifted port coupled to the second passive filter; and a combining network having a first input coupled to the first passive filter, a second input coupled to the second passive filter, and an output coupled to the third port.

Implementations may include one or more of the following features. The circuit where the first coupler includes a first −3 db hybrid with quadrature output. The circuit where the combining network includes a second −3 db hybrid with quadrature output and an isolation port. In some embodiments, the combining network includes: a power splitter; a first phase shifter coupled between the first passive filter and the power splitter; and a second phase shifter coupled between the second passive filter and the power splitter. The first passive filter and the second passive filter may be tunable filters. In some embodiments, a second port of the second of the plurality of filter circuits is coupled to a first port of a third of the plurality of filter circuits.

Another general aspect includes a circuit including: a filter circuit having a first port, a second port and a third port, the filter circuit including a first passive filter, a second passive filter, a first coupler having an input port coupled to the first port, an isolated port coupled to the second port, a first phase shifted port coupled to the first passive filter and a second phase shifted port coupled to the second passive filter, where the first coupler includes a −3 db hybrid with quadrature output, and a combining network having a first input coupled to the first passive filter, a second input coupled to the second passive filter, and an output coupled to the third port, where the combining network includes a power splitter, a first phase shifter coupled between the first passive filter and the power splitter, and a second phase shifter coupled between the second passive filter and the power splitter; and an amplifier including an output coupled to the third port.

Implementations may include one or more of the following features. In some embodiments the filter circuit is configured to: pass a first frequency band from the third port to the first port using a bandpass transfer function; and pass a second frequency band and a third frequency band from the first port to the second port, and filter the first frequency band from the first port to the second port, where the second frequency band is lower than the first frequency band and the third frequency band is higher than the first frequency band. The first frequency band may include a frequency range between about 2110 MHz and about 2170 MHz. In some embodiments, the circuit further includes a diplexer coupled to the second port, where the diplexer is configured to divide the second frequency band from the third frequency band. The diplexer may include a transfer function that has a shallower crossover response than the filter circuit.

In some embodiments, the amplifier may include a power amplifier, the first port may be coupled to an antenna and/or the first passive filter and the second passive filter are tunable filters. In some embodiments, the amplifier includes a low noise amplifier (LNA).

A further general aspect includes a circuit having: a first filter circuit having a first port configured to be coupled to an antenna, a second port and a third port, the first filter circuit including a first passive filter, a second passive filter, a first coupler having an input port coupled to the first port, an isolated port coupled to the second port, a first phase shifted port coupled to the first passive filter and a second phase shifted port coupled to the second passive filter, where the first coupler includes a −3 db hybrid with quadrature output, and a first combining network having a first input coupled to the first passive filter, a second input coupled to the second passive filter, and an output coupled to the third port, where the first filter circuit is configured to pass a first frequency band from the first port to the third port using a bandpass function, and is configured to pass a second frequency band and a third frequency band from the first port to the second port, and reject the first frequency band from the first port to the second port, where the first frequency band includes frequencies higher than the first frequency band and the third frequency band includes frequencies lower than the first frequency band; and a first LNA including an input coupled to the third port; a first frequency splitting circuit coupled to the first port of the first filter circuit, the first frequency splitting circuit configured to split the third frequency band from the second frequency band; a second LNA having an input coupled to a second frequency band output of the first frequency splitting circuit; and a third LNA having an input coupled to a third frequency band output of the first frequency splitting circuit.

Implementations may include one or more of the following features. The circuit further including a frequency combining circuit having a first input coupled to an output of the second LNA, and a second input coupled to an output of the third LNA. In some embodiments, the circuit further includes a second filter circuit having a first port configured to provide a combine frequency output, a second port coupled to an output of the frequency combining circuit, and a third port coupled to an output of the first LNA. The second filter circuit includes a third passive filter, a fourth passive filter, a second coupler having an input port coupled to the first port, an isolated port coupled to the second port, a first phase shifted port coupled to the third passive filter and a second phase shifted port coupled to the fourth passive filter, where the first coupler includes a –3 db hybrid with quadrature output, and a second combining network having a first input coupled to the third passive filter, a second input coupled to the fourth passive filter, and an output coupled to the third port, where the second filter circuit is configured to pass a first frequency band from the first port to the third port using the bandpass function, and is configured to pass the second frequency band and the third frequency band from the first port to the second port, and reject the first frequency band from the first port to the second port.

In some embodiments, the first passive filter, the second passive filter, the third passive filter and the fourth passive filter include tunable filters and/or the first frequency splitting circuit and the frequency combining circuit are tunable.

In an embodiments, the first combining network includes a first power splitter, a first phase shifter coupled between the first passive filter and the first power splitter, and a second phase shifter coupled between the second passive filter and the first power splitter; and the second combining network includes a second power splitter, a third phase shifter coupled between the third passive filter and the second power splitter, and a fourth phase shifter coupled between the fourth passive filter and the second power splitter. In some embodiments, the first frequency splitting circuit and the frequency combining circuit each include a duplexer or a diplexer. The circuit may further include a parallel filter bank coupled between the first frequency splitting circuit and the second and third LNAs. In some embodiments, the parallel filter bank includes a tunable filter bank.

A further general aspect includes a circuit having a filter circuit including a first port configured to be coupled to an antenna, a second port and a third port. The filter circuit includes a first passive filter, a second passive filter, a first power amplifier having an output coupled to the first passive filter, a second power amplifier having an output coupled to the second passive filter, a first coupler having an input port coupled to the first port, an isolated port coupled to the second port, a first phase shifted port coupled to the first passive filter and a second phase shifted port coupled to the second passive filter. The first coupler includes a –3 db hybrid with quadrature output, and a splitting network having a first output coupled to and input of the first power amplifier, a second output coupled to an input of the second power amplifier, and an input coupled to the third port.

Implementations may include one or more of the following features. The circuit where the splitting network includes a power splitter, a first phase shifter coupled between the first power amplifier and the power splitter, and a second phase shifter coupled between the second power amplifier and the power splitter. In some embodiments, the circuit is configured to stabilize an output power on the first port with respect to changes of a voltage standing wave ratio (VSWR) on the first port. The filter circuit may be configured to provide transmit filtering for the first and second power amplifiers and filter TX noise in a receive band to the antenna in the first port and to a passband of the first and second passive filters at the second port.

A further general aspect includes a circuit including: a first RF front-end of a first band; a second RF front-end of the first band; a first multi-feed antenna; a second multi-feed antenna; and a first RF switch configured to couple the first RF front-end to a first element of the first multi-feed antenna and coupled the second RF front-end to a first element of the second multi-feed antenna in a first configuration, and configured to couple the first RF front-end to the first element of the second multi-feed antenna and couple the second RF front-end to the first element of the first multi-feed antenna in a second configuration.

Implementations may include one or more of the following features. The circuit where: the first RF front-end includes a first power amplifier and the second RF front-end includes a second power amplifier. In some embodiments the first RF front-end further includes a first receive path and the second RF front-end further includes a second receive path. The first receive path may include a first plurality of filters coupled in series with a corresponding first plurality of low noise amplifiers, and the second receive path may include a first plurality of filters coupled in series with a corresponding first plurality of low noise amplifiers. The circuit may further include a third RF front-end of a second band, a fourth RF front-end of the second band, and a second RF switch configured to couple the third RF front-end to a second element of the first multi-feed antenna and couple the fourth RF front-end to a second element of the second multi-feed antenna in a third configuration, and configured to couple the third RF front-end to the second element of the second multi-feed antenna and couple the fourth RF front-end to the second element of the first multi-feed antenna in a fourth configuration. In some embodiments, the first band is higher in frequency than the second band.

In some embodiments, the circuit further includes: a third RF front-end of a second band; a fourth RF front-end of the second band; a second RF switch configured to couple the third RF front-end to the first element of the first multi-feed antenna and couple the fourth RF front-end to the first element of the second multi-feed antenna in a third configuration, and configured to couple the third RF front-end to the first element of the second multi-feed antenna and couple the fourth RF front-end to the first element of the first multi-feed antenna in a fourth configuration; a first diplexer having inputs coupled to the first and second RF switches and an output coupled to the first element of the first multi-feed antenna; and a second diplexer having inputs coupled to the first and second RF switches and an output coupled to the first element of the second multi-feed antenna.

The circuit may further include: a fifth RF front-end of a third band; a sixth RF front-end of the third band; and a third RF switch configured to couple the fifth RF front-end to a second first element of the first multi-feed antenna and couple the sixth RF front-end to a second element of the second multi-feed antenna in a fifth configuration, and configured to couple the fifth RF front-end to the second element of the second multi-feed antenna and couple the sixth RF front-end to the second element of the first multi-feed antenna in a sixth configuration. In some embodiments, the first band is higher in frequency than the second band, and the third band in higher in frequency than the first and second bands.

In some embodiments, the first RF front-end includes a first receive path, a first transmit path, and a first frequency combiner configured to couple an input of the first receive path and an output of the first transmit path to a first port; and the second RF front-end includes a second receive path, a second transmit path, and a second frequency combiner configured to in a first mode, couple an input of the second receive path and an output of the second transmit path to a second port, and in a second mode, couple the input of the second receive path, the output of the second transmit path, and the first port of the first RF front-end to the second port, where the first port is coupled to a first input of the first RF switch and the second port is coupled to a second input of the first RF switch.

In various embodiments, the first frequency combiner includes: a first power splitter having an input coupled to the first transmit path; a first phase shifter coupled to a first output of the first power splitter; a second phase shifter coupled a second output of the first power splitter; a first filter coupled to the first phase shifter; a second filter coupled to the second phase shifter; and a hybrid circuit having an input port coupled to the first filter, an isolated power coupled to the second filter, a first phase shift output coupled to the first receive path and a second phase shift output coupled to the first port. The circuit may further include: a third RF front-end of a second band; a fourth RF front-end of the second band; a second RF switch configured to couple the third RF front-end to the first element of the first multi-feed antenna and couple the fourth RF front-end to the first element of the second multi-feed antenna in a third configuration, and configured to couple the third RF front-end to the first element of the second multi-feed antenna and couple the fourth RF front-end to the first element of the first multi-feed antenna in a fourth configuration; a first diplexer having inputs coupled to the first and second RF switches and an output coupled to the first element of the first multi-feed antenna; and a second diplexer having inputs coupled to the first and second RF switches and an output coupled to the first element of the second multi-feed antenna.

In an embodiment, the third RF front-end includes a third receive path, a third transmit path, a third frequency combiner configured to couple an input of the third receive path and an output of the third transmit path to a third port; the fourth RF front-end includes a fourth receive path, a fourth transmit path, a fourth frequency combiner configured to: in a third mode, couple an input of the fourth receive path and an output of the fourth transmit path to a fourth port, and in a fourth mode, couple the input of the fourth receive path, the output of the fourth transmit path, and the third port of the second RF front-end to the fourth port, where the third port is coupled to a first input of the second RF switch and the fourth port is coupled to a second input of the second RF switch.

Advantages of embodiments utilizing such an isolated filter structure include the ability to perform selective filtering using only one filter type, since the bandpass transfer function H1(s) and band-stop transfer function 1-H1(s) track each other automatically. In addition, the band-stop characteristic is less dependent on the correct phase than for a conventional filter due to the isolated nature of the embodiment three-port structure.

A further advantage of embodiments includes the ability to implement multiband filtering in RF front ends without using redundant filter banks. This reduces the amount of hardware needed to implement multi-band RF front ends such that smaller form factors and lower system implementation costs may be achieved.

A further advantage of embodiments includes the ability to implement flexible carrier aggregation schemes. For example, in some embodiments, two transmit paths may be selectably routed to two separate antennas in order to achieve higher linearity and low loss. However, in the presence of a blocked path, the system may be reconfigured to transmit two bands on the same antenna.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A circuit comprising:
    a first RF front-end of a first band;
    a second RF front-end of the first band;
    a first multi-feed antenna;
    a second multi-feed antenna; and
    a first RF switch configured to couple the first RF front-end to a first element of the first multi-feed antenna and coupled the second RF front-end to a first element of the second multi-feed antenna in a first configuration, and configured to couple the first RF front-end to the first element of the second multi-feed antenna and couple the second RF front-end to the first element of the first multi-feed antenna in a second configuration, wherein:
    the first RF front-end comprises a first receive path, a first transmit path, and a first frequency combiner configured to couple the first receive path and the first transmit path; and
    the second RF front-end comprises a second receive path, a second transmit path, and a second frequency combiner configured to couple the second receive path and the second transmit path in a first mode, and configured to couple the second receive path, the second transmit path, and the first frequency combiner in a second mode.

2. The circuit of claim 1, wherein:
    the first RF front-end comprises a first power amplifier; and
    the second RF front-end comprises a second power amplifier.

3. The circuit of claim 1, wherein:
    the first receive path comprises a first plurality of filters coupled in series with a corresponding first plurality of low noise amplifiers; and the second receive path comprises a first plurality of filters coupled in series with a corresponding first plurality of low noise amplifiers.

4. The circuit of claim 1, further comprising:
a third RF front-end of a second band;
a fourth RF front-end of the second band; and
a second RF switch configured to couple the third RF front-end to a second element of the first multi-feed antenna and couple the fourth RF front-end to a second element of the second multi-feed antenna in a third configuration, and configured to couple the third RF front-end to the second element of the second multi-feed antenna and couple the fourth RF front-end to the second element of the first multi-feed antenna in a fourth configuration.

5. The circuit of claim 4, wherein the first band is higher in frequency than the second band.

6. The circuit of claim 1, further comprising:
a third RF front-end of a second band;
a fourth RF front-end of the second band;
a second RF switch configured to couple the third RF front-end to the first element of the first multi-feed antenna and couple the fourth RF front-end to the first element of the second multi-feed antenna in a third configuration, and configured to couple the third RF front-end to the first element of the second multi-feed antenna and couple the fourth RF front-end to the first element of the first multi-feed antenna in a fourth configuration;
a first diplexer having inputs coupled to the first and second RF switches and an output coupled to the first element of the first multi-feed antenna; and
a second diplexer having inputs coupled to the first and second RF switches and an output coupled to the first element of the second multi-feed antenna.

7. The circuit of claim 6, further comprising:
a fifth RF front-end of a third band;
a sixth RF front-end of the third band; and
a third RF switch configured to couple the fifth RF front-end to a second first element of the first multi-feed antenna and couple the sixth RF front-end to a second element of the second multi-feed antenna in a fifth configuration, and configured to couple the fifth RF front-end to the second element of the second multi-feed antenna and couple the sixth RF front-end to the second element of the first multi-feed antenna in a sixth configuration.

8. The circuit of claim 7, wherein:
the first band is higher in frequency than the second band; and
the third band in higher in frequency than the first and second bands.

9. The circuit of claim 1, wherein:
the first frequency combiner is configured to couple an input of the first receive path and an output of the first transmit path to a first port of the first RF front-end; and
the second frequency combiner is configured to
in the first mode, couple an input of the second receive path and an output of the second transmit path to a second port, and
in the second mode, couple the input of the second receive path, the output of the second transmit path, and the first port of the first RF front-end to the second port, wherein the first port is coupled to a first input of the first RF switch and the second port is coupled to a second input of the first RF switch.

10. The circuit of claim 9, wherein the first frequency combiner comprises:
a first power splitter having an input coupled to the first transmit path;
a first phase shifter coupled to a first output of the first power splitter;
a second phase shifter coupled a second output of the first power splitter;
a first filter coupled to the first phase shifter;
a second filter coupled to the second phase shifter; and
a hybrid circuit having an input port coupled to the first filter, an isolated power coupled to the second filter, a first phase shift output coupled to the first receive path and a second phase shift output coupled to the first port.

11. The circuit of claim 9, further comprising:
a third RF front-end of a second band;
a fourth RF front-end of the second band;
a second RF switch configured to couple the third RF front-end to the first element of the first multi-feed antenna and couple the fourth RF front-end to the first element of the second multi-feed antenna in a third configuration, and configured to couple the third RF front-end to the first element of the second multi-feed antenna and couple the fourth RF front-end to the first element of the first multi-feed antenna in a fourth configuration;
a first diplexer having inputs coupled to the first and second RF switches and an output coupled to the first element of the first multi-feed antenna; and
a second diplexer having inputs coupled to the first and second RF switches and an output coupled to the first element of the second multi-feed antenna.

12. The circuit of claim 11, wherein
the third RF front-end comprises
a third receive path,
a third transmit path,
a third frequency combiner configured to couple an input of the third receive path and an output of the third transmit path to a third port;
the fourth RF front-end comprises
a fourth receive path,
a fourth transmit path,
a fourth frequency combiner configured to:
in a third mode, couple an input of the fourth receive path and an output of the fourth transmit path to a fourth port, and
in a fourth mode, couple the input of the fourth receive path, the output of the fourth transmit path, and the third port of the second RF front-end to the fourth port, wherein the third port is coupled to a first input of the second RF switch and the fourth port is coupled to a second input of the second RF switch.

13. A method of operating a circuit including a first RF front-end of a first band; a second RF front-end of the first band; a first multi-feed antenna; and a second multi-feed antenna, the method comprising:
coupling the first RF front-end to a first element of the first multi-feed antenna and coupling the second RF front-end to a first element of the second multi-feed antenna in a first configuration;
coupling the first RF front-end to the first element of the second multi-feed antenna and coupling the second RF front-end to the first element of the first multi-feed antenna in a second configuration;

coupling a first receive path of the first RF front-end and a first transmit path of the first RF front-end to a first frequency combiner of the first RF front-end;

coupling a second receive path of the second RF front-end and a second transmit path of the second RF front-end in a first mode; and coupling the second receive path of the second RF front-end, the second transmit path of the second RF front-end, and the first frequency combiner of the first RF front-end in a second mode.

14. A circuit comprising:

a first RF front-end of a first band;

a second RF front-end of the first band;

a first multi-feed antenna;

a second multi-feed antenna; and an RF switch configured to couple the first RF front-end to a first element of the first multi-feed antenna and coupled the second RF front-end to a first element of the second multi-feed antenna in a first configuration, and configured to couple the first RF front-end to the first element of the second multi-feed antenna and couple the second RF front-end to the first element of the first multi-feed antenna in a second configuration, wherein:

the first RF front-end comprises a first receive path, a first transmit path, and a first frequency combiner configured to couple an input of the first receive path and an output of the first transmit path to a first port of the first RF front-end; and the second RF front-end comprises a second receive path, a second transmit path, and a second frequency combiner configured to in a first mode, couple an input of the second receive path and an output of the second transmit path to a second port, and in a second mode, couple the input of the second receive path, the output of the second transmit path, and the first port of the first RF front-end to the second port, wherein the first port is coupled to a first input of the RF switch and the second port is coupled to a second input of the RF switch.

\* \* \* \* \*